US011362696B2

(12) United States Patent
Jang

(10) Patent No.: US 11,362,696 B2
(45) Date of Patent: Jun. 14, 2022

(54) MOBILE PHONE CASE

(71) Applicant: Eui Hyoung Jang, Gwangju (KR)

(72) Inventor: Eui Hyoung Jang, Gwangju (KR)

( * ) Notice: Subject to any disclaimer, the term of this patent is extended or adjusted under 35 U.S.C. 154(b) by 168 days.

(21) Appl. No.: 16/891,645

(22) Filed: Jun. 3, 2020

(65) Prior Publication Data

US 2020/0295796 A1    Sep. 17, 2020

Related U.S. Application Data

(63) Continuation of application No. PCT/KR2018/015580, filed on Dec. 7, 2018.

(30) Foreign Application Priority Data

Dec. 7, 2017  (KR) .......................... 10-2017-0167202

(51) Int. Cl.
*H04B 1/3888* (2015.01)
*A45C 11/00* (2006.01)
*A45C 13/00* (2006.01)
*A45C 13/10* (2006.01)

(52) U.S. Cl.
CPC ............ *H04B 1/3888* (2013.01); *A45C 11/00* (2013.01); *A45C 13/005* (2013.01); *A45C 13/10* (2013.01); *A45C 2011/002* (2013.01); *A45C 2013/1015* (2013.01)

(58) Field of Classification Search
CPC .............. A45C 11/00; A45C 2011/003; A45C 2011/002; A45C 2013/025; A45C 13/005; A45C 13/002; A45C 2013/1015; A45C 13/10

See application file for complete search history.

(56) References Cited

U.S. PATENT DOCUMENTS

| 9,762,280 | B1* | 9/2017 | Munn | ...................... H04M 1/04 |
| 2013/0075285 | A1 | 3/2013 | Peng | |
| 2013/0213838 | A1* | 8/2013 | Tsai | ...................... G06F 1/1628 |
| | | | | 206/320 |
| 2015/0111624 | A1* | 4/2015 | Peel | ...................... H04B 1/3888 |
| | | | | 455/575.8 |

FOREIGN PATENT DOCUMENTS

| KR | 1020050020901 A1 | 3/2005 |
| KR | 1020070079853 A1 | 8/2007 |
| KR | 100996722 B1 | 11/2010 |
| KR | 101191719 B1 | 10/2012 |

(Continued)

*Primary Examiner* — Keith Ferguson
(74) *Attorney, Agent, or Firm* — Husch Blackwell LLP

(57) ABSTRACT

A mobile phone case is provided for two phones that is capable of storing two mobile phones simultaneously. To this end, the mobile phone case for two phones according to the present invention includes a first case having a first support means on which a first mobile phone is mounted, and a second case having a second support means on which a second mobile phone is mounted. A third case is disposed between the first case and the second case. A first connecting portion is configured to connect the first case and the third case, and a second connecting portion is configured to connect the second case and the third case. A vertical width or a horizontal width of at least one of the first support means and the second support means is changeable.

15 Claims, 46 Drawing Sheets

(56) References Cited

FOREIGN PATENT DOCUMENTS

| | | |
|---|---:|---:|
| KR | 101310248 B1 | 9/2013 |
| KR | 2020140004961 U | 9/2014 |
| KR | 101494104 B1 | 2/2015 |
| KR | 101576423 B1 | 10/2015 |
| KR | 2020150003984 U | 10/2015 |
| KR | 200479825 Y1 | 3/2016 |
| KR | 200480724 Y1 | 6/2016 |
| KR | 101878133 B1 | 7/2018 |

* cited by examiner

A

B

C

D

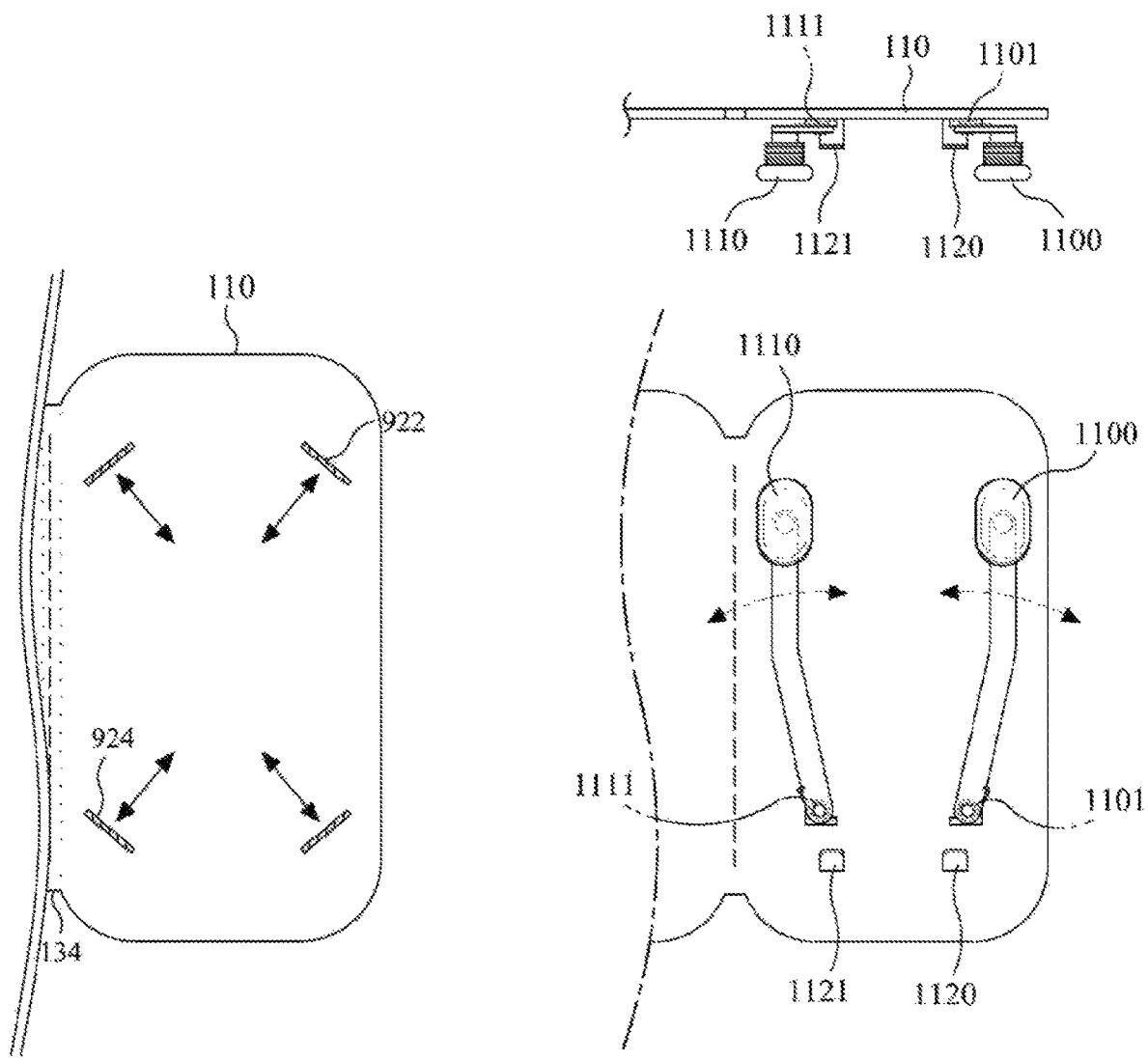

MOBILE PHONE CASE

CROSS-REFERENCE TO RELATED APPLICATIONS

This application is a continuation of PCT International Application S/N PCT/KR2018/015580 filed on Dec. 7, 2018, which claims the benefit of Korean Patent Application S/N KR 10-2017-0167202 filed on Dec. 7, 2017 which is hereby incorporated in its entirety by reference.

TECHNICAL FIELD

The present invention relates to a mobile phone case, and more particularly, to a mobile phone case capable of holding and managing a plurality of mobile phones of various sizes and thicknesses and changing the position and screen arrangement of the mobile phones in a desired way.

BACKGROUND

Mobile phones are a necessity for modern people. In particular, there are users who need two mobile phones for work.

Among users who need two mobile phones, users who have difficulty carrying two mobile phones use a single mobile phone to which two mobile numbers are matched.

However, when a user uses two different mobile numbers on a single mobile phone, due to limitations in the screen size and performance of the mobile phone, it may be difficult for the user to simultaneously perform tasks related to the two mobile numbers.

For example, when a user attempts to chat, send a text message, or make a call using each of two mobile numbers, a single mobile phone may fail to provide such functions, and it may be difficult for a plurality of tasks to be simultaneously performed because the screen size of the mobile phone is not large.

Therefore, a user who needs two mobile phones has to carry two mobile phones. However, carrying two mobile phones may cause inconvenience to the user. In particular, because the two mobile phones have to be managed independently, it may be very inconvenient to the user.

Also, because the two mobile phones are managed independently, any one mobile phone may be lost.

In addition, a user on the move cannot hold two mobile phones together, thus being unable to use the two mobile phones simultaneously.

Meanwhile, the cycle in which new models of mobile phones are launched is shortening, and accordingly, users frequently change mobile phones.

However, the shapes and sizes of mobile phones are different for each manufacturer, and even mobile phones of the same manufacturer have different shapes and sizes according to models.

Therefore, every time a user purchases a new mobile phone, the user has to additionally purchase a mobile phone case manufactured to fit the shape and size of the purchased mobile phone. Accordingly, the user has to spend extra money.

Also, because a mobile phone case which was used previously is discarded, there is a serious problem in terms of waste of resources.

In addition, existing mobile phone cases simply perform a function of fixing and supporting a mobile phone and have limitations in that they are unable to provide additional functions beyond those of a case.

SUMMARY OF INVENTION

The present invention is directed to providing a mobile phone case for two phones that is capable of safely storing two mobile phones simultaneously with the two mobile phones stacked together, allowing the two mobile phones to be easily held while being simultaneously stored in the case, thus making it convenient to carry the two mobile phones, and allowing the two mobile phones stored in the case to be viewed and used simultaneously by unfolding the case such that the stacked mobile phones are spread out.

The present invention is also directed to providing a mobile phone case that has support means mounted therein which are capable of supporting mobile phones of various thicknesses and sizes, thus being able to hold and support mobile phones regardless of the type and model of the mobile phone, and is capable of safely storing two mobile phones simultaneously with the two mobile phones stacked together and changing the position and screen arrangement of each mobile phone in a desired way so that the mobile phones with optimum screen arrangement are used simultaneously in association, thereby maximizing use satisfaction and work efficiency.

However, the objectives of the present invention are not limited to those mentioned above, and other unmentioned objectives will be clearly understood by those of ordinary skill in the art with reference to the following descriptions.

One aspect of the present invention provides a mobile phone case including: a first case (110) having a first support means on which a first mobile phone (200) is mounted; a second case (120) having a second support means on which a second mobile phone (300) is mounted; a third case (130) disposed between the first case and the second case and folded so as to serve as a cover that covers each of the first case and the second case; a first connecting portion (134) configured to connect the first case (110) and the third case (130) and allow the third case (130) to cover and protect the first mobile phone stored in the first case (110); and a second connecting portion (135) configured to connect the second case (120) and the third case (130) and allow the third case (130) to cover and protect the second mobile phone stored in the second case (120), wherein a vertical width or a horizontal width of at least one of the first support means and the second support means is changeable.

The above technical solution and other technical solutions will be described in detail below.

A mobile phone case according to the present invention can allow a user to efficiently perform a task related to any one mobile phone in association with the other mobile phone or perform separate tasks using the two mobile phones. Therefore, because the user can manage the two mobile phones simultaneously, it is possible to improve work efficiency, productivity, and use satisfaction.

Also, due to being able to hold and support all kinds of mobile phones of various thicknesses and sizes, the mobile phone case according to the present invention can protect mobile phones from external impact regardless of the type and model of the mobile phone and allow a user to carry two mobile phones, without losing them, while the two mobile phones are stably supported. In addition, the mobile phone case according to the present invention can safely store two mobile phones simultaneously with the two mobile phones stacked together and change the position and screen arrangement of each mobile phone in a desired way by moving or rotating each mobile phone or tilting the screen of each mobile phone. Accordingly, there is an advantage in that it is possible to configure and manage two mobile phones in an optimum form desired for the purpose and environment of use.

These and other features and aspects of the disclosed technology are set forth below with reference to the accompanying drawings.

BRIEF DESCRIPTION OF THE DRAWINGS

FIG. 43 is an exemplary view illustrating a use state of a mobile phone case according to yet another embodiment of the present invention.

FIGS. 44 to 50 are exemplary views illustrating use states of a mobile phone case according to yet another embodiment of the present invention.

DETAILED DESCRIPTION OF EXEMPLARY EMBODIMENTS

Figure 1:
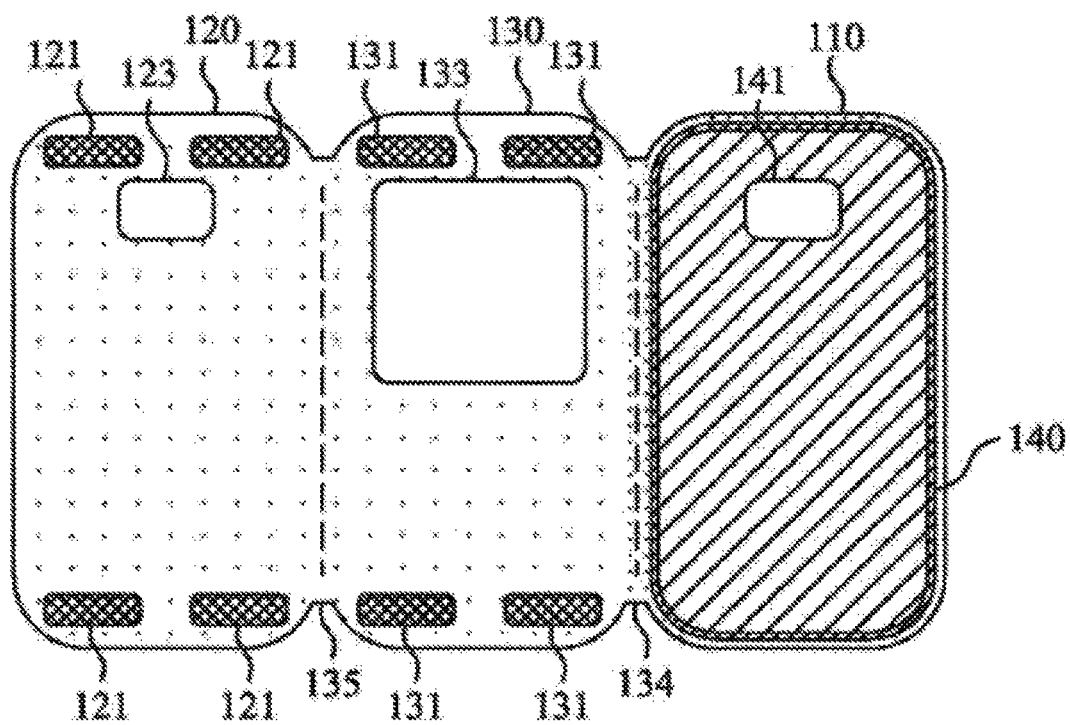
FIG. 1 is an exemplary view illustrating first surfaces of a mobile phone case for two phones according to the present invention.

Hereinafter, embodiments of a case for a hand-held electronic device, such as a mobile phone or an electronic mobile tab according to the present invention will be described with reference to the accompanying drawings. In this process, thicknesses of lines or sizes of elements illustrated in the drawings may be exaggerated for clarity and convenience of description. Also, terms described below are terms defined in consideration of functions in the present invention and may be changed according to an intention or a practice of an a worker or an operator. Therefore, such terms should be defined on the basis of the contents throughout the present specification.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The device, apparatus and methods described herein should not be construed as limiting in any way. Instead, the present disclosure is directed toward all novel and non-obvious features and aspects of the various disclosed embodiments, alone and in various combinations and sub-combinations with one another. The disclosed devices, methods, and apparatus are not limited to any specific aspect or feature or combinations thereof, nor do the disclosed devices, methods, and apparatus require that any one or more specific advantages be present or problems be solved. Any theories of operation are to facilitate explanation, but the disclosed devices, methods, and apparatus are not limited to such theories of operation.

Figure 2:
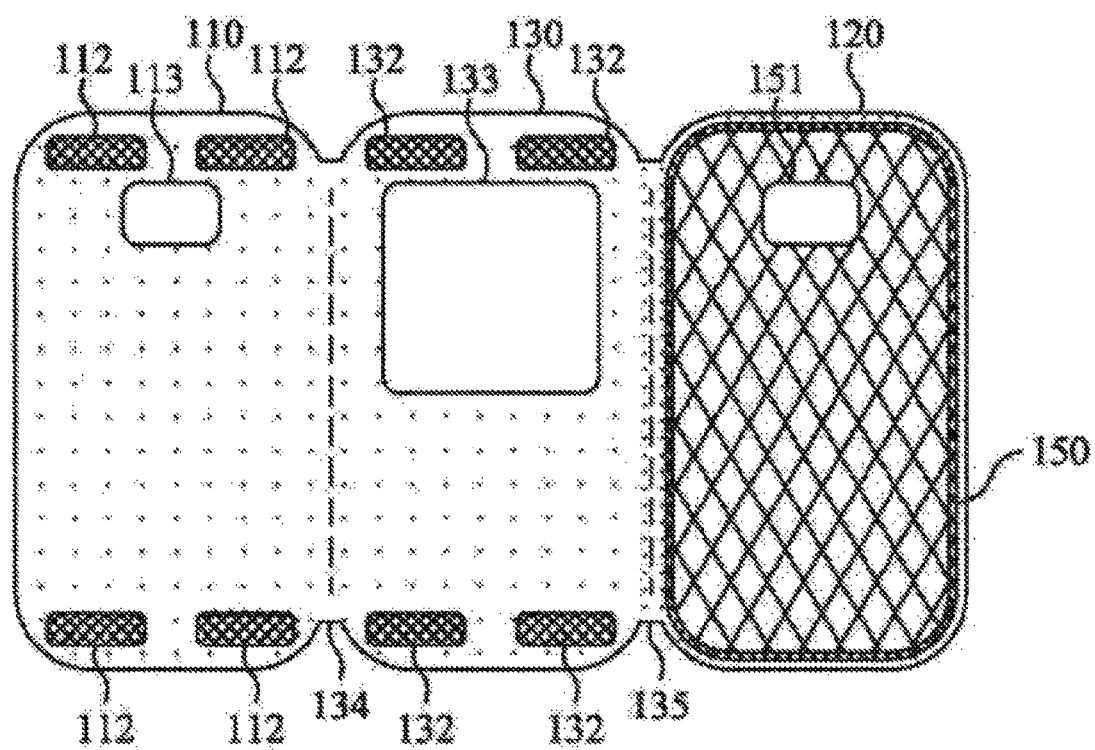
FIG. 2 is an exemplary view illustrating second surfaces of the mobile phone case for two phones according to the present invention.
Figure 3:
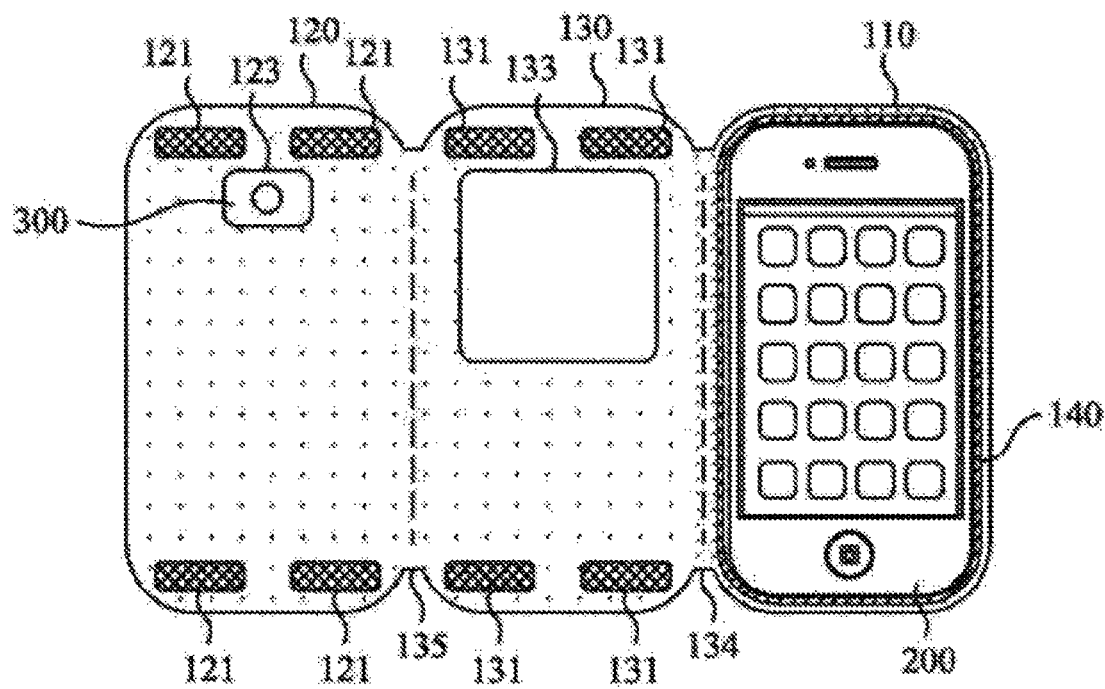
FIG. 3 is an exemplary view illustrating a first mobile phone mounted on a first case of the mobile phone case for two phones according to the present invention.
Figure 4:
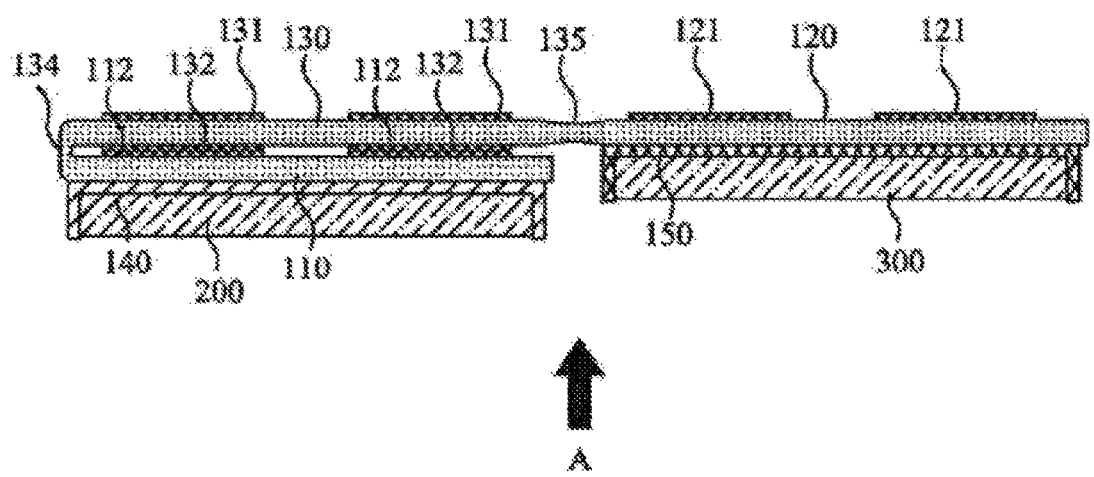
FIG. 4 is an exemplary view illustrating a method of using the mobile phone case for two phones according to the present invention.
Figure 5:
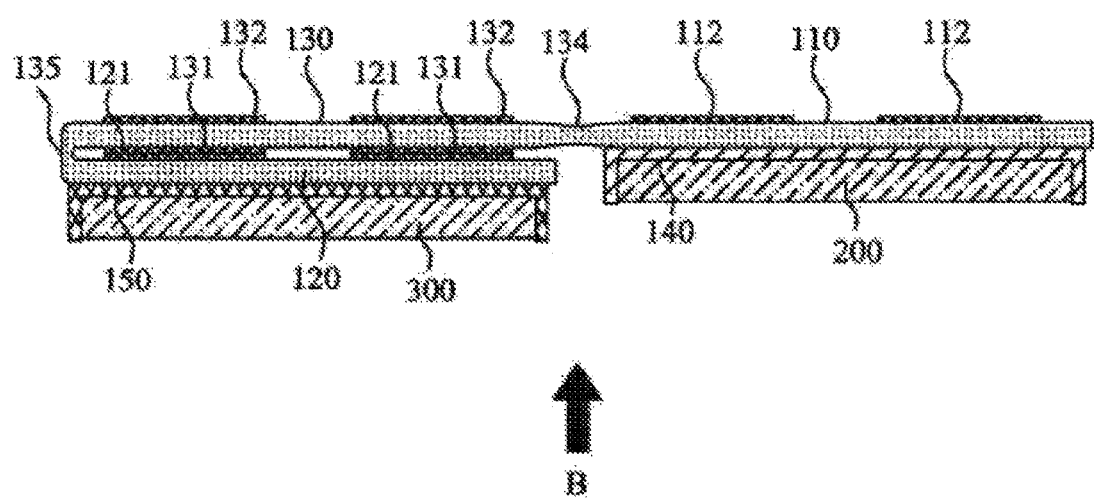
FIG. 5 is an exemplary view illustrating another method of using the mobile phone case for two phones according to the present invention.
Figure 6:
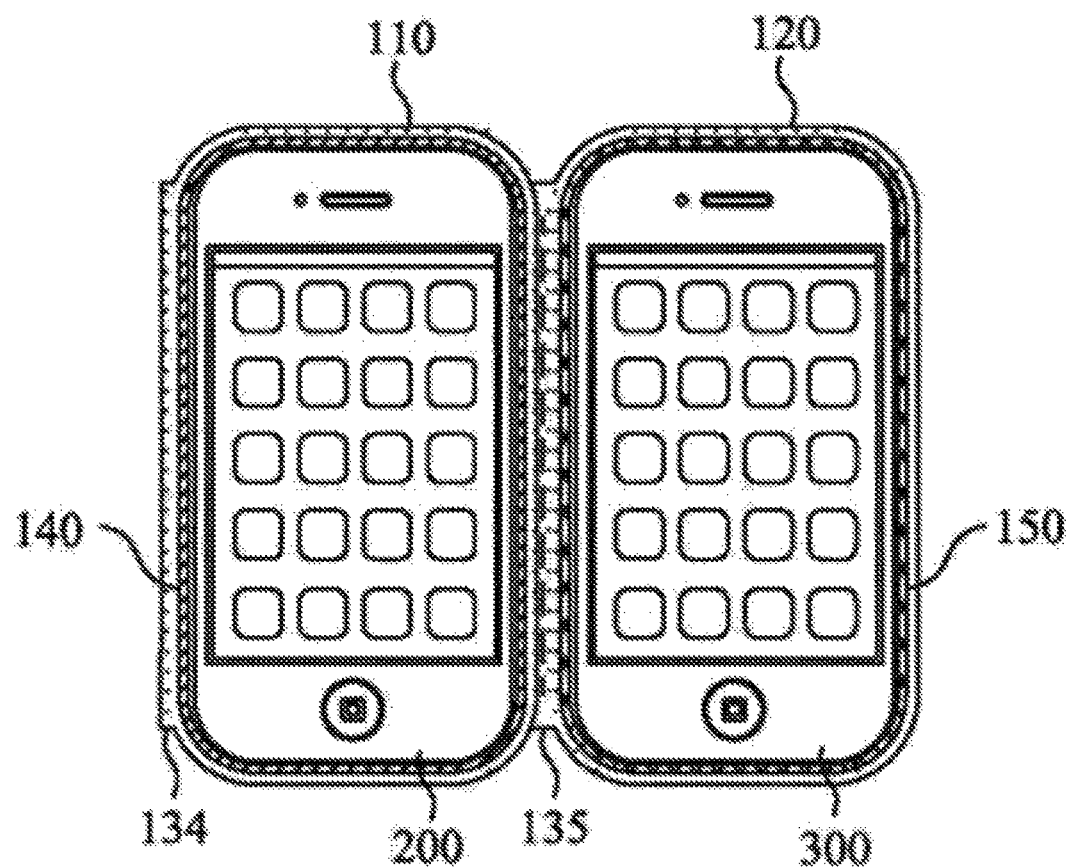
FIG. 6 is an exemplary view of the mobile phone case for two phones according to the present invention that is viewed in direction A shown in FIG. 4.
Figure 7:
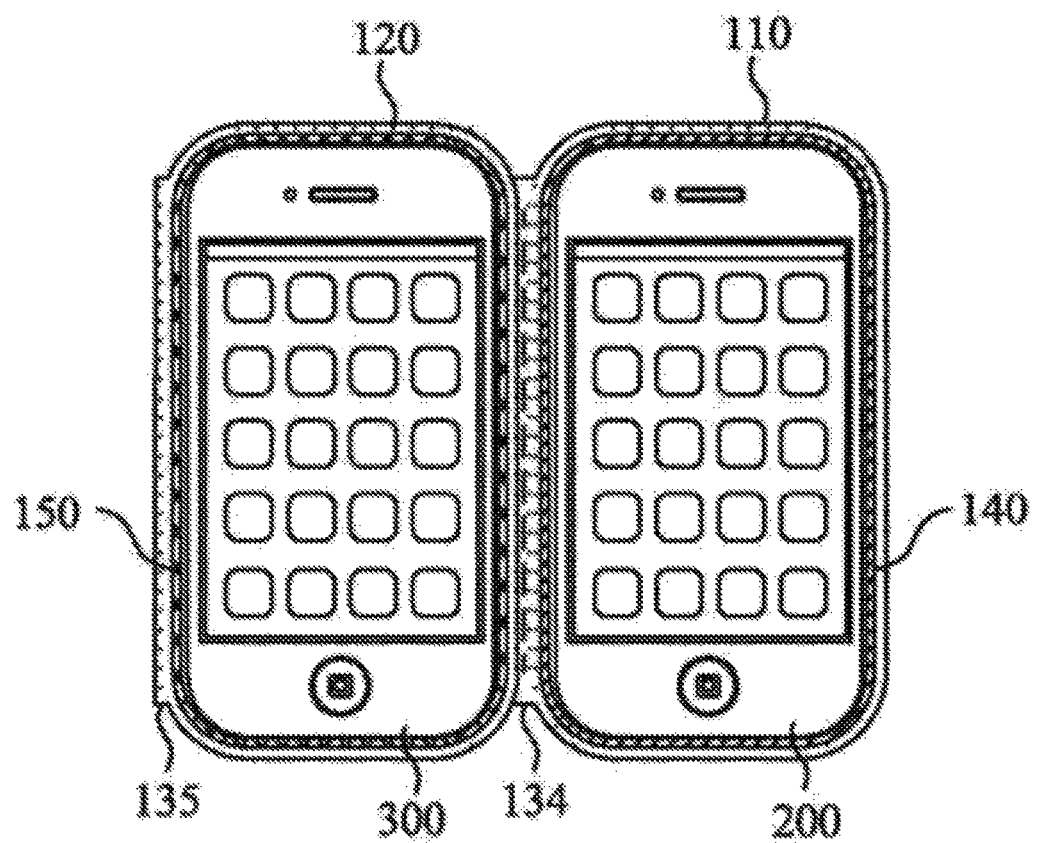
FIG. 7 is an exemplary view of the mobile phone case for two phones according to the present invention that is viewed in direction B shown in FIG. 5.

FIG. 1 is an exemplary view illustrating first surfaces of a mobile phone case for two phones according to the present invention, FIG. 2 is an exemplary view illustrating second surfaces of the mobile phone case for two phones according to the present invention, FIG. 3 is an exemplary view illustrating a first mobile phone mounted on a first case of the mobile phone case for two phones according to the present invention, FIG. 4 is an exemplary view illustrating a method of using the mobile phone case for two phones according to the present invention, FIG. 5 is an exemplary view illustrating another method of using the mobile phone case for two phones according to the present invention, FIG. 6 is an exemplary view of the mobile phone case for two phones according to the present invention that is viewed in direction A shown in FIG. 4, and FIG. 7 is an exemplary view of the mobile phone case for two phones according to the present invention that is viewed in direction B shown in FIG. 5. Here, FIGS. 4 and 5 are exemplary views of a mobile phone case for two phones according to the present invention having mobile phones 200 and 300 mounted therein that is viewed from the top of the mobile phone case. In the following descriptions, the mobile phone case for two phones according to the present invention will be simply referred to "mobile phone case."

As illustrated in FIGS. 1 to 7, the mobile phone case according to the present invention includes a first case 110 having a first support means 140 on which a first mobile phone 200 is mounted, a second case 120 having a second support means 150 on which a second mobile phone 300 is mounted, a third case 130 disposed between the first case and the second case, a first connecting portion 134 configured to connect the first case 110 and the third case 130, and a second connecting portion 135 configured to connect the second case 120 and the third case 130.

Here, first surfaces of the first case 110, the second case 120, and the third case 130 are coplanar, and second surfaces of the first case 110, the second case 120, and the third case 130 are coplanar.

Also, the first support means 140 is disposed on the first surface of the first case 110, and the second support means 150 is disposed on the second surface of the second case 120.

In more detail, FIG. 1 illustrates the first surfaces of the first case 110, the second case 120, and the third case 130 of the mobile phone case according to the present invention, wherein the first surfaces are coplanar.

Also, FIG. 2 illustrates the second surfaces of the first case 110, the second case 120, and the third case 130 of the mobile phone case according to the present invention, wherein the second surfaces are coplanar.

At least one second front adhesive means 121 is disposed on the first surface of the second case 120.

For example, as illustrated in FIG. 1, four second front adhesive means 121 may be disposed on the first surface of the second case 120.

The four second front adhesive means 121 may be disposed on left and right sides of an upper end portion of the first surface of the second case 120 and left and right sides of a lower end portion of the first surface of the second case 120.

For example, the second front adhesive means 121 may be a hook-and-loop fastener.

At least one third front adhesive means 131 is disposed on the first surface of the third case 130.

For example, as illustrated in FIG. 1, four third front adhesive means 131 may be disposed on the first surface of the third case 130.

The four third front adhesive means 131 may be disposed on left and right sides of an upper end portion of the first surface of the third case 130 and left and right sides of a lower end portion of the first surface of the third case 130.

For example, the third front adhesive means 131 may be a hook-and-loop fastener, in particular a hook-and-loop fastener that may be fastened to the second front adhesive means 121.

For example, in a case in which the second front adhesive means 121 is a hook-and-loop fastener that includes a plurality of hooks, the third front adhesive means 131 may be a hook-and-loop fastener that includes a plurality of locking loops.

Conversely, in a case in which the second front adhesive means 121 is a hook-and-loop fastener that includes a plurality of locking loops, the third front adhesive means 131 may be a hook-and-loop fastener that includes a plurality of hooks.

Because the second front adhesive means 121 and the third front adhesive means 131 are formed to be fastened with each other as described above, the mobile phone case according to the present invention may be used in forms illustrated in FIGS. 5 and 7.

That is, the first surface of the second case 120 and the first surface of the third case 130 may come in close contact such that the second support means 150 and the first support means 140 are disposed side by side with each other.

Therefore, a user may simultaneously view and use the first mobile phone 200 mounted on the first support means 140 and the second mobile phone 300 mounted on the second support means 150. Accordingly, the user may simultaneously run different applications or simultaneously run the same applications on the first mobile phone 200 and the second mobile phone 300.

That is, with regards to smartphone tasks such as making or answering a phone call, shooting a photo or a video, investing in stocks, doing general work, running entertainment applications, and web browsing, the user may, while conveniently carrying the two mobile phones, efficiently perform a task on any one mobile phone in association with the other mobile phone or simultaneously perform separate tasks on the two mobile phones. In this way, work efficiency, productivity, and use satisfaction are improved. Of course, the user may use only one of the two mobile phones.

At least one first rear adhesive means 112 is disposed on the second surface of the first case 110.

For example, as illustrated in FIG. 2, four first rear adhesive means 112 may be disposed on the second surface of the first case 110.

The four first rear adhesive means 112 may be disposed on left and right sides of an upper end portion of the second surface of the first case 110 and left and right sides of a lower end portion of the second surface of the first case 110.

For example, the first rear adhesive means 112 may be a hook-and-loop fastener.

At least one third rear adhesive means 132 is disposed on the second surface of the third case 130.

For example, as illustrated in FIG. 2, four third rear adhesive means 132 may be disposed on the second surface of the third case 130.

The four third rear adhesive means 132 may be disposed on left and right sides of an upper end portion of the second surface of the third case 130 and left and right sides of a lower end portion of the second surface of the third case 130.

For example, the third rear adhesive means 132 may be a hook-and-loop fastener, in particular a hook-and-loop fastener that may be fastened to the first rear adhesive means 112.

For example, in a case in which the first rear adhesive means 112 is a hook-and-loop fastener that includes a plurality of hooks, the third rear adhesive means 132 may be a hook-and-loop fastener that includes a plurality of locking loops.

Conversely, in a case in which the first rear adhesive means 112 is a hook-and-loop fastener that includes a plurality of locking loops, the third rear adhesive means 132 may be a hook-and-loop fastener that includes a plurality of hooks.

Because the first rear adhesive means 112 and the third rear adhesive means 132 are formed to be fastened with each other as described above, the mobile phone case according to the present invention may be used in forms illustrated in FIGS. 4 and 6.

That is, the second surface of the first case 110 and the second surface of the third case 130 may come in close contact such that the first support means 140 and the second support means 150 are disposed side by side with each other. Accordingly, the first mobile phone and the second mobile phone may be disposed side by side so that display screens of both the first mobile phone and the second mobile phone are visible to the user.

Therefore, the user may simultaneously view and use the first mobile phone 200 mounted on the first support means 140 and the second mobile phone 300 mounted on the second support means 150. Accordingly, the user may simultaneously run different applications or simultaneously run the same applications on the first mobile phone 200 and the second mobile phone 300.

The number and arrangement of the second front adhesive means 121, the third front adhesive means 131, the first rear adhesive means 112, and the third rear adhesive means 132 may be changed in various ways.

Also, structures of the second front adhesive means 121, the third front adhesive means 131, the first rear adhesive means 112, and the third rear adhesive means 132 may be changed in various ways as long as it is possible to fix two cases facing each other.

A first case window 113 is formed in the first case 110 so as to pass through the first case 110. A first support window 141 is formed in the first support means 140, which is mounted on the first case 110, so as to pass through the first support means 140.

The first case window 113 formed in the first case 110 and the first support window 141 formed in the first support means 140 may overlap each other.

The first case window 113 and the first support window 141 are formed at positions corresponding to that of a camera of the first mobile phone 200 mounted on the first support means 140.

Therefore, the user may capture an image through the first case window 113 and the first support window 141 using the first mobile phone 200.

A second case window 123 is formed in the second case 120 so as to pass through the second case 120. A second support window 151 is formed in the second support means 150, which is mounted on the second case 120, so as to pass through the first support means 150.

The second case window 123 formed in the second case 120 and the second support window 151 formed in the second support means 150 may overlap each other.

The second case window 123 and the second support window 151 are formed at positions corresponding to that of a camera of the second mobile phone 300 mounted on the second support means 150.

Therefore, the user may capture an image through the second case window 123 and the second support window 151 using the second mobile phone 300.

A third case window 133 may be formed in the third case 130 so as to overlap the first case window 113 and the second case window 123.

Therefore, the user may capture an image using the first mobile phone 200 even when the first case 110 and the third case 130 overlap each other as illustrated in FIGS. 4 and 6.

Also, the user may capture an image using the second mobile phone 300 even when the second case 120 and the third case 130 overlap each other as illustrated in FIGS. 5 and 7.

A width of each the first connecting portion 134 and the second connecting portion 135 may be larger than or equal to a height of each of the first support means 140 and the second support means 150.

In this case, the first connecting portion 134 and the second connecting portion 135 may be formed with the same material as the first case 110, the second case 120, and the third case 130.

For example, in the mobile phone case according to the present invention, the third case 130 may be folded such that the first surface of the third case 130 faces the first support means 140, or the third case 130 may be folded such that the second surface of the third case 130 faces the second support means 150.

In this case, the third case 130 may completely overlap the first case 110 and the second case 120 only when the width of each of the first connecting portion 134 and the second connecting portion 135 is larger than or equal to the height of each of the first support means 140 and the second support means 150.

However, a height of each of the first mobile phone 200 and the second mobile phone 300 may be larger than the height of each of the first support means 140 and the second support means 150, and in this case, the width of each of the first connecting portion 134 and the second connecting portion 135 has to be larger than or equal to the height of each of the first mobile phone 200 and the second mobile phone 300 which are mounted on the first support means 140 and the second support means 150, respectively.

Therefore, the width of each of the first connecting portion 134 and the second connecting portion 135 may be set to various values in consideration of the height of each of the first support means 140 and the second support means 150 and the height of each of the first mobile phone 200 and the second mobile phone 300.

Because the third case 130 may be used while being overlapped with the first case 110 or the second case 120 as described above, sizes of the first case 110, the second case 120, and the third case 130 may be the same or similar.

However, shapes of the first case 110, the second case 120, and the third case 130 are not necessarily the same.

The first connecting portion 134 and the second connecting portion 135 may be formed of a material having elasticity. For example, the first connecting portion 134 and the second connecting portion 135 may be formed of silicon or formed of synthetic resin or the like having elasticity, other than silicon.

The first connecting portion 134 may include a first hinge connected to the first case 110 and a second hinge connected to the third case 130. In this case, the first hinge and the second hinge may be rotatably connected to each other.

Also, the second connecting portion 135 may include a third hinge connected to the second case 120 and a fourth hinge connected to the third case 130. In this case, the third hinge and the fourth hinge may be rotatably connected to each other.

Figure 8:
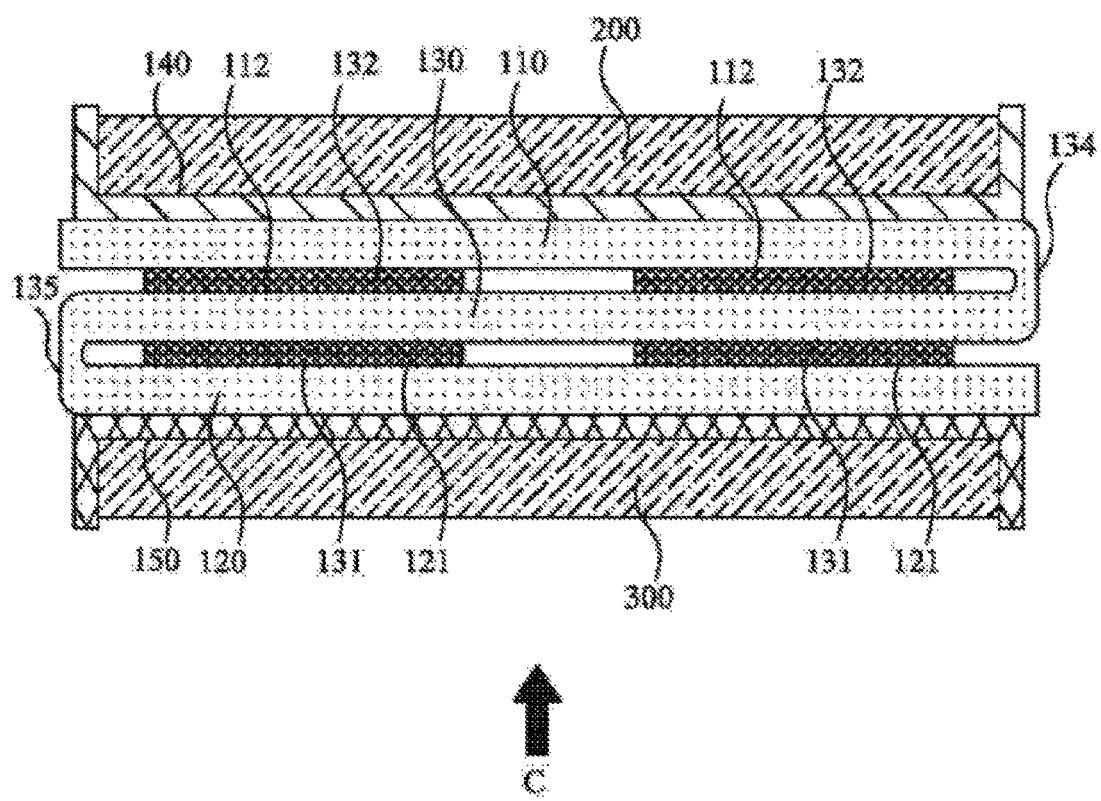
FIG. 8 is an exemplary view illustrating the mobile phone case for two phones according to the present invention that is folded to allow use of two mobile phones.
Figure 9:
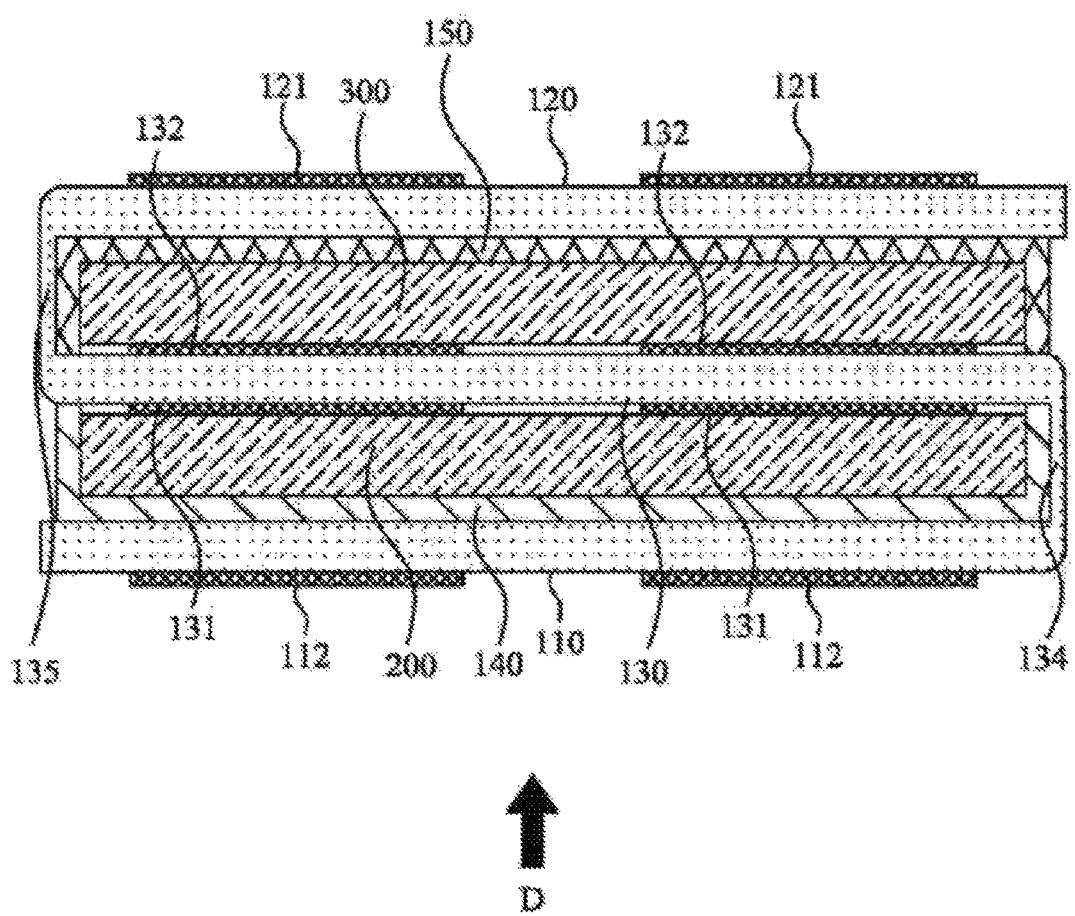
FIG. 9 is an exemplary view illustrating the mobile phone case for two phones according to the present invention that is folded to allow storage of two mobile phones.
Figure 10:
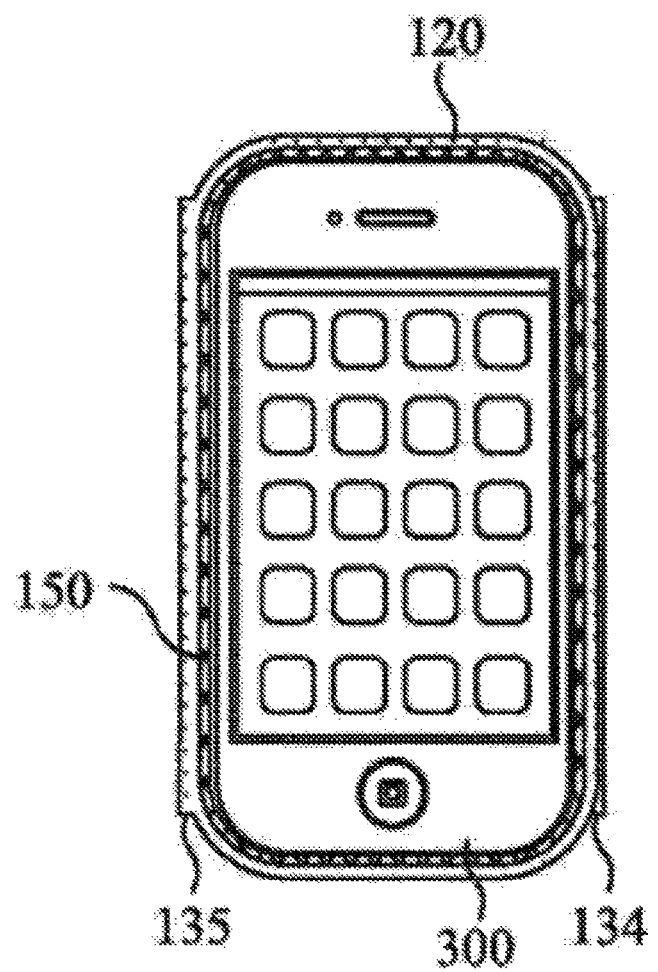
FIG. 10 is an exemplary view of the mobile phone case for two phones according to the present invention that is viewed in direction C illustrated in FIG. 8.
Figure 11:
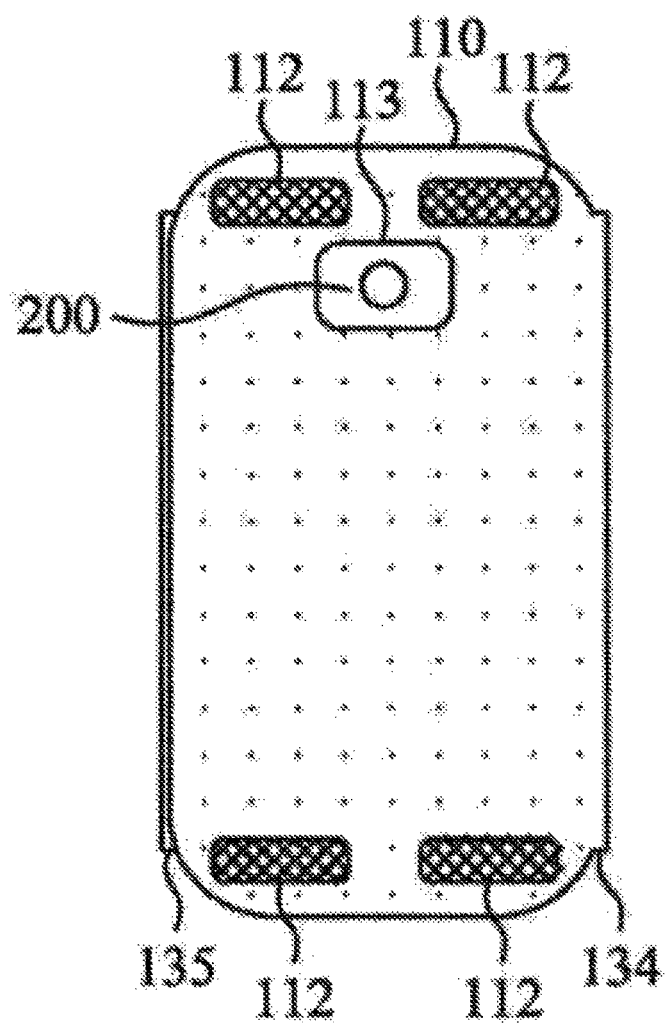
FIG. 11 is an exemplary view of the mobile phone case for two phones according to the present invention that is viewed in direction D illustrated in FIG. 9.
Figure 12:
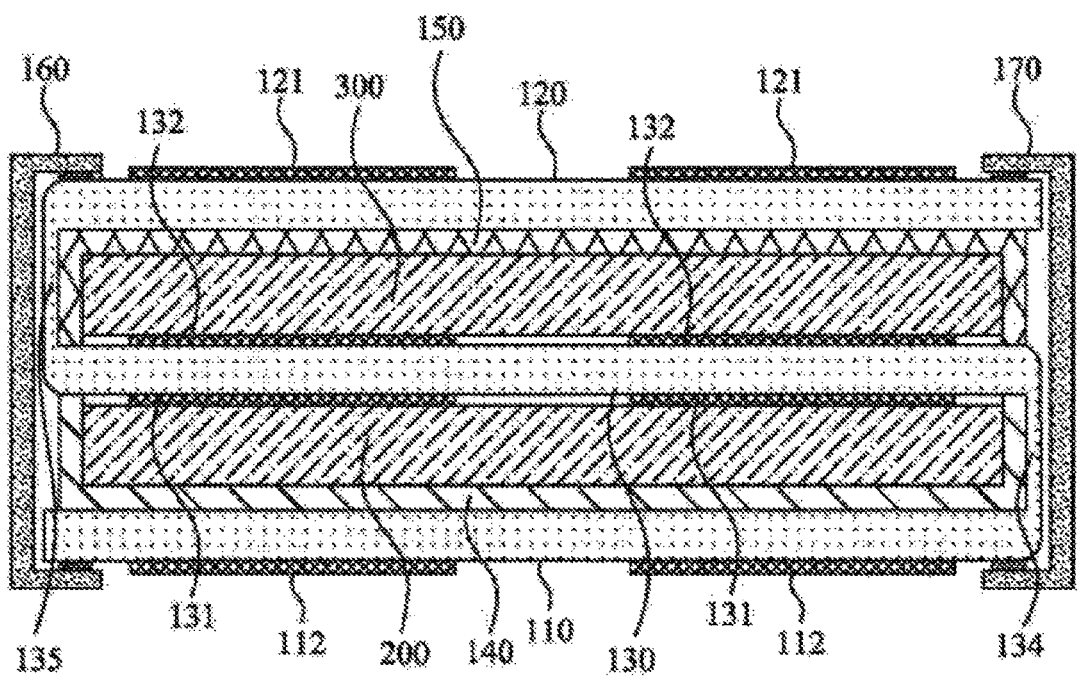
FIG. 12 is an exemplary view illustrating the mobile phone case for two phones according to the present invention that is folded to allow storage of two mobile phones.

FIG. 8 is an exemplary view illustrating the mobile phone case for two phones according to the present invention that is folded to allow use of two mobile phones, FIG. 9 is an exemplary view illustrating the mobile phone case for two phones according to the present invention that is folded to allow storage of two mobile phones, FIG. 10 is an exemplary view of the mobile phone case for two phones according to the present invention that is viewed in direction C illustrated in FIG. 8, FIG. 11 is an exemplary view of the mobile phone case for two phones according to the present invention that is viewed in direction D illustrated in FIG. 9, and FIG. 12 is an exemplary view illustrating the mobile phone case for two phones according to the present invention that is folded to allow storage of two mobile phones. Here, FIGS. 8 and 9 are exemplary views of the mobile phone case for two phones according to the present invention that is viewed from the top of the mobile phone case. In the following descriptions, the mobile phone case for two phones according to the present invention will be simply referred to as "mobile phone case."

First, a user who wants to simultaneously use two mobile phones using the mobile phone case according to the present invention may fold the first case 110 so that the first case 110 is supported by the third case 130, and then arrange the second case 120 beside the first case 110 as illustrated in FIGS. 4 and 6.

Therefore, the user may simultaneously view the first mobile phone 200 mounted on the first case 110 and the second mobile phone 300 mounted on the second case 120 and may run the same applications or different applications on the two mobile phones.

Second, the user who wants to simultaneously use two mobile phones using the mobile phone case according to the present invention may fold the second case 120 so that the second case 120 is supported by the third case 130, and then arrange the first case 110 beside the second case 120 as illustrated in FIGS. 5 and 7.

Therefore, the user may simultaneously view the first mobile phone 200 mounted on the first case 110 and the second mobile phone 300 mounted on the second case 120 and may run the same applications or different applications on the two mobile phones.

Third, in a case in which it is not necessary to simultaneously view the two mobile phones, as illustrated in FIGS. 8 and 10, the user rotates the second surface of the first case 110 toward the second surface of the third case 130 and attaches the first rear adhesive means 112 disposed on the second surface of the first case 110 to the third rear adhesive means 132 disposed on the second surface of the third case 130. Also, the user rotates the first surface of the second case 120 toward the first surface of the third case 130 and attaches the second front adhesive means 121 disposed on the first surface of the second case 120 to the third front adhesive means 131 disposed on the first surface of the third case 130.

Therefore, the first case 110, the second case 120, and the third case 130 are folded as illustrated in FIGS. 8 and 10.

That is, the second surface of the first case 110 and the second surface of the third case 130 may come in close contact, and the first surface of the third case 130 and the first surface of the second case 120 may come in close contact such that the first support means 140 and the second support means 150 are exposed to the outside in opposite directions. Accordingly, the first mobile phone and the second mobile phone may be exposed to the outside in opposite directions.

In this case, the user may use any one of the first mobile phone mounted on the first support means 140 and the second mobile phone 300 mounted on the second support means 150 or use the first mobile phone and the second mobile phone alternately.

Fourth, in a case in which neither of the two mobile phones are being used, as illustrated in FIGS. 9 and 11, the user folds the first support means 140 so that the first support means 140 faces the first surface of the third case 130 and folds the second support means 150 so that the second support means 150 faces the second surface of the third case 130.

Therefore, the first case 110, the second case 120, and the third case 130 are folded as illustrated in FIGS. 9 and 11.

That is, the first support means 140 of the first case 110 and the first surface of the third case 130 may come in close contact, and the second surface of the third case 130 and the second support means 150 of the second case 120 may come in close contact such that the first support means 140 and the second support means 150 are disposed so as not to be exposed to the outside. Accordingly, the first mobile phone and the second mobile phone are disposed so as not to be exposed to the outside.

The mobile phone case according to the present invention that is folded as illustrated in FIGS. 9 and 11 may be put in a pocket or kept in a bag or the like by the user.

In this case, in order to prevent the mobile phone case from being unfolded, a first fastening portion 160 may be mounted on any one of the second surface of the first case 110 and the first surface of the second case 120 as illustrated in FIG. 12. That is, a first side end of the first fastening portion 160 is mounted on any one of the second surface of the first case 110 and the first surface of the second case 120. In this case, a second side end of the first fastening portion 160 may be fastened to the first surface of the second case 120 or the second surface of the first case 110 by a hook-and-loop fastener, a hook, or the like.

Also, a second fastening portion 170 may be mounted on any one of the second surface of the first case 110 and the first surface of the second case 120 so as to face the first fastening portion 160. That is, a first side end of the second fastening portion 170 is mounted on any one of the second surface of the first case 110 and the first surface of the second case 120. In this case, a second side end of the second fastening portion 170 may be fastened to the first surface of the second case 120 or the second surface of the first case 110 by a hook-and-loop fastener, a hook, or the like.

Therefore, when neither of the two mobile phones, which are mounted on the mobile phone case according to the present invention, are being used, the user may fold the first case, the second case, and the third case as illustrated in FIG. 9 and then fix the first fastening portion 160 and the second fastening portion 170 to both the second surface of the first case 110 and the first surface of the second case 120 as illustrated in FIG. 12. Accordingly, it is possible to protect the mobile phones from external impact and scratches and carry and store the two mobile phones conveniently.

Although the adhesive portions 121, 131, 112, and 132 have been described above as being hook-and-loop fasteners with reference to the drawings, the adhesive portions 121, 131, 112, and 132 may also be formed of a protrusion and a groove portion, formed as snap fasteners, formed of a metal plate and a magnet, or have various other forms.

Also, the first support means 140 and the second support means 150 perform a function of fixing the mobile phones. Therefore, the forms of the first support means 140 and the second support means 150 may be changed to various forms other than those described above with reference to the drawings.

For example, although the first support means 140 and the second support means 150 may surround and fix the mobile phones, the first support means 140 and the second support means 150 may also be formed of a bolt and a nut which are coupled, formed of a protrusion and a groove portion, formed as snap fasteners, formed of a metal plate and a magnet, or have various other forms.

Meanwhile, another embodiment of the present invention will be described in detail with reference to the accompanying drawings.

Figure 13:
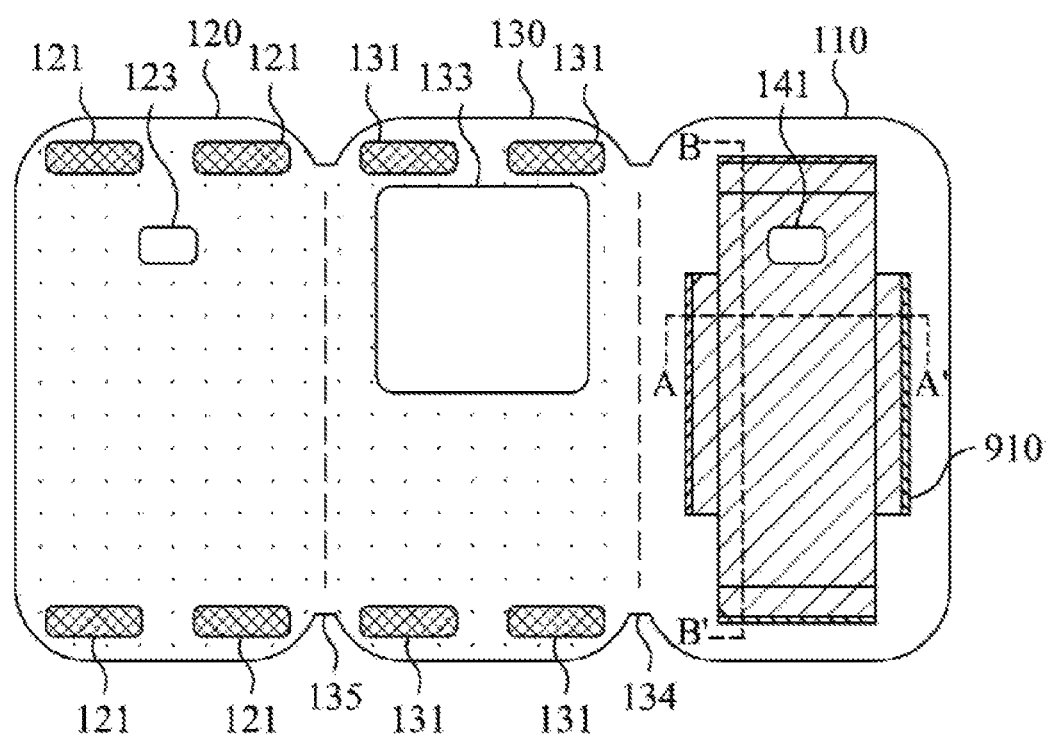
FIG. 13 is an exemplary view illustrating first surfaces of a mobile phone case according to the present invention.
Figure 14:
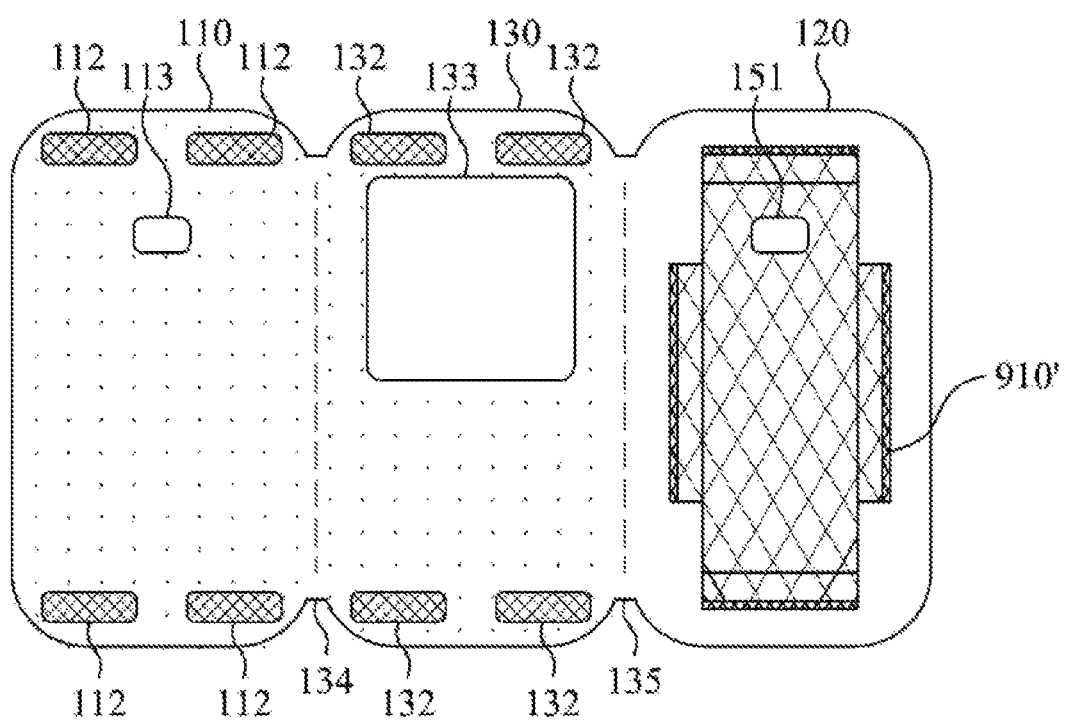
FIG. 14 is an exemplary view illustrating second surfaces of the mobile phone case according to the present invention.
Figure 15:
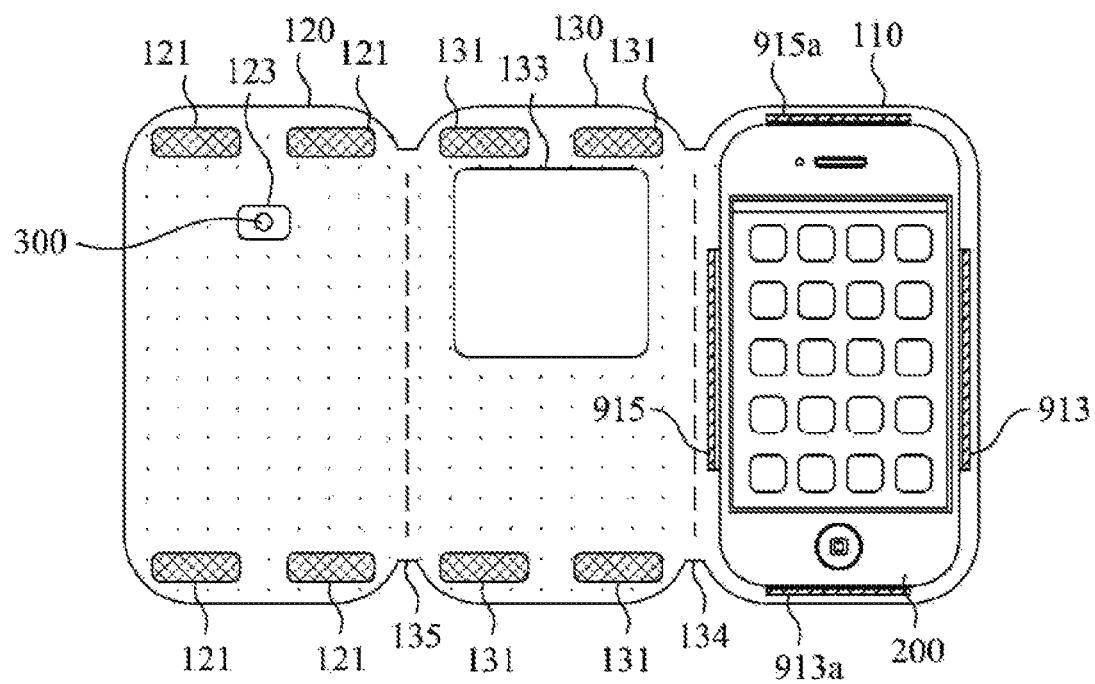
FIG. 15 is an exemplary view illustrating a first mobile phone mounted on a first case of the mobile phone case according to the present invention.
Figure 16:
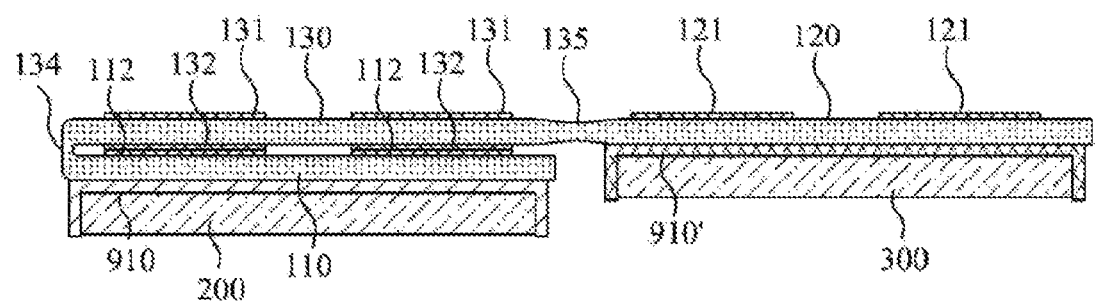
FIG. 16 is an exemplary view illustrating a method of using the mobile phone case according to the present invention.
Figure 17:
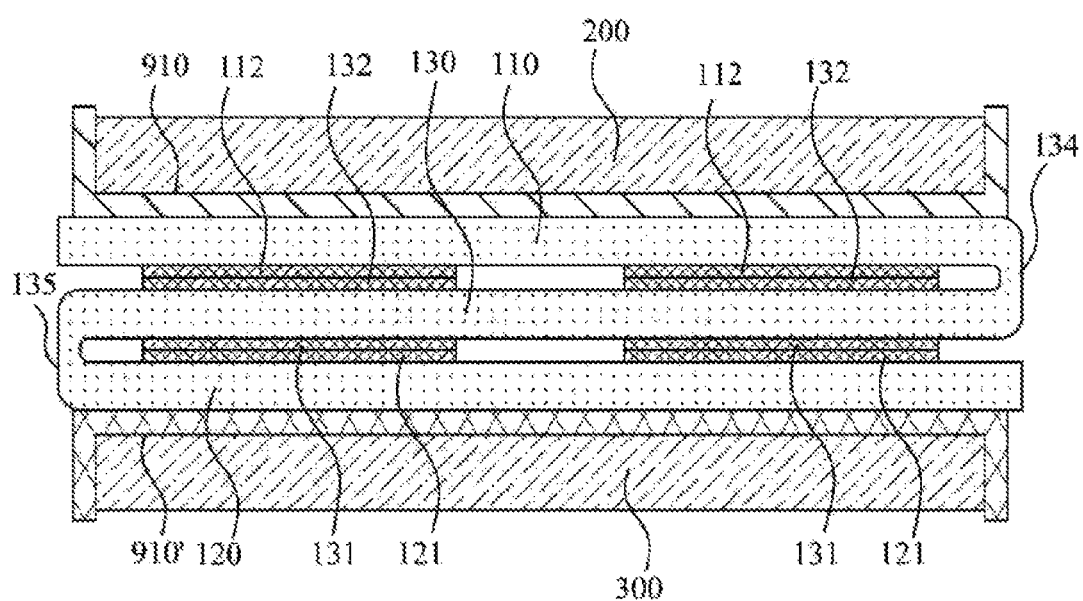
FIG. 17 is an exemplary view illustrating the mobile phone case according to the present invention that is folded to allow use of two mobile phones.
Figure 18:
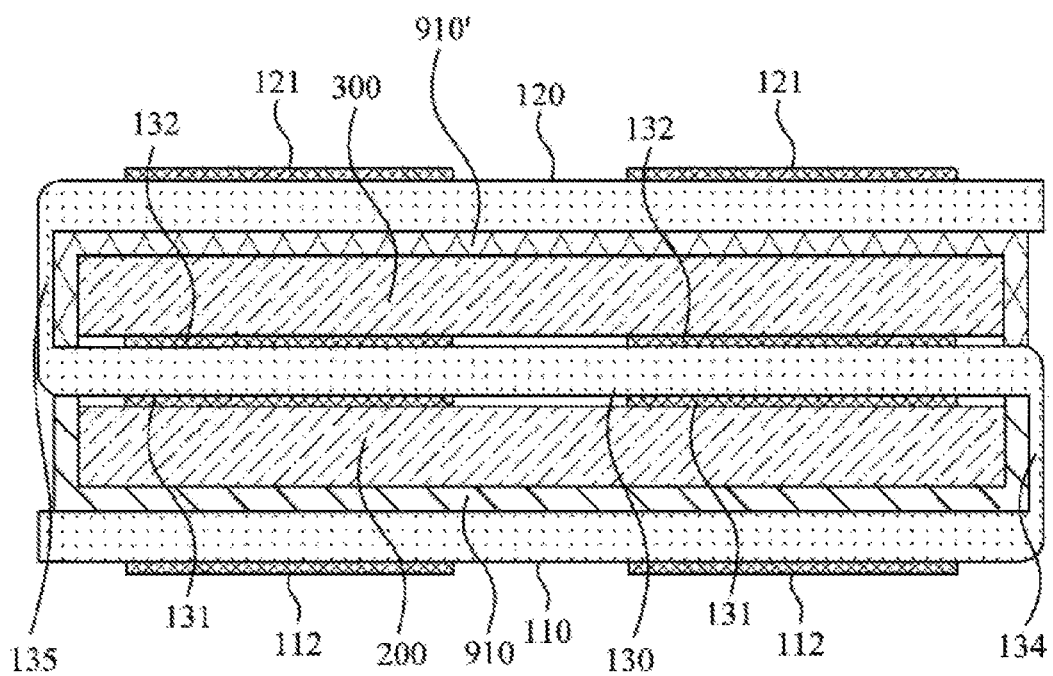
FIG. 18 is an exemplary view illustrating the mobile phone case according to the present invention that is folded to allow storage of two mobile phones.
Figure 19:
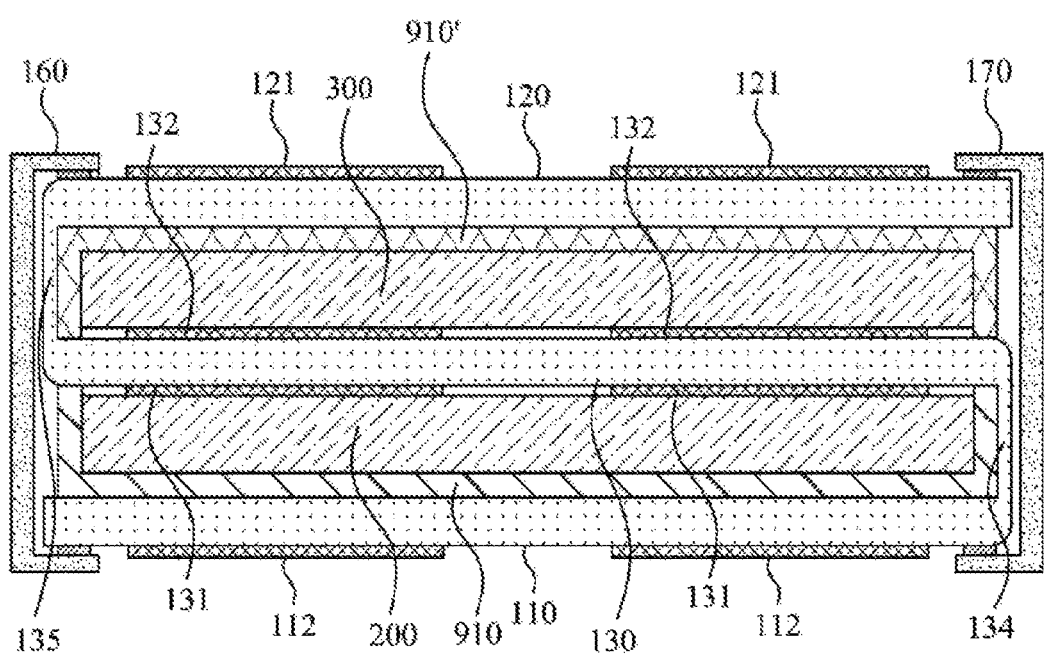
FIG. 19 is another exemplary view illustrating the mobile phone case according to the present invention that is folded to allow storage of two mobile phones.

FIG. 13 is an exemplary view illustrating first surfaces of a mobile phone case according to the present invention, FIG. 14 is an exemplary view illustrating second surfaces of the mobile phone case according to the present invention, FIG. 15 is an exemplary view illustrating a first mobile phone mounted on a first case of the mobile phone case according to the present invention, FIG. 16 is an exemplary view illustrating a method of using the mobile phone case according to the present invention, FIG. 17 is an exemplary view illustrating the mobile phone case according to the present invention that is folded to allow use of two mobile phones, FIG. 18 is an exemplary view illustrating the mobile phone case according to the present invention that is folded to allow storage of two mobile phones, and FIG. 19 is another exemplary view illustrating the mobile phone case according to the present invention that is folded to allow storage of two mobile phones.

As illustrated in FIGS. 13 to 18, the mobile phone case according to the present invention includes a first case 110 having a first support means 910 on which a first mobile phone 200 is mounted, a second case 120 having a second support means 910' on which a second mobile phone 300 is mounted, a third case 130 disposed between the first case and the second case, a first connecting portion 134 configured to connect the first case 110 and the third case 130, and a second connecting portion 135 configured to connect the second case 120 and the third case 130.

Here, first surfaces of the first case 110, the second case 120, and the third case 130 are coplanar, and second surfaces of the first case 110, the second case 120, and the third case 130 are coplanar.

Also, the first support means 910 is disposed on the first surface of the first case 110, and the second support means 910' is disposed on the second surface of the second case 120.

In more detail, FIG. 13 illustrates the first surfaces of the first case 110, the second case 120, and the third case 130 of the mobile phone case according to the present invention, wherein the first surfaces are coplanar.

Also, FIG. 14 illustrates the second surfaces of the first case 110, the second case 120, and the third case 130 of the mobile phone case according to the present invention, wherein the second surfaces are coplanar.

At least one second front adhesive means 121 is disposed on the first surface of the second case 120.

For example, as illustrated in FIG. 13, four second front adhesive means 121 may be disposed on the first surface of the second case 120.

The four second front adhesive means 121 may be disposed on left and right sides of an upper end portion of the first surface of the second case 120 and left and right sides of a lower end portion of the first surface of the second case 120.

For example, the second front adhesive means 121 may be a hook-and-loop fastener.

At least one third front adhesive means 131 is disposed on the first surface of the third case 130.

For example, as illustrated in FIG. 13, four third front adhesive means 131 may be disposed on the first surface of the third case 130.

The four third front adhesive means 131 may be disposed on left and right sides of an upper end portion of the first surface of the third case 130 and left and right sides of a lower end portion of the first surface of the third case 130.

For example, the third front adhesive means 131 may be a hook-and-loop fastener, in particular a hook-and-loop fastener that may be fastened to the second front adhesive means 121.

For example, in a case in which the second front adhesive means 121 is a hook-and-loop fastener that includes a plurality of hooks, the third front adhesive means 131 may be a hook-and-loop fastener that includes a plurality of locking loops.

Conversely, in a case in which the second front adhesive means 121 is a hook-and-loop fastener that includes a plurality of locking loops, the third front adhesive means 131 may be a hook-and-loop fastener that includes a plurality of hooks.

Because the second front adhesive means 121 and the third front adhesive means 131 are formed to be fastened with each other as described above, the mobile phone case according to the present invention may be used in various forms illustrated in FIGS. 15 to 18.

For example, as illustrated in FIG. 16, the first surface of the second case 120 and the first surface of the third case 130 may come in close contact such that the second support means 910' and the first support means 910 are disposed side by side with each other.

Therefore, a user may simultaneously view and use the first mobile phone 200 mounted on the first support means 910 and the second mobile phone 300 mounted on the second support means 910'. Accordingly, the user may simultaneously run different applications or simultaneously run the same applications on the first mobile phone 200 and the second mobile phone 300.

That is, with regards to smartphone tasks such as making or answering a phone call, shooting a photo or a video, investing in stocks, doing general work, running entertainment applications, and web browsing, the user may, while conveniently carrying the two mobile phones, efficiently perform a task on any one mobile phone in association with the other mobile phone or simultaneously perform separate tasks on the two mobile phones. In this way, work efficiency, productivity, and use satisfaction are improved. Of course, the user may use only one of the two mobile phones.

At least one first rear adhesive means 112 is disposed on the second surface of the first case 110.

For example, as illustrated in FIG. 14, four first rear adhesive means 112 may be disposed on the second surface of the first case 110.

The four first rear adhesive means 112 may be disposed on left and right sides of an upper end portion of the second surface of the first case 110 and left and right sides of a lower end portion of the second surface of the first case 110.

For example, the first rear adhesive means 112 may be a hook-and-loop fastener.

At least one third rear adhesive means 132 is disposed on the second surface of the third case 130.

For example, as illustrated in FIG. 14, four third rear adhesive means 132 may be disposed on the second surface of the third case 130.

The four third rear adhesive means 132 may be disposed on left and right sides of an upper end portion of the second surface of the third case 130 and left and right sides of a lower end portion of the second surface of the third case 130.

For example, the third rear adhesive means 132 may be a hook-and-loop fastener, in particular a hook-and-loop fastener that may be fastened to the first rear adhesive means 112.

For example, in a case in which the first rear adhesive means 112 is a hook-and-loop fastener that includes a plurality of hooks, the third rear adhesive means 132 may be a hook-and-loop fastener that includes a plurality of locking loops.

Conversely, in a case in which the first rear adhesive means 112 is a hook-and-loop fastener that includes a plurality of locking loops, the third rear adhesive means 132 may be a hook-and-loop fastener that includes a plurality of hooks.

Because the first rear adhesive means 112 and the third rear adhesive means 132 are formed to be fastened with each other as described above, the mobile phone case according to the present invention may be used in various forms illustrated in FIGS. 16 to 18.

That is, the second surface of the first case 110 and the second surface of the third case 130 may come in close contact such that the first support means 910 and the second support means 910' are disposed side by side with each other. Accordingly, the first mobile phone and the second mobile phone may be disposed side by side so that display screens of both the first mobile phone and the second mobile phone are visible to the user.

Therefore, the user may simultaneously view and use the first mobile phone 200 mounted on the first support means 910 and the second mobile phone 300 mounted on the second support means 910'. Accordingly, the user may simultaneously run different applications or simultaneously run the same applications on the first mobile phone 200 and the second mobile phone 300.

The number and arrangement of the second front adhesive means 121, the third front adhesive means 131, the first rear adhesive means 112, and the third rear adhesive means 132 may be changed in various ways.

Also, structures of the second front adhesive means 121, the third front adhesive means 131, the first rear adhesive means 112, and the third rear adhesive means 132 may be changed in various ways as long as it is possible to fix two cases facing each other.

A first case window 113 is formed in the first case 110 so as to pass through the first case 110. A first support window 141 is formed in the first support means 910, which is mounted on the first case 110, so as to pass through the first support means 910.

The first case window 113 formed in the first case 110 and the first support window 141 formed in the first support means 910 overlap each other.

The first case window 113 and the first support window 141 are formed at positions corresponding to that of a camera of the first mobile phone 200 mounted on the first support means 910.

Therefore, the user may capture an image through the first case window 113 and the first support window 141 using the first mobile phone 200.

A second case window 123 is formed in the second case 120 so as to pass through the second case 120. A second support window 151 is formed in the second support means 910', which is mounted on the second case 120, so as to pass through the second support means 910'.

The second case window 123 formed in the second case 120 and the second support window 151 formed in the second support means 910' overlap each other.

The second case window 123 and the second support window 151 are formed at positions corresponding to that of a camera of the second mobile phone 300 mounted on the second support means 910'.

Therefore, the user may capture an image through the second case window 123 and the second support window 151 using the second mobile phone 300.

A third case window 133 may be formed in the third case 130 so as to overlap the first case window 113 and the second case window 123.

Therefore, the user may capture an image using the first mobile phone 200 or the second mobile phone 300 even when the first case 110 and the third case 130 overlap each other as illustrated in FIG. 16.

Also, the user may capture an image using the first mobile phone 200 or the second mobile phone 300 even when the second case 120 and the third case 130 overlap each other.

A width of each the first connecting portion 134 and the second connecting portion 135 may be larger than or equal to a height of each of the first support means 910 and the second support means 910'.

In this case, the first connecting portion 134 and the second connecting portion 135 may be formed with the same material as the first case 110, the second case 120, and the third case 130.

For example, in the mobile phone case according to the present invention, the third case 130 may be folded such that the first surface of the third case 130 faces the first support means 910, or the third case 130 may be folded such that the second surface of the third case 130 faces the second support means 910'.

In this case, the third case 130 may completely overlap the first case 110 and the second case 120 only when the width of each of the first connecting portion 134 and the second connecting portion 135 is larger than or equal to the height of each of the first support means 910 and the second support means 910'.

However, a height of each of the first mobile phone 200 and the second mobile phone 300 may be larger than the height of each of the first support means 910 and the second support means 910', and in this case, the width of each of the first connecting portion 134 and the second connecting portion 135 has to be larger than or equal to the height of each of the first mobile phone 200 and the second mobile phone 300 which are mounted on the first support means 910 and the second support means 910', respectively.

Therefore, the width of each of the first connecting portion 134 and the second connecting portion 135 may be set to various values in consideration of the height of each of the first support means 910 and the second support means 910' and the height of each of the first mobile phone 200 and the second mobile phone 300.

Because the third case 130 may be used while being overlapped with the first case 110 or the second case 120 as described above, sizes of the first case 110, the second case 120, and the third case 130 may be the same or similar.

However, shapes of the first case 110, the second case 120, and the third case 130 are not necessarily the same.

The first connecting portion 134 and the second connecting portion 135 may be formed of a material having elasticity. For example, the first connecting portion 134 and the second connecting portion 135 may be formed of silicon or formed of synthetic resin or the like having elasticity, other than silicon.

The first connecting portion 134 may include a first hinge connected to the first case 110 and a second hinge connected to the third case 130. In this case, the first hinge and the second hinge may be rotatably connected to each other.

Also, the second connecting portion 135 may include a third hinge connected to the second case 120 and a fourth hinge connected to the third case 130. In this case, the third hinge and the fourth hinge may be rotatably connected to each other.

Hereinafter, various methods of using the mobile phone case according to the present invention will be described with reference to FIGS. 16 to 18. The mobile phone case according to the present invention will be simply referred to "mobile phone case."

First, a user who wants to simultaneously use two mobile phones using the mobile phone case according to the present invention may fold the first case 110 so that the first case 110 is supported by the third case 130, and then arrange the second case 120 beside the first case 110 as illustrated in FIG. 16.

Therefore, the user may simultaneously view the first mobile phone 200 mounted on the first case 110 and the second mobile phone 300 mounted on the second case 120 and may run the same applications or different applications on the two mobile phones.

Second, the user who wants to simultaneously use two mobile phones using the mobile phone case according to the present invention may fold the second case 120 so that the second case 120 is supported by the third case 130, and then arrange the first case 110 beside the second case 120.

Therefore, the user may simultaneously view the first mobile phone 200 mounted on the first case 110 and the second mobile phone 300 mounted on the second case 120 and may run the same applications or different applications on the two mobile phones.

Third, in a case in which it is not necessary to simultaneously view the two mobile phones, as illustrated in FIG. 17, the user rotates the second surface of the first case 110 toward the second surface of the third case 130 and attaches the first rear adhesive means 112 disposed on the second surface of the first case 110 to the third rear adhesive means 132 disposed on the second surface of the third case 130. Also, the user rotates the first surface of the second case 120 toward the first surface of the third case 130 and attaches the second front adhesive means 121 disposed on the first surface of the second case 120 to the third front adhesive means 131 disposed on the first surface of the third case 130.

Therefore, the first case 110, the second case 120, and the third case 130 are folded as illustrated in FIG. 17.

That is, the second surface of the first case 110 and the second surface of the third case 130 may come in close contact, and the first surface of the third case 130 and the first surface of the second case 120 may come in close contact such that the first support means 910 and the second support means 910' are exposed to the outside in opposite directions. Accordingly, the first mobile phone and the second mobile phone may be exposed to the outside in opposite directions.

In this case, the user may use any one of the first mobile phone mounted on the first support means 910 and the second mobile phone 300 mounted on the second support means 910' or use the first mobile phone and the second mobile phone alternately.

Fourth, in a case in which neither of the two mobile phones are being used, as illustrated in FIG. 18, the user folds the first support means 910 so that the first support means 910 faces the first surface of the third case 130 and folds the second support means 910' so that the second support means 910' faces the second surface of the third case 130.

Therefore, the first case 110, the second case 120, and the third case 130 are folded as illustrated in FIG. 18.

That is, the first support means 910 of the first case 110 and the first surface of the third case 130 may come in close contact, and the second surface of the third case 130 and the second support means 910' of the second case 120 may come in close contact such that the first support means 910 and the second support means 910' are disposed so as not to be exposed to the outside. Accordingly, the first mobile phone and the second mobile phone are disposed so as not to be exposed to the outside.

The mobile phone case according to the present invention that is folded as illustrated in FIG. 18 may be put in a pocket or kept in a bag or the like by the user.

In this case, in order to prevent the mobile phone case from being unfolded, a first fastening portion 160 may be mounted on any one of the second surface of the first case 110 and the first surface of the second case 120 as illustrated in FIG. 19. That is, a first side end of the first fastening portion 160 is mounted on any one of the second surface of the first case 110 and the first surface of the second case 120. In this case, a second side end of the first fastening portion 160 may be fastened to the first surface of the second case 120 or the second surface of the first case 110 by a hook-and-loop fastener, a hook, or the like.

Also, a second fastening portion 170 may be mounted on any one of the second surface of the first case 110 and the first surface of the second case 120 so as to face the first fastening portion 160. That is, a first side end of the second fastening portion 170 is mounted on any one of the second surface of the first case 110 and the first surface of the second case 120. In this case, a second side end of the second fastening portion 170 may be fastened to the first surface of the second case 120 or the second surface of the first case 110 by a hook-and-loop fastener, a hook, or the like.

Therefore, when neither of the two mobile phones, which are mounted on the mobile phone case according to the present invention, are being used, the user may fold the first case, the second case, and the third case as illustrated in FIG. 18 and then fix the first fastening portion 160 and the second fastening portion 170 to both the second surface of the first case 110 and the first surface of the second case 120 as illustrated in FIG. 19. Accordingly, it is possible to protect the mobile phones from external impact and scratches and carry and store the two mobile phones conveniently.

Although the adhesive portions 121, 131, 112, and 132 have been described above as being hook-and-loop fasteners with reference to the drawings, the adhesive portions 121, 131, 112, and 132 may also be formed of a protrusion and a groove portion, formed as snap fasteners, formed of a metal plate and a magnet, or have various other forms.

Also, the first support means 910 and the second support means 910' perform a function of fixing the mobile phones. Therefore, the forms of the first support means 910 and the second support means 910' may be changed to various forms other than those described above with reference to the drawings.

For example, although the first support means 910 and the second support means 910' may surround and fix the mobile phones, the first support means 910 and the second support means 910' may also be formed of a bolt and a nut which are coupled, formed of a protrusion and a groove portion, formed as snap fasteners, formed of a metal plate and a magnet, or have various other forms.

Figure 20:
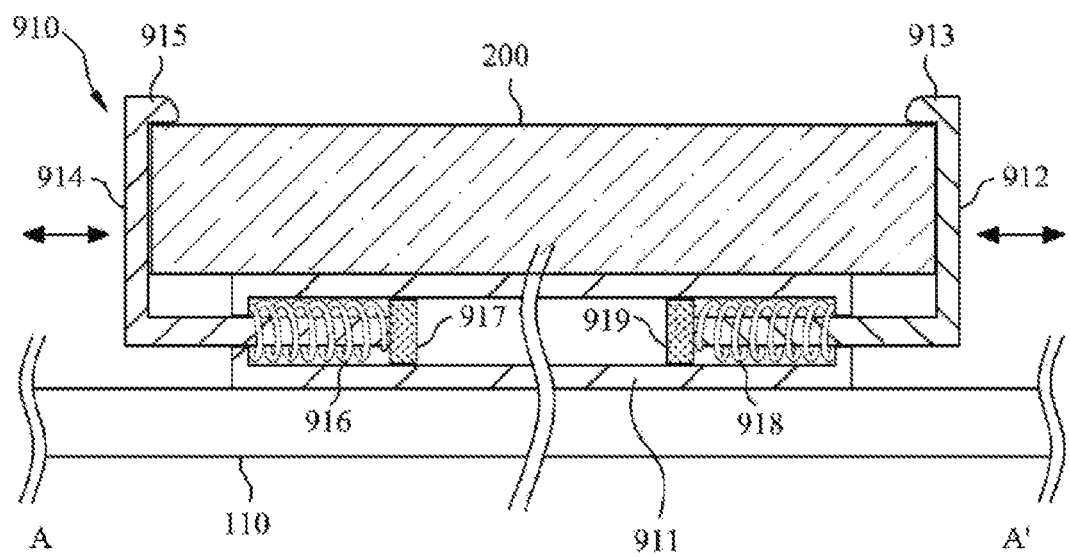
FIG. 20 is an exemplary view illustrating a cross-section of a mobile phone case according to another embodiment of the present invention.

FIG. 20 is an exemplary view illustrating a cross-section of a mobile phone case according to another embodiment of the present invention. Particularly, FIG. 20 is an exemplary view illustrating a cross-section of the mobile phone case taken along line A-A' illustrated in FIG. 13. FIGS. 13 to 19 also illustrate the mobile phone case according to another embodiment of the present invention. Therefore, hereinafter, a mobile phone case according to a first embodiment of the present invention will be described with reference to FIGS. 13 to 20.

Also, although FIG. 20 illustrates a cross-section of the first support means 910 taken along the line A-A' of FIG. 13, a cross-section of the second support means 910' taken in the same direction as the line A-A' may also be the same as the cross-section of the first support means 910. However, the forms of the first support means 910 and the second support means 910' are not necessarily the same. That is, each of the first support means 910 and the second support means 910' may be formed according to any one of various embodiments illustrated in FIGS. 20 to 40, and the first support means 910 and the second support means 910' may have different forms. A cross-section taken along line B-B' of FIG. 13 may also be the same as the cross-section illustrated in FIG. 20. However, the cross-section taken along line A-A' and the cross-section taken along line B-B' are not necessarily the same. That is, the cross-section taken along line A-A' and the cross-section taken along line B-B' may be formed according to any one of various embodiments illustrated in FIGS. 20 to 40. In more detail, the forms of the first support means 910 and the second support means 910' disposed in the single mobile phone case according to the present invention may be the same or different, and the cross-section taken along line A-A' and the cross-section taken along line B-B' may be the same or different for each of the first support means 910 and the second support means 910'.

As illustrated in FIGS. 13 to 20, the mobile phone case according to the first embodiment of the present invention includes a first case 110 having a first support means 910 on which a first mobile phone 200 is mounted, a second case 120 having a second support means 910' on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 910 and the second support means 910' is changeable. Here, "vertical" refers to a vertical direction in FIG. 13, and "horizontal" refers to a horizontal direction in FIG. 13. Also, hereinafter, the horizontal direction may be defined as a first direction, and the vertical direction may be defined as a second direction perpendicular to the first direction. The definitions may apply to all the following embodiments.

For example, as illustrated in FIGS. 13 and 20, the first support means 910 includes a support portion 911 mounted on a first surface of the first case 110, a first vertical portion 912 mounted on the support portion 911 in the first direction so as to be able to linearly reciprocate in the first direction by elasticity of a spring, a second vertical portion 914 configured to face the first vertical portion 912 and mounted on the support portion 911 so as to be able to linearly reciprocate in the first direction by elasticity of a spring, a third vertical portion mounted on the support portion 911 in the second direction perpendicular to the first direction so as to be able to linearly reciprocate in the second direction by elasticity of a spring, and a fourth vertical portion configured to face the third vertical portion and mounted on the support portion 911 so as to be able to linearly reciprocate in the second direction by elasticity of a spring.

Here, a first through-hole, through which the first vertical portion passes, is formed in a first side surface of the support portion 911, a second through-hole, through which the second vertical portion passes, is formed in a second side surface of the support portion 911, a third through-hole, through which the third vertical portion passes, is formed in a third side surface of the support portion 911, and a fourth through-hole, through which the fourth vertical portion passes, is formed in a fourth side surface of the support portion 911.

A first protruding portion 919 having a diameter larger than a diameter of the first through-hole is formed at one side end of the first vertical portion 912 that is disposed inside the support portion 911 through the first through-hole, and a first spring 918 is mounted on an outer circumferential surface of the first vertical portion that is disposed between the first protruding portion 919 and the first through-hole. The first vertical portion may linearly reciprocate in the first direction by elasticity of the first spring 918. A first top cover 913 that covers an upper end surface of the first mobile phone 200 is disposed at the other side end of the first vertical portion.

A second protruding portion 917 having a diameter larger than a diameter of the second through-hole is formed at one side end of the second vertical portion 914 that is disposed inside the support portion 911 through the second through-hole, and a second spring 916 is mounted on an outer circumferential surface of the second vertical portion that is disposed between the second protruding portion 917 and the second through-hole. The second vertical portion may linearly reciprocate in the first direction by elasticity of the second spring 916. A second top cover 915 that covers the upper end surface of the first mobile phone 200 is disposed at the other side end of the second vertical portion.

A third protruding portion having a diameter larger than a diameter of the third through-hole is formed at one side end of the third vertical portion that is disposed inside the support portion through the third through-hole, and a third spring is mounted on an outer circumferential surface of the third vertical portion that is disposed between the third protruding portion and the third through-hole. The third vertical portion may linearly reciprocate in the second direction by elasticity of the third spring. A third top cover that covers the upper end surface of the first mobile phone 200 is disposed at the other side end of the third vertical portion.

A fourth protruding portion having a diameter larger than a diameter of the fourth through-hole is formed at one side end of the fourth vertical portion that is disposed inside the support portion through the fourth through-hole, and a fourth spring is mounted on an outer circumferential surface of the fourth vertical portion that is disposed between the fourth protruding portion and the fourth through-hole. The fourth vertical portion may linearly reciprocate in the second direction by elasticity of the fourth spring. A fourth top cover that covers the upper end surface of the first mobile phone 200 is disposed at the other side end of the fourth vertical portion.

In more detail, a user who uses a first mobile phone having a width larger than the first mobile phone 200, which has a width illustrated in FIG. 20, may pull the first vertical portion 912 and the second vertical portion 914 in the first direction, e.g., leftward and rightward in FIG. 20, and increase the width between the first vertical portion and the second vertical portion.

Also, when a first mobile phone having a width smaller than the first mobile phone 200, which has a width illustrated in FIG. 20, is mounted on the first support means 910, the first spring 918 and the second spring 916 are shortened to their original length due to elasticity. Accordingly, the width between the first vertical portion and the second vertical portion may be narrowed, and thus the first mobile phone having a smaller width may also be stably mounted on the first support means 910. This principle may identically apply to all the embodiments described herein.

Figure 21:
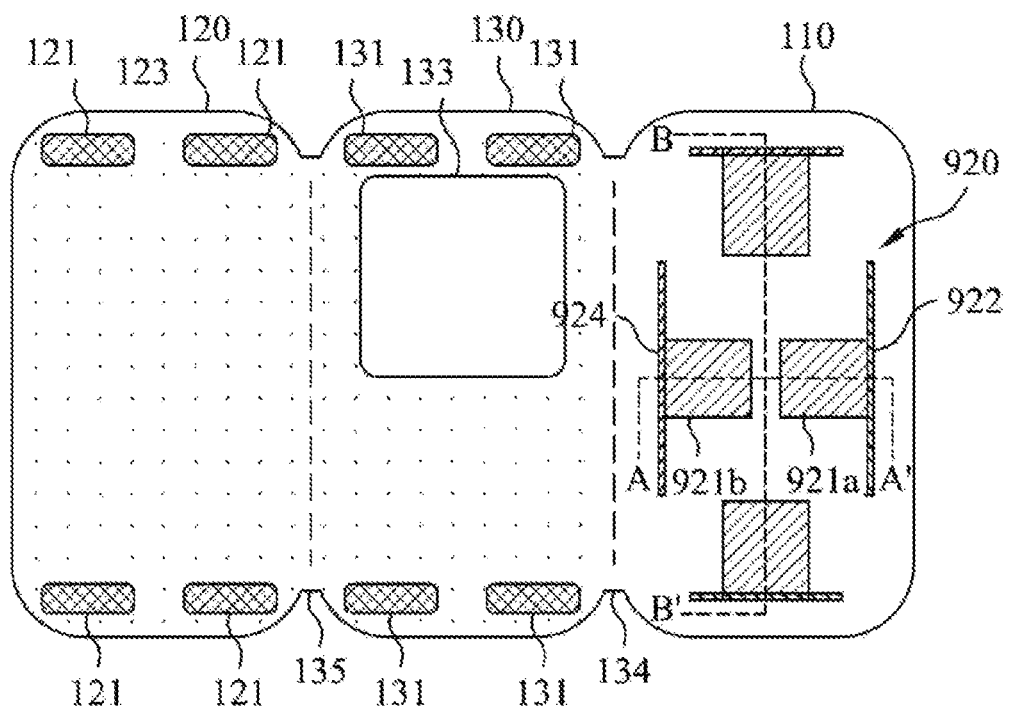
FIGS. 21 and 22 are exemplary views illustrating cross-sections of a mobile phone case according to still another embodiment of the present invention.
Figure 22:
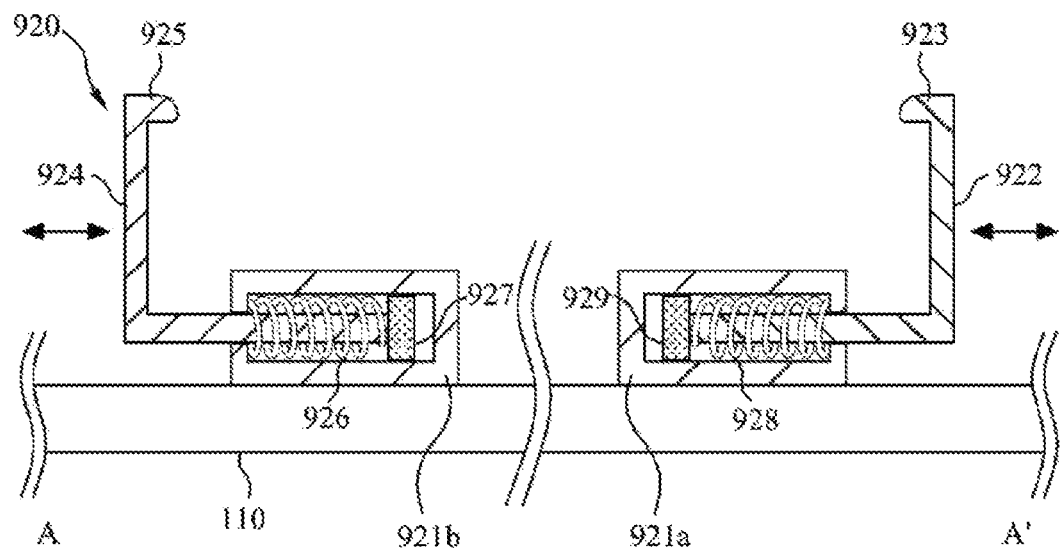

FIGS. 21 and 22 are exemplary views illustrating cross-sections of a mobile phone case according to a second embodiment of the present invention. Particularly, FIG. 22 is an exemplary view illustrating a cross-section of the mobile phone case taken along line A-A' illustrated in FIG. 21. Hereinafter, elements which are the same as those described above with reference to FIGS. 13 to 20 will be denoted by like reference numerals, and in the following descriptions, contents identical or similar to those described above with reference to FIGS. 13 to 20 will be omitted or briefly described. However, in the following descriptions of the mobile phone case according to the second embodiment of the present invention, the first support means, which has been denoted by the reference numeral 910 in FIGS. 13 to 20, will be denoted by the reference numeral 920. Particularly, among the first support means 920 and the second support means, the first support means 920 will be mainly described herein.

As illustrated in FIGS. 21 and 22, the mobile phone case according to the second embodiment of the present invention includes a first case 110 having the first support means 920 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 920 and the second support means is changeable.

For example, as illustrated in FIGS. 21 and 22, the first support means 920 includes a first support portion 921a mounted on one side of a first surface of the first case 110 in a first direction, a first vertical portion 922 mounted on the first support portion so as to be able to linearly reciprocate in the first direction by elasticity of a spring, a second support portion 921b mounted on the other side of the first surface of the first case 110 in the first direction and disposed side by side with the first support portion, a second vertical portion 924 mounted on the second support portion so as to be able to linearly reciprocate in the first direction by elasticity of a spring, a third support portion mounted on one side of the first surface of the first case 110 in a second direction perpendicular to the first direction, a third vertical portion mounted on the third support portion so as to be able to linearly reciprocate in the second direction by elasticity of a spring, a fourth support portion mounted on the other side of the first surface of the first case 110 in the second direction and disposed side by side with the third support portion, and a fourth vertical portion mounted on the fourth support portion so as to be able to linearly reciprocate in the second direction by elasticity of a spring.

Here, a first through-hole, through which the first vertical portion 922 passes, is formed in the first support portion 921a, a second through-hole, through which the second vertical portion passes, is formed in the second support portion 921b, a third through-hole, through which the third vertical portion passes, is formed in the third support portion, and a fourth through-hole, through which the fourth vertical portion passes, is formed in the fourth support portion.

A first protruding portion 929 having a diameter larger than a diameter of the first through-hole is formed at one side end of the first vertical portion 922 that is disposed inside the first support portion 921a through the first through-hole, and a first spring 928 is mounted on an outer circumferential surface of the first vertical portion that is disposed between the first protruding portion 929 and the first through-hole. The first vertical portion may linearly reciprocate in the first direction by elasticity of the first spring 928. A first top cover 923 that covers an upper end surface of the first mobile phone 200 is disposed at the other side end of the first vertical portion.

A second protruding portion 927 having a diameter larger than a diameter of the second through-hole is formed at one side end of the second vertical portion 924 that is disposed inside the second support portion 921b through the second through-hole, and a second spring 926 is mounted on an outer circumferential surface of the second vertical portion that is disposed between the second protruding portion 927 and the second through-hole. The second vertical portion may linearly reciprocate in the first direction by elasticity of the second spring 926. A second top cover 925 that covers the upper end surface of the first mobile phone 200 is disposed at the other side end of the second vertical portion.

A third protruding portion having a diameter larger than a diameter of the third through-hole is formed at one side end of the third vertical portion that is disposed inside the third support portion through the third through-hole, and a third spring is mounted on an outer circumferential surface of the third vertical portion that is disposed between the third protruding portion and the third through-hole. The third vertical portion may linearly reciprocate in the second direction by elasticity of the third spring. A third top cover that covers the upper end surface of the first mobile phone 200 is disposed at the other side end of the third vertical portion.

A fourth protruding portion having a diameter larger than a diameter of the fourth through-hole is formed at one side end of the fourth vertical portion that is disposed inside the fourth support portion through the fourth through-hole, and a fourth spring is mounted on an outer circumferential surface of the fourth vertical portion that is disposed between the fourth protruding portion and the fourth through-hole. The fourth vertical portion may linearly reciprocate in the second direction by elasticity of the fourth spring. A fourth top cover that covers the upper end surface of the first mobile phone 200 is disposed at the other side end of the fourth vertical portion.

The first to fourth vertical portions applied to the second embodiment of the present invention may be operated by an operation principle which is the same as the operation principle of the first to fourth vertical portions described above with reference to the first embodiment of the present invention.

That is, the first to fourth vertical portions are mounted on the single support portion 911 in the first embodiment of the present invention, but, in the second embodiment of the present invention, there are four elements, the first to fourth support portions, that correspond to the support portion 911.

In this case, the first to fourth support portions may each constitute a single rail as illustrated in FIG. 21 or constitute two or more rails.

Figure 23:
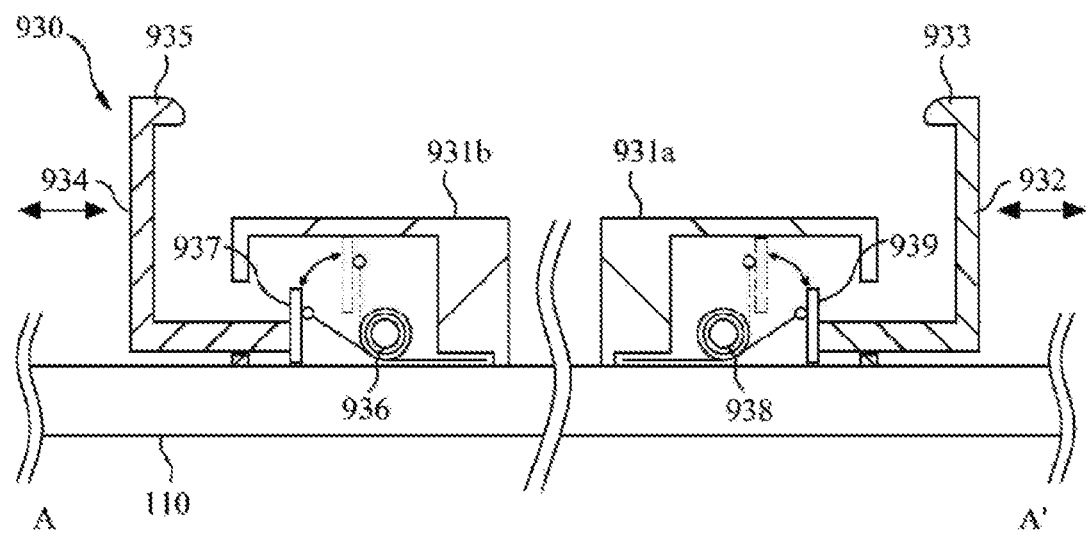
FIG. 23 is an exemplary view illustrating a cross-section of a mobile phone case according to yet another embodiment of the present invention.

FIG. 23 is an exemplary view illustrating a cross-section of a mobile phone case according to a third embodiment of the present invention. Particularly, FIG. 23 is an exemplary view illustrating a cross-section of the mobile phone case taken along line A-A' illustrated in FIG. 21. Hereinafter, elements which are the same as those described above with reference to FIGS. 13 to 22 will be denoted by like reference numerals, and in the following descriptions, contents identical or similar to those described above with reference to FIGS. 13 to 22 will be omitted or briefly described. However, in the following descriptions of the mobile phone case according to the third embodiment of the present invention, the first support means, which has been denoted by the reference numeral 920 in FIGS. 21 and 22, will be denoted by the reference numeral 930. Particularly, among the first support means 930 and the second support means, the first support means 930 will be mainly described herein.

As illustrated in FIGS. 21 and 23, the mobile phone case according to the third embodiment of the present invention includes a first case 110 having the first support means 930 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 930 and the second support means is changeable.

For example, as illustrated in FIGS. 21 and 23, the first support means 930 includes a first support portion 931*a* mounted on one side of a first surface of the first case 110 in a first direction, a first vertical portion 932 mounted on the first support portion so as to be able to linearly reciprocate in the first direction by elasticity of a spring, a second support portion 931*b* mounted on the other side of the first surface of the first case 110 in the first direction and disposed side by side with the first support portion, a second vertical portion 934 mounted on the second support portion so as to be able to linearly reciprocate in the first direction by elasticity of a spring, a third support portion mounted on one side of the first surface of the first case 110 in a second direction perpendicular to the first direction, a third vertical portion mounted on the third support portion so as to be able to linearly reciprocate in the second direction by elasticity of a spring, a fourth support portion mounted on the other side of the first surface of the first case 110 in the second direction and disposed side by side with the third support portion, and a fourth vertical portion mounted on the fourth support portion so as to be able to linearly reciprocate in the second direction by elasticity of a spring.

Here, a first through-hole, through which the first vertical portion 932 passes, is formed in the first support portion 931*a*, a second through-hole, through which the second vertical portion passes, is formed in the second support portion 931*b*, a third through-hole, through which the third vertical portion passes, is formed in the third support portion, and a fourth through-hole, through which the fourth vertical portion passes, is formed in the fourth support portion.

A first protruding portion 939 having a diameter larger than a diameter of the first through-hole is formed at one side end of the first vertical portion 932 that is disposed inside the first support portion 931*a* through the first through-hole, one side end of a first spring 938 is connected to the first protruding portion 939, and the other side end of the first spring is inserted into a groove formed inside the first support portion. The first vertical portion may linearly reciprocate in the first direction by elasticity of the first spring 938. A first top cover 933 that covers an upper end surface of the first mobile phone 200 is disposed at the other side end of the first vertical portion.

A second protruding portion 937 having a diameter larger than a diameter of the second through-hole is formed at one side end of the second vertical portion 934 that is disposed inside the second support portion 931*b* through the second through-hole, one side end of a second spring 936 is connected to the second protruding portion 937, and the other side end of the second spring is inserted into a groove formed inside the second support portion. The second vertical portion may linearly reciprocate in the first direction by elasticity of the second spring 936. A second top cover 935 that covers the upper end surface of the first mobile phone 200 is disposed at the other side end of the second vertical portion.

A third protruding portion having a diameter larger than a diameter of the third through-hole is formed at one side end of the third vertical portion that is disposed inside the third support portion through the third through-hole, one side end of a third spring is connected to the third protruding portion, and the other side end of the third spring is inserted into a groove formed inside the third support portion. The third vertical portion may linearly reciprocate in the second direction by elasticity of the third spring. A third top cover that covers the upper end surface of the first mobile phone 200 is disposed at the other side end of the third vertical portion.

A fourth protruding portion having a diameter larger than a diameter of the fourth through-hole is formed at one side end of the fourth vertical portion that is disposed inside the fourth support portion through the fourth through-hole, one side end of a fourth spring is connected to the fourth protruding portion, and the other side end of the fourth spring is inserted into a groove formed inside the fourth support portion. The fourth vertical portion may linearly reciprocate in the second direction by elasticity of the fourth spring. A fourth top cover that covers the upper end surface of the first mobile phone 200 is disposed at the other side end of the fourth vertical portion.

The first to fourth vertical portions applied to the third embodiment of the present invention may be operated by an operation principle which is similar to the operation principle of the first to fourth vertical portions described above with reference to the second embodiment of the present invention.

That is, the first to fourth support portions linearly reciprocate due to elasticity of springs that causes the springs to compress or extend and then extend or compress in a longitudinal direction thereof in the second embodiment of the present invention, but, in the third embodiment of the present invention, the first to fourth support portions linearly reciprocate due to elasticity of springs that causes one side end of each spring to compress or extend and then extend or compress.

Even in the third embodiment, the first to fourth support portions may each constitute a single rail as illustrated in FIG. 21 or constitute two or more rails.

Figure 24:
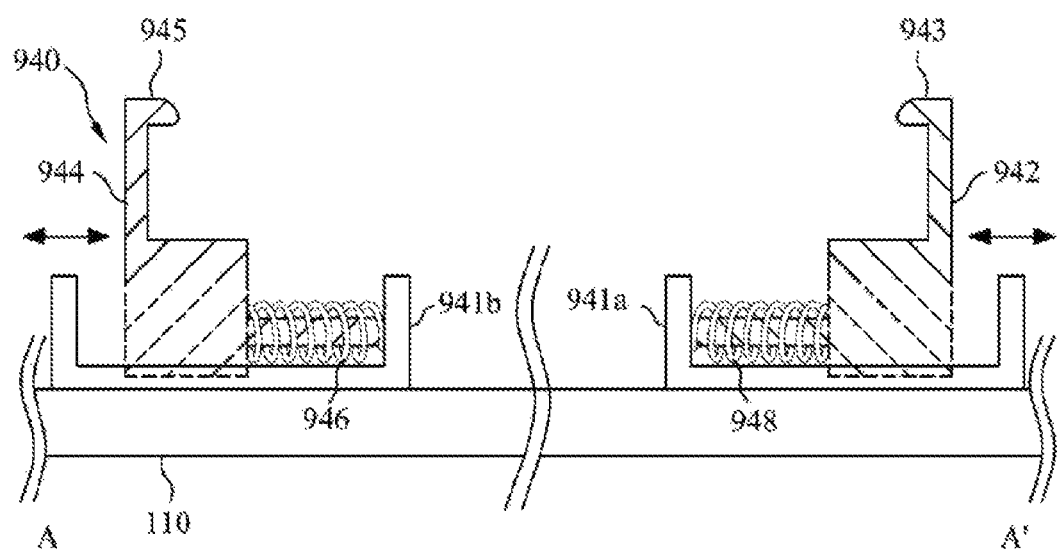
FIG. 24 is an exemplary view illustrating a cross-section of a mobile phone case according to yet another embodiment of the present invention.

FIG. 24 is an exemplary view illustrating a cross-section of a mobile phone case according to a fourth embodiment of the present invention. Particularly, FIG. 24 is an exemplary view illustrating a cross-section of the mobile phone case taken along line A-A' illustrated in FIG. 21. Hereinafter, elements which are the same as those described above with reference to FIGS. 13 to 23 will be denoted by like reference numerals, and in the following descriptions, contents identical or similar to those described above with reference to FIGS. 13 to 23 will be omitted or briefly described. However, in the following descriptions of the mobile phone case according to the fourth embodiment of the present invention, the first support means, which has been denoted by the reference numeral 930 in FIGS. 21 and 23, will be denoted by the reference numeral 940. Particularly, among the first support means 940 and the second support means, the first support means 940 will be mainly described herein.

As illustrated in FIGS. 21 and 24, the mobile phone case according to the fourth embodiment of the present invention includes a first case 110 having the first support means 940 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 940 and the second support means is changeable.

For example, as illustrated in FIGS. 21 and 24, the first support means 940 includes a first support portion 941a mounted on one side of a first surface of the first case 110 in a first direction, a first vertical portion 942 mounted on the first support portion so as to be able to linearly reciprocate in the first direction by elasticity of a spring, a second support portion 941b mounted on the other side of the first surface of the first case 110 in the first direction and disposed side by side with the first support portion, a second vertical portion 944 mounted on the second support portion so as to be able to linearly reciprocate in the first direction by elasticity of a spring, a third support portion mounted on one side of the first surface of the first case 110 in a second direction perpendicular to the first direction, a third vertical portion mounted on the third support portion so as to be able to linearly reciprocate in the second direction by elasticity of a spring, a fourth support portion mounted on the other side of the first surface of the first case 110 in the second direction and disposed side by side with the third support portion, and a fourth vertical portion mounted on the fourth support portion so as to be able to linearly reciprocate in the second direction by elasticity of a spring.

Here, a first groove is formed in the first support portion 941a in the first direction, a second groove is formed in the second support portion 941b in the first direction, a third groove is formed in the third support portion in the second direction, and a fourth groove is formed in the fourth support portion in the second direction.

The first vertical portion 942 linearly reciprocates in the first direction along an outer circumferential surface of the first support portion 941a, one side end of a first spring 948 is connected to one side end of the first support portion that is disposed in the first groove, and the other side end of the first spring is connected to the first groove. The first vertical portion may linearly reciprocate in the first direction by elasticity of the first spring 948. A first top cover 943 that covers an upper end surface of the first mobile phone 200 is disposed at the other side end of the first vertical portion.

The second vertical portion 944 linearly reciprocates in the first direction along an outer circumferential surface of the second support portion 941b, one side end of a second spring 946 is connected to one side end of the second support portion that is disposed in the second groove, and the other side end of the second spring is connected to the second groove. The second vertical portion may linearly reciprocate in the first direction by elasticity of the second spring 946. A second top cover 945 that covers the upper end surface of the first mobile phone 200 is disposed at the other side end of the second vertical portion.

The third vertical portion linearly reciprocates in the second direction along an outer circumferential surface of the third support portion, one side end of a third spring is connected to one side end of the third support portion that is disposed in the third groove, and the other side end of the third spring is connected to the third groove. The third vertical portion may linearly reciprocate in the second direction by elasticity of the third spring. A third top cover that covers the upper end surface of the first mobile phone 200 is disposed at the other side end of the third vertical portion.

The fourth vertical portion linearly reciprocates in the second direction along an outer circumferential surface of the fourth support portion, one side end of a fourth spring is connected to one side end of the fourth support portion that is disposed in the fourth groove, and the other side end of the fourth spring is connected to the fourth groove. The fourth vertical portion may linearly reciprocate in the second direction by elasticity of the fourth spring. A fourth top cover that covers the upper end surface of the first mobile phone 200 is disposed at the other side end of the fourth vertical portion.

The first to fourth vertical portions applied to the fourth embodiment of the present invention may be operated by an operation principle which is the same as the operation principle of the first to fourth vertical portions described above with reference to the first and second embodiments of the present invention.

Even in the fourth embodiment, the first to fourth support portions may each constitute a single rail as illustrated in FIG. 21 or constitute two or more rails.

Figure 25:
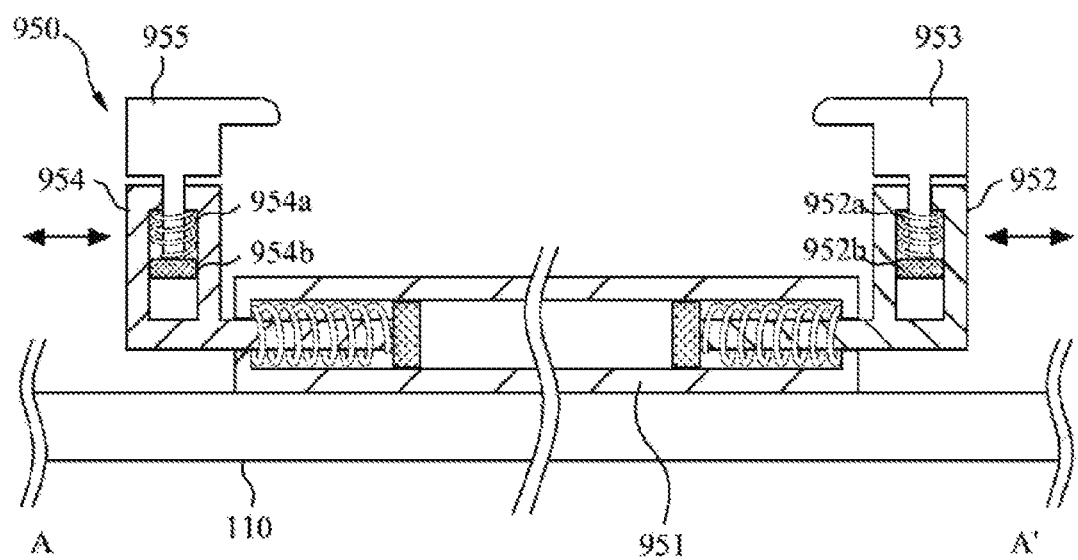
FIG. 25 is an exemplary view illustrating a cross-section of a mobile phone case according to yet another embodiment of the present invention.

FIG. 25 is an exemplary view illustrating a cross-section of a mobile phone case according to a fifth embodiment of the present invention. Particularly, FIG. 25 is an exemplary view illustrating a cross-section of the mobile phone case taken along line A-A' illustrated in FIG. 13 or FIG. 21. Hereinafter, elements which are the same as those described above with reference to FIGS. 13 to 24 will be denoted by like reference numerals, and in the following descriptions, contents identical or similar to those described above with reference to FIGS. 13 to 24 will be omitted or briefly described. However, in the following descriptions of the mobile phone case according to the fifth embodiment of the present invention, the first support means, which has been described above, will be denoted by the reference numeral 950. Particularly, among the first support means 950 and the second support means, the first support means 950 will be mainly described herein.

As illustrated in FIG. 25, the mobile phone case according to the fifth embodiment of the present invention includes a first case 110 having the first support means 950 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 950 and the second support means is changeable.

Particularly, in the fifth embodiment, a length of at least one of the first support means 950 and the second support means may be changeable in a direction perpendicular to a plane of the first case 110 or the second case 120.

For example, as illustrated in FIG. 25, the first support means 950 includes a support portion 951 mounted on a first surface of the first case 110, a first vertical portion 952 mounted on the support portion 951 in the first direction so as to be able to linearly reciprocate in the first direction by elasticity of a spring, a first top cover 953 mounted on an end of the first vertical portion so as to be able to linearly reciprocate in a direction perpendicular to a first plane and configured to cover an upper end surface of the first mobile phone 200, a second vertical portion 954 configured to face the first vertical portion 952 and mounted on the support portion 951 so as to be able to linearly reciprocate in the first direction by elasticity of a spring, a second top cover 955 mounted on an end of the second vertical portion so as to be able to linearly reciprocate in the direction perpendicular to the first plane and configured to cover the upper end surface of the first mobile phone 200, a third vertical portion mounted on the support portion 951 in a second direction perpendicular to the first direction so as to be able to linearly reciprocate in the second direction by elasticity of a spring, a third top cover mounted on an end of the third vertical portion so as to be able to linearly reciprocate in the direction perpendicular to the first plane and configured to cover the upper end surface of the first mobile phone 200, a fourth vertical portion configured to face the third vertical portion and mounted on the support portion 951 so as to be able to linearly reciprocate in the second direction by elasticity of a spring, and a fourth top cover mounted on an end of the fourth vertical portion so as to be able to linearly reciprocate in the direction perpendicular to the first plane and configured to cover the upper end surface of the first mobile phone 200.

The first to fourth vertical portions may be formed in the same shapes as the first to fourth vertical portions according to any one of the first to fourth embodiments described above.

Here, a first vertical hole is formed in the first vertical portion 952 in a direction perpendicular to the first surface, a second vertical hole is formed in the second vertical portion 954 in the direction perpendicular to the first surface, a third vertical hole is formed in the third vertical portion in the direction perpendicular to the first surface, and a fourth vertical hole is formed in the fourth vertical portion in the direction perpendicular to the first surface.

A first vertical protruding portion 952b having a diameter larger than a diameter of the first vertical hole is formed at one side end of the first top cover 953 that is disposed inside the first vertical portion 952 through the first vertical hole, and a first vertical spring 952a is mounted on an outer circumferential surface of the first top cover that is disposed between the first vertical protruding portion and the first vertical through-hole. The first top cover may linearly reciprocate in the direction perpendicular to the first surface by elasticity of the first vertical spring 952a.

A second vertical protruding portion 954b having a diameter larger than a diameter of the second vertical hole is formed at one side end of the second top cover 955 that is disposed inside the second vertical portion 954 through the second vertical hole, and a second vertical spring 954a is mounted on an outer circumferential surface of the second top cover that is disposed between the second vertical protruding portion and the second vertical through-hole. The second top cover may linearly reciprocate in the direction perpendicular to the first surface by elasticity of the second vertical spring 954a.

A third vertical protruding portion having a diameter larger than a diameter of the third vertical hole is formed at one side end of the third top cover that is disposed inside the third vertical portion through the third vertical hole, and a third vertical spring is mounted on an outer circumferential surface of the third top cover that is disposed between the third vertical protruding portion and the third vertical through-hole. The third top cover may linearly reciprocate in the direction perpendicular to the first surface by elasticity of the third vertical spring.

A fourth vertical protruding portion having a diameter larger than a diameter of the fourth vertical hole is formed at one side end of the fourth top cover that is disposed inside the fourth vertical portion through the fourth vertical hole, and a fourth vertical spring is mounted on an outer circumferential surface of the fourth top cover that is disposed between the fourth vertical protruding portion and the fourth vertical through-hole. The fourth top cover may linearly reciprocate in the direction perpendicular to the first surface by elasticity of the fourth vertical spring.

In addition to being formed with the above-described structures, the first to fourth top covers may be formed with structures identical or similar to those of the first to fourth support portions described above with reference to the third and fourth embodiments.

Figure 26:
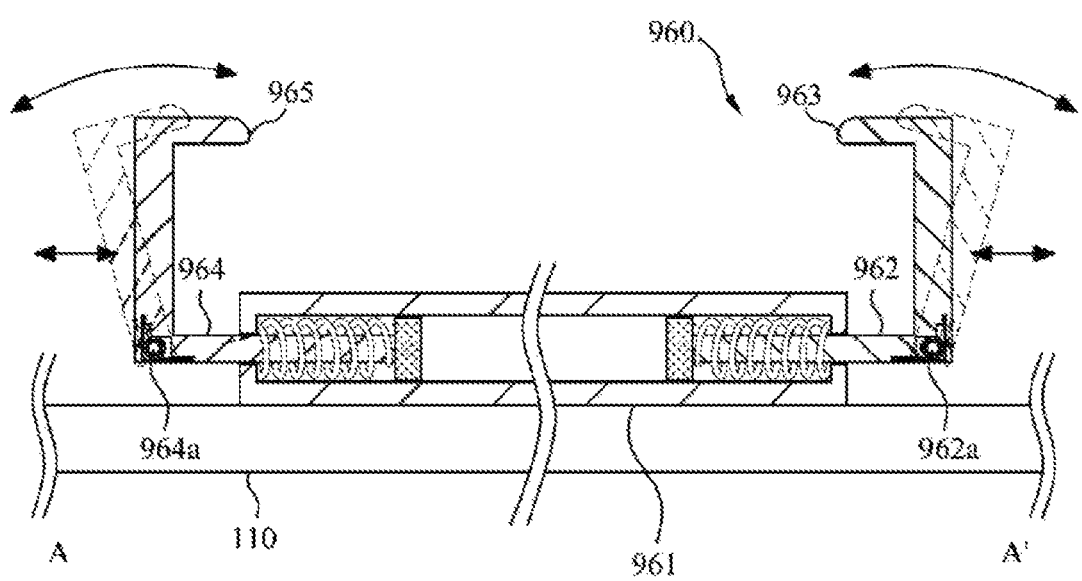
FIG. 26 is an exemplary view illustrating a cross-section of a mobile phone case according to yet another embodiment of the present invention.

FIG. 26 is an exemplary view illustrating a cross-section of a mobile phone case according to a sixth embodiment of the present invention. Particularly, FIG. 26 is an exemplary view illustrating a cross-section of the mobile phone case taken along line A-A' illustrated in FIG. 13 or FIG. 21. Hereinafter, elements which are the same as those described above with reference to FIGS. 13 to 25 will be denoted by like reference numerals, and in the following descriptions, contents identical or similar to those described above with reference to FIGS. 13 to 25 will be omitted or briefly described. However, in the following descriptions of the mobile phone case according to the sixth embodiment of the present invention, the first support means, which has been described above, will be denoted by the reference numeral 960. Particularly, among the first support means 960 and the second support means, the first support means 960 will be mainly described herein.

As illustrated in FIG. 26, the mobile phone case according to the sixth embodiment of the present invention includes a first case 110 having the first support means 960 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 960 and the second support means is changeable.

Particularly, in the sixth embodiment, at least one top cover among top covers constituting the first support means 960 and the second support means rotates at an angle greater than 0° and less than 180° from a plane of the first case 110 or the second case 120, and the top covers cover side surfaces and an upper end surface of the first mobile phone 200 or the second mobile phone 300.

For example, as illustrated in FIG. 26, the first support means 960 includes a support portion 961 mounted on a first surface of the first case 110, a first vertical portion 962 mounted on the support portion 961 in the first direction so as to be able to linearly reciprocate in the first direction by elasticity of a spring, a first top cover 963 mounted on an end of the first vertical portion so as to be able to rotate at an angle greater than 0° and less than 180° from a first plane and configured to cover an upper end surface of the first mobile phone 200, a second vertical portion 964 configured to face the first vertical portion 962 and mounted on the support portion 961 so as to be able to linearly reciprocate in the first direction by elasticity of a spring, a second top cover 965 mounted on an end of the second vertical portion so as to be able to rotate at an angle greater than 0° and less than 180° from the first plane and configured to cover the upper end surface of the first mobile phone 200, a third vertical portion mounted on the support portion 961 in a second direction perpendicular to the first direction so as to be able to linearly reciprocate in the second direction by elasticity of a spring, a third top cover mounted on an end of the third vertical portion so as to be able to rotate at an angle greater than 0° and less than 180° from the first plane and configured to cover the upper end surface of the first mobile phone 200, a fourth vertical portion configured to face the third vertical portion and mounted on the support portion 961 so as to be able to linearly reciprocate in the second direction by elasticity of a spring, and a fourth top cover mounted on an end of the fourth vertical portion so as to be able to rotate at an angle greater than 0° and less than 180° from the first plane and configured to cover the upper end surface of the first mobile phone 200.

The first to fourth vertical portions may be formed in the same shapes as the first to fourth vertical portions according to any one of the first to fourth embodiments described above. However, the first to fourth vertical portions may be fixed to the support portion 961 at predetermined lengths. That is, in the sixth embodiment, the top covers may allow mobile phones of various widths to be mounted on the first support means or the second support means.

One side end of a first spring 962a is inserted into a groove formed inside one side end of the first top cover 963, and the other side end of the first spring is inserted into a groove formed inside the first vertical portion 962. The first top cover may rotate at an angle greater than 0° and less than 180° from the first plane by elasticity of the first spring 962a.

One side end of a second spring 964a is inserted into a groove formed inside one side end of the second top cover 965, and the other side end of the second spring is inserted into a groove formed inside the second vertical portion 964. The second top cover may rotate at an angle greater than 0° and less than 180° from the first plane by elasticity of the second spring 964a.

One side end of a third spring is inserted into a groove formed inside one side end of the third top cover, and the other side end of the third spring is inserted into a groove formed inside the third vertical portion. The third top cover may rotate at an angle greater than 0° and less than 180° from the first plane by elasticity of the third spring.

One side end of a fourth spring is inserted into a groove formed inside one side end of the fourth top cover, and the other side end of the fourth spring is inserted into a groove formed inside the fourth vertical portion. The fourth top cover may rotate at an angle greater than 0° and less than 180° from the first plane by elasticity of the fourth spring.

Figure 27:
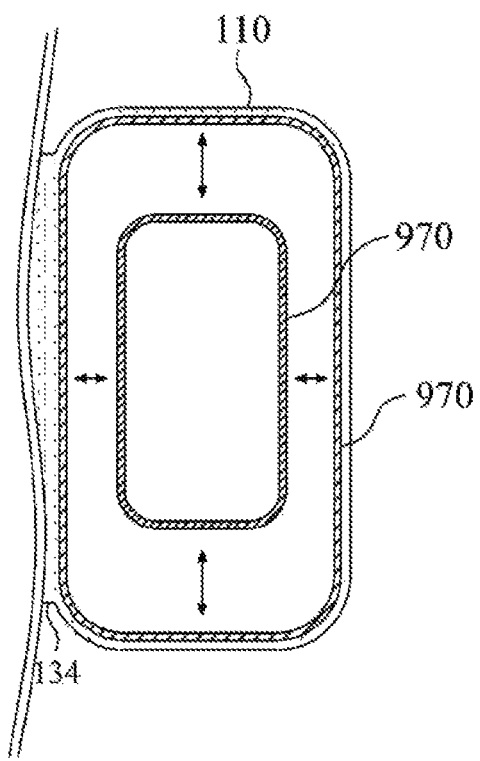
FIG. 27 is an exemplary view illustrating a cross-section of a mobile phone case according to yet another embodiment of the present invention.

FIG. 27 is an exemplary view illustrating a cross-section of a mobile phone case according to a seventh embodiment of the present invention. Particularly, FIG. 27 is an exemplary view illustrating a first support means 970 mounted on a first surface of a first case 110. Hereinafter, elements which are the same as those described above with reference to FIGS. 13 to 26 will be denoted by like reference numerals, and in the following descriptions, contents identical or similar to those described above with reference to FIGS. 13 to 26 will be omitted or briefly described. However, in the following descriptions of the mobile phone case according to the seventh embodiment of the present invention, the first support means, which has been described above, will be denoted by the reference numeral 970. Particularly, among the first support means 970 and the second support means, the first support means 970 will be mainly described herein.

As illustrated in FIG. 27, the mobile phone case according to the seventh embodiment of the present invention includes a first case 110 having the first support means 970 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 970 and the second support means is changeable.

Particularly, in the seventh embodiment, at least any one of the first support means 970 and the second support means is formed of a material having elasticity, e.g., a silicon material, such that a vertical width and a horizontal width thereof are changeable.

Also, a length of at least any one of the first support means 970 and the second support means is changeable in a direction perpendicular to a first plane or a second plane.

Figure 28:
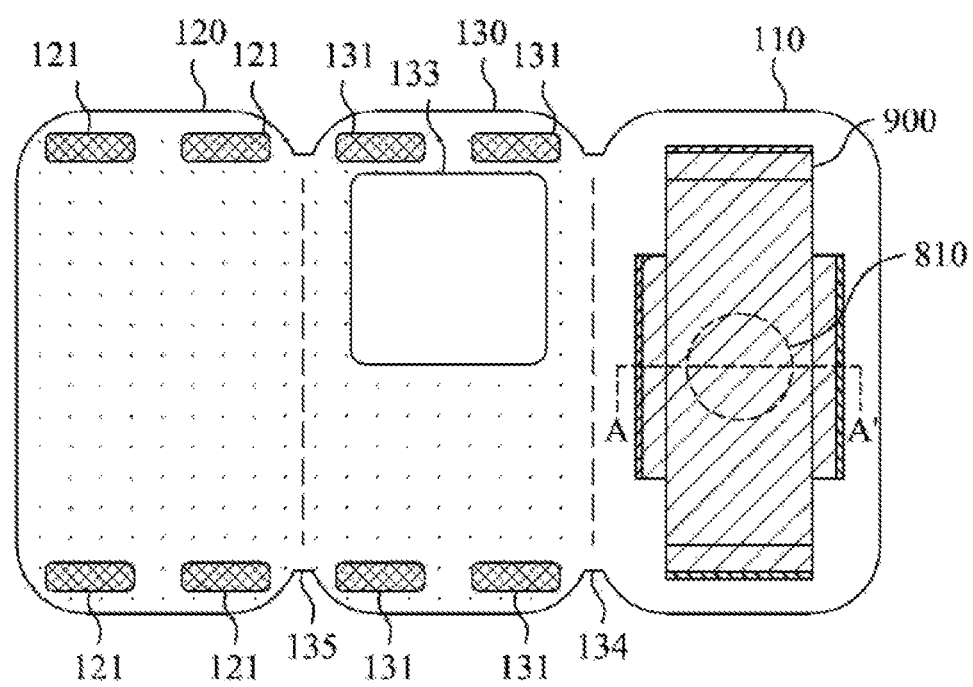
FIGS. 28 to 31 are exemplary views illustrating cross-sections of a mobile phone case according to yet another embodiment of the present invention.
Figure 29:
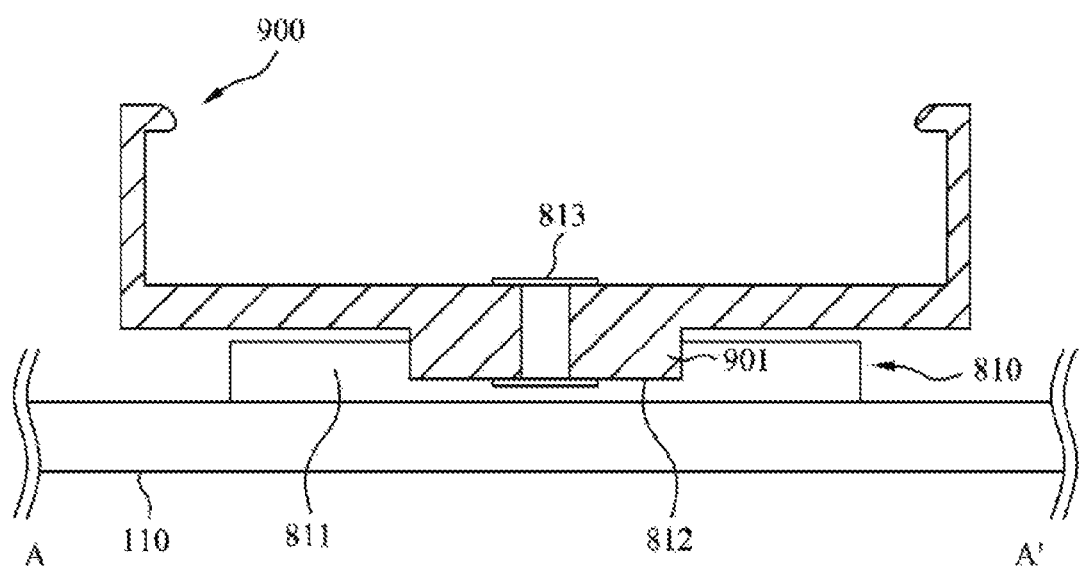
Figure 30:
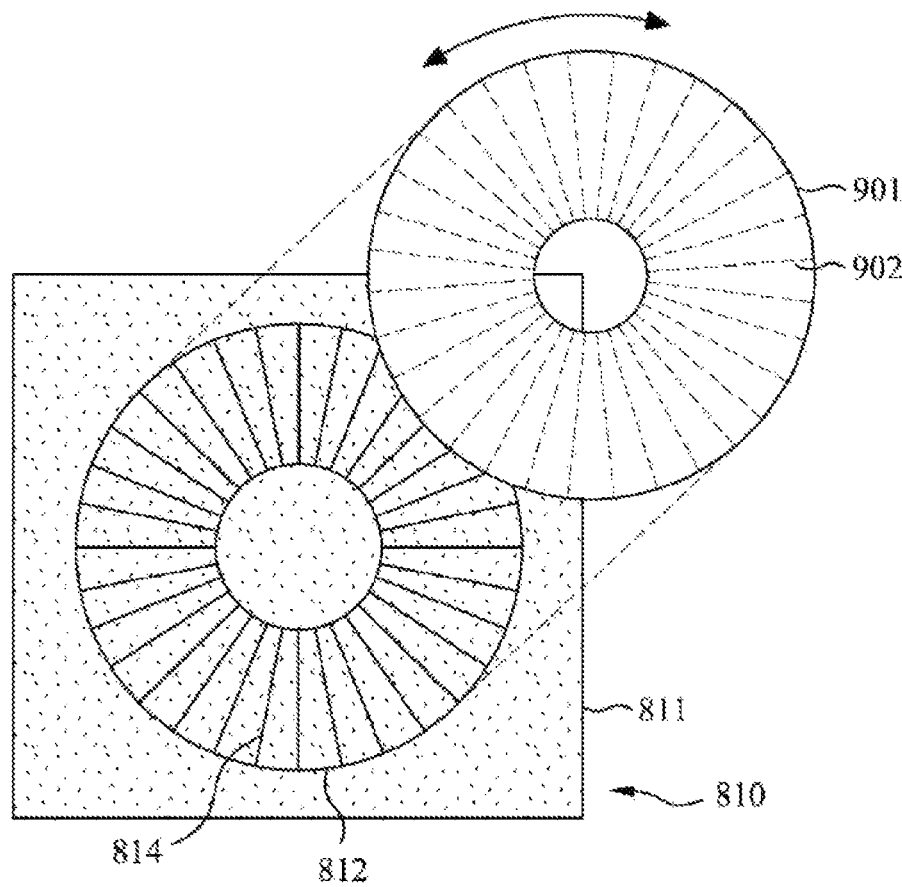
Figure 31:
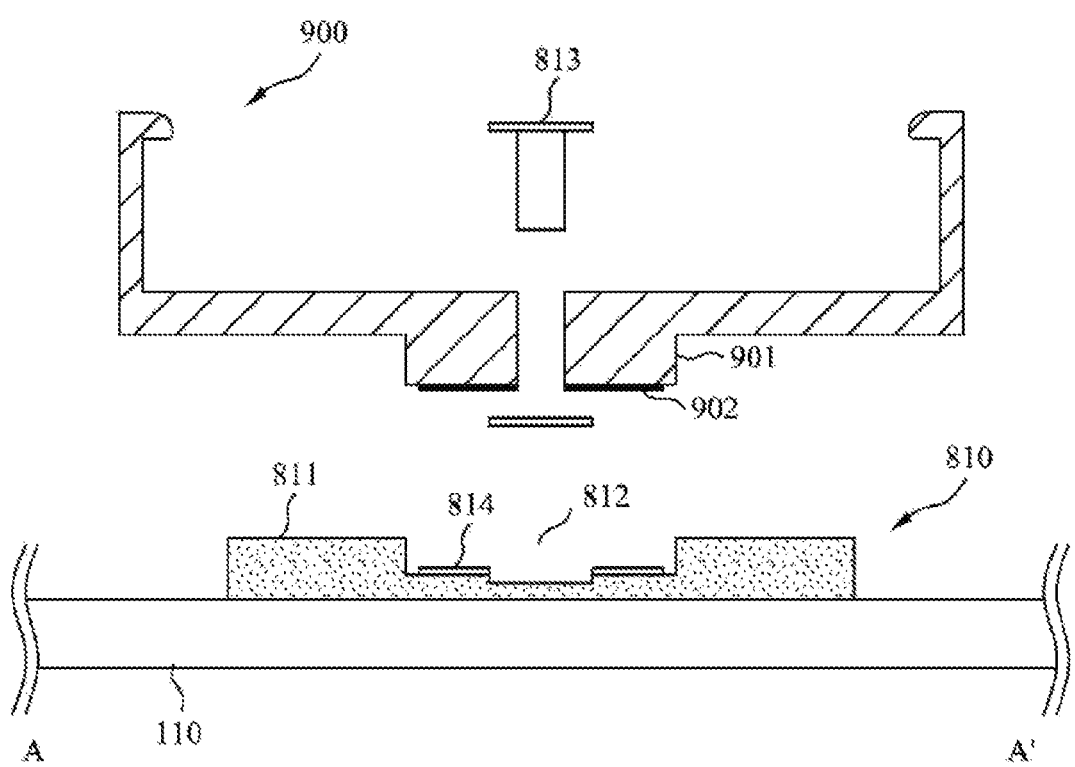

FIGS. 28 to 31 are exemplary views illustrating cross-sections of a mobile phone case according to an eighth embodiment of the present invention. Particularly, FIG. 29 is an exemplary view illustrating a cross-section of the mobile phone case taken along line A-A' of FIG. 28, FIG. 30 is an exemplary view schematically illustrating a plane of a first rotating portion 810 illustrated in FIG. 29, and FIG. 31 is an exploded view of the first rotating portion 810 and a first support means illustrated in FIG. 29. Hereinafter, elements which are the same as those described above with reference to FIGS. 13 to 27 will be denoted by like reference numerals, and in the following descriptions, contents identical or similar to those described above with reference to FIGS. 13 to 27 will be omitted or briefly described. Particularly, in FIGS. 28 to 31, the first support means, which has been described above with reference to FIGS. 13 to 27, is denoted by the reference numeral 900. That is, each of the first support means 900 and the second support means applied to the eighth embodiment may be formed in the shape of any one of the first support means and the second support means described above with reference to the first to seventh embodiments.

As illustrated in FIGS. 28 to 31, the mobile phone case according to the eighth embodiment of the present invention includes a first case 110 having the first support means 900 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 900 and the second support means is changeable.

Particularly, in the eighth embodiment, at least any one of the first support means 900 and the second support means may rotate along a plane of the first case 110 or the second case 120, e.g., rotate while being parallel with the plane.

However, at least one of the first support means 900 and the second support means may rotate along the plane while being at a predetermined angle from the plane of the first case 110 or the second case 120. Even in the following embodiments, at least one of the first support means 900 and the second support means may rotate along the plane while being at a predetermined angle from the plane of the first case 110 or the second case 120.

To this end, the mobile phone case according to the eighth embodiment of the present invention further includes the first rotating portion 810 mounted on the first case 110 so as to allow the first support means 900 to rotate while being parallel with the plane of the first case 110 and a second rotating portion mounted on the second case 120 so as to allow the second support means to rotate while being parallel with the plane of the second case 120.

For example, the first rotating portion 810 includes a main body 811 which is mounted on the first case 110 and has a groove 812 formed therein, into which a protruding portion 901 protruding from a lower end surface of the first support means 900 is inserted, and a rotating shaft 813 configured to rotatably mount the protruding portion in the groove.

In this case, first protrusions 814 are formed on a plane of the groove 812 so as to radially protrude therefrom, and second protrusions 902 are formed on a bottom surface of the protruding portion 901 so as to radially protrude therefrom so that the second protrusions 902 are able to be engaged with the first protrusions.

The rotating shaft 813 allows the first support means 900 to rotate while being fixed to the first rotating portion 810, and friction between the first protrusions and the second protrusions allows the first support means 900 to be fixed in a rotated state after rotating at a predetermined angle.

Figure 32:
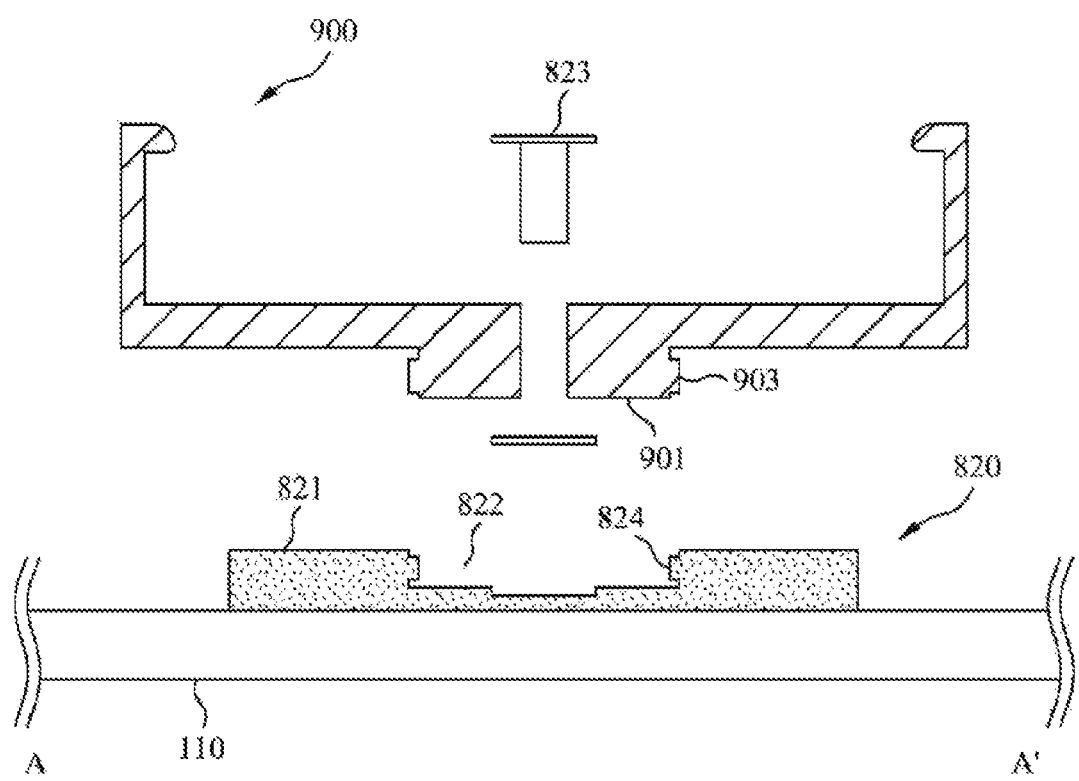
FIGS. 32 to 34 are exemplary views illustrating cross-sections of a mobile phone case according to yet another embodiment of the present invention.
Figure 33:
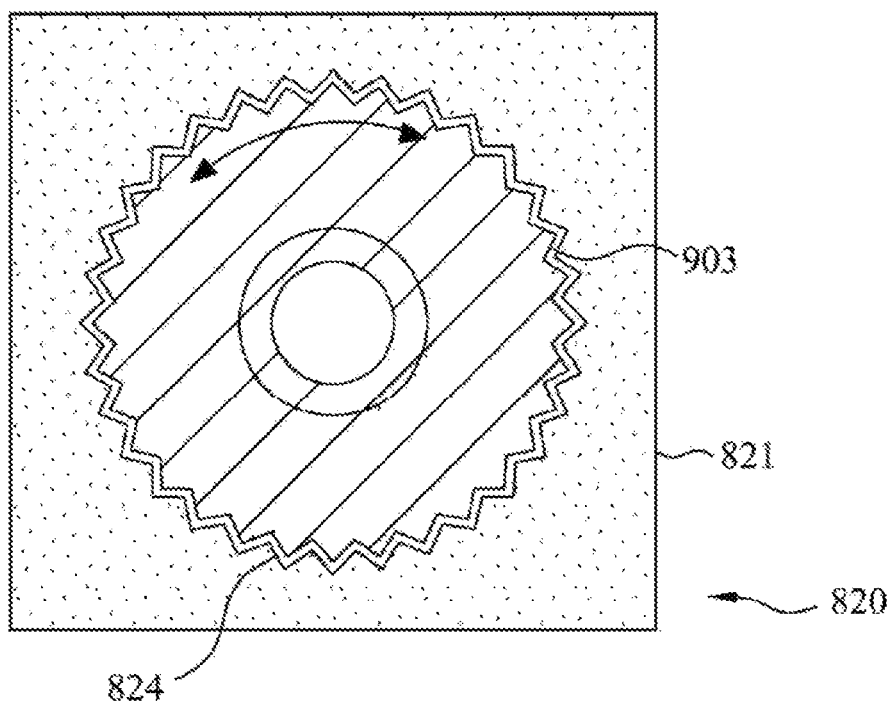
Figure 34:
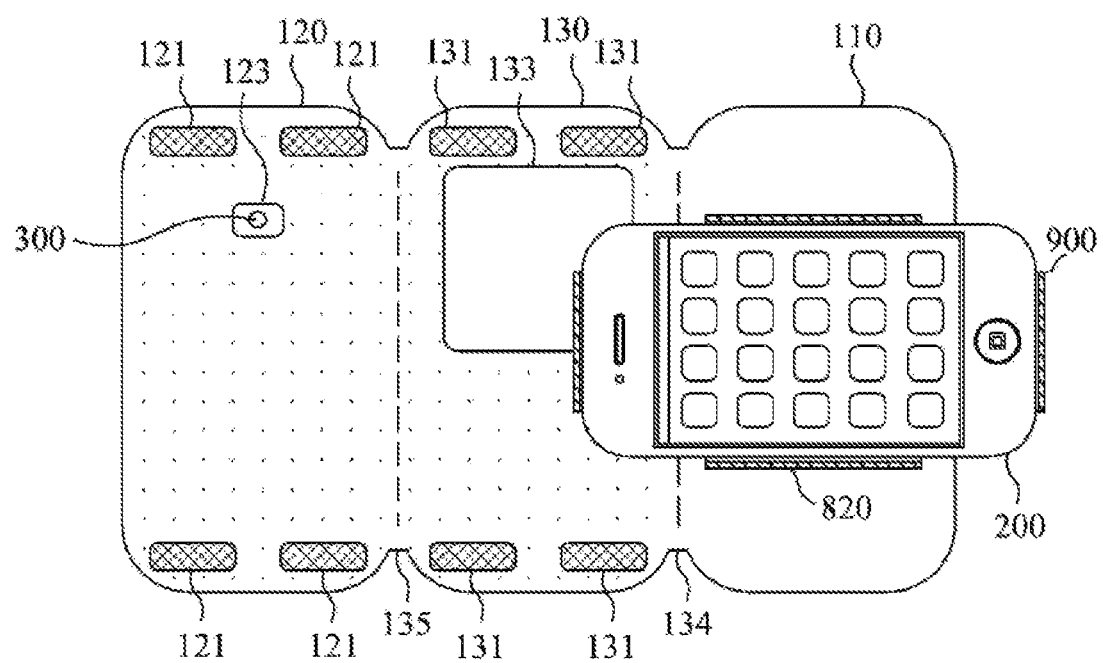

FIGS. 32 to 34 are exemplary views illustrating cross-sections of a mobile phone case according to a ninth embodiment of the present invention. Particularly, FIG. 32 is an exemplary view illustrating a cross-section of the mobile phone case taken along line A-A' of FIG. 28, FIG. 33 is an exemplary view schematically illustrating a plane of a first rotating portion 820 illustrated in FIG. 32, and FIG. 34 is an exemplary view illustrating a state in which a first mobile phone 200 is rotated by the first rotating portion 820 of a first support means 900. Hereinafter, elements which are the same as those described above with reference to FIGS. 13 to 27 will be denoted by like reference numerals, and in the following descriptions, contents identical or similar to those described above with reference to FIGS. 13 to 27 will be omitted or briefly described. Particularly, in FIGS. 32 to 34, the first support means, which has been described above with reference to FIGS. 13 to 27, is denoted by the reference numeral 900. That is, each of the first support means 900 and the second support means applied to the ninth embodiment may be formed in the shape of any one of the first support means and the second support means described above with reference to the first to seventh embodiments. Also, the first rotating portion, which has been denoted by the reference numeral 810 in FIGS. 28 to 31, is denoted by the reference numeral 820 in FIGS. 32 to 34.

As illustrated in FIGS. 32 to 34, the mobile phone case according to the ninth embodiment of the present invention includes a first case 110 having the first support means 900 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 900 and the second support means is changeable.

Particularly, in the ninth embodiment, at least one of the first support means 900 and the second support means may rotate while being parallel with a plane of the first case 110 or the second case 120.

To this end, the mobile phone case according to the ninth embodiment of the present invention further includes the first rotating portion 820 mounted on the first case 110 so as to allow the first support means 900 to rotate while being parallel with the plane of the first case 110 and a second rotating portion mounted on the second case 120 so as to allow the second support means to rotate while being parallel with the plane of the second case 120.

For example, the first rotating portion 820 includes a main body 821 which is mounted on the first case 110 and has a groove 822 formed therein, into which a protruding portion 901 protruding from a lower end surface of the first support means 900 is inserted, and a rotating shaft 823 configured to rotatably mount the protruding portion in the groove.

In this case, first sawteeth 824 are formed on a side surface of the groove 822, and second sawteeth 903, which are able to rotate while being engaged with the first sawteeth, are formed at an outer circumferential surface of the protruding portion 901.

The rotating shaft 823 allows the first support means 900 to rotate while being fixed to the first rotating portion 820, and friction between the first sawteeth and the second sawteeth allows the first support means 900 to be fixed in a rotated state after rotating at a predetermined angle.

Meanwhile, with regards to means of rotation, rotation may occur solely by friction without the protrusions, sawteeth, or stepping gears. During manual rotation using a rotating shaft, rotation may be forcibly caused by a force greater than friction. Such circumstances also belong to the present invention.

Figure 35:
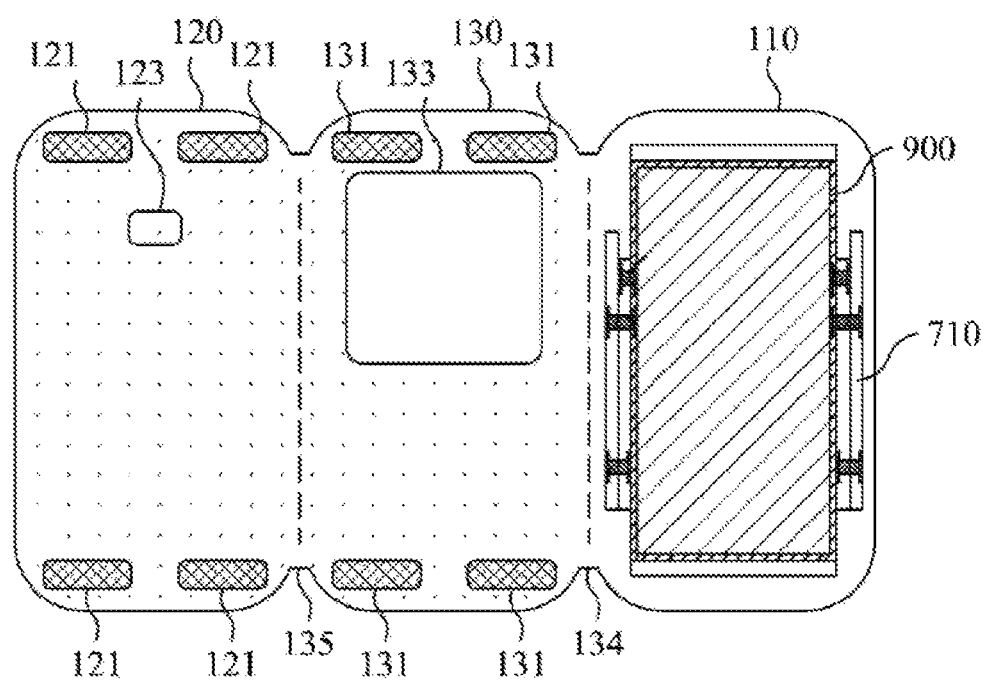
FIGS. 35 to 37 are exemplary views illustrating cross-sections of a mobile phone case according to yet another embodiment of the present invention.
Figure 36:
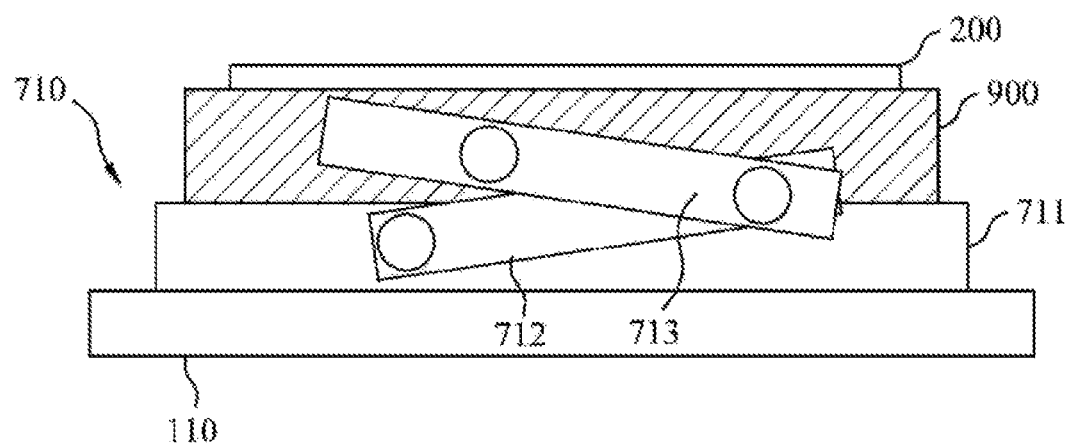
Figure 37:
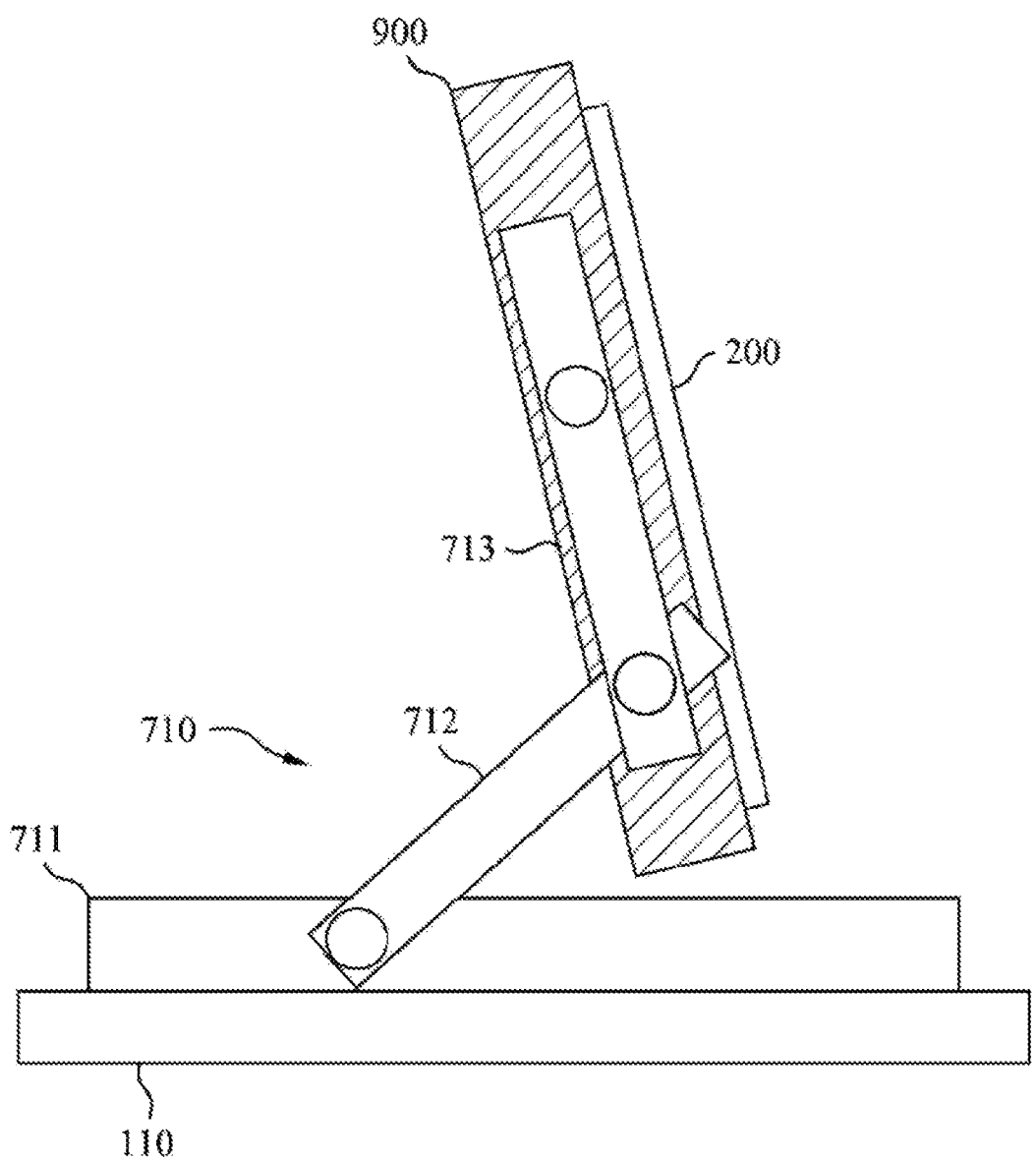

FIGS. 35 to 37 are exemplary views illustrating cross-sections of a mobile phone case according to a tenth embodiment of the present invention. Particularly, FIG. 35 is an exemplary view illustrating first surfaces of the mobile phone case according to the tenth embodiment, FIG. 36 is an exemplary view illustrating a state before a first support means applied to the tenth embodiment rotates at an angle greater than 0° and less than 180° from a plane of a first case 110, and FIG. 37 is an exemplary view illustrating a state in which the first support means 900 applied to the tenth embodiment is rotated at an angle greater than 0° and less than 180° from the plane of the first case 110. Hereinafter, elements which are the same as those described above with reference to FIGS. 13 to 27 will be denoted by like reference numerals, and in the following descriptions, contents identical or similar to those described above with reference to FIGS. 13 to 27 will be omitted or briefly described. Particularly, in FIGS. 35 to 37, the first support means, which has been described above with reference to FIGS. 13 to 27, is denoted by the reference numeral 900. That is, each of the first support means 900 and the second support means applied to the tenth embodiment may be formed in the shape of any one of the first support means and the second support means described above with reference to the first to seventh embodiments.

As illustrated in FIGS. 35 to 37, the mobile phone case according to the tenth embodiment of the present invention includes a first case 110 having the first support means 900 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 900 and the second support means is changeable.

Particularly, in the tenth embodiment, at least one of the first support means 900 and the second support means may rotate at an angle greater than 0° and less than 180° from a plane of the first case 110 or the second case 120.

To this end, the mobile phone case according to the tenth embodiment of the present invention further includes a first tilting portion 710 mounted on the first case 110 so as to allow the first support means 900 to rotate at an angle greater than 0° and less than 180° from the plane of the first case 110 and a second tilting portion mounted on the second case 120 so as to allow the second support means to rotate at an angle greater than 0° and less than 180° from the plane of the second case 120.

For example, the first tilting portion 710 includes a main body 711 mounted on the first case 110, first rotary bars 712 rotatably mounted on each of both side surfaces of the main body, and second rotary bars 713 each having one side end rotatably mounted on the first rotary bar and the other side end rotatably mounted on both side surfaces of the first support means 900.

By rotating the first rotary bars 712 and the second rotary bars 713, the user may rotate the first mobile phone 200 mounted on the first support means 900 at a proper angle and then view an image output from the first mobile phone 200.

Figure 38:
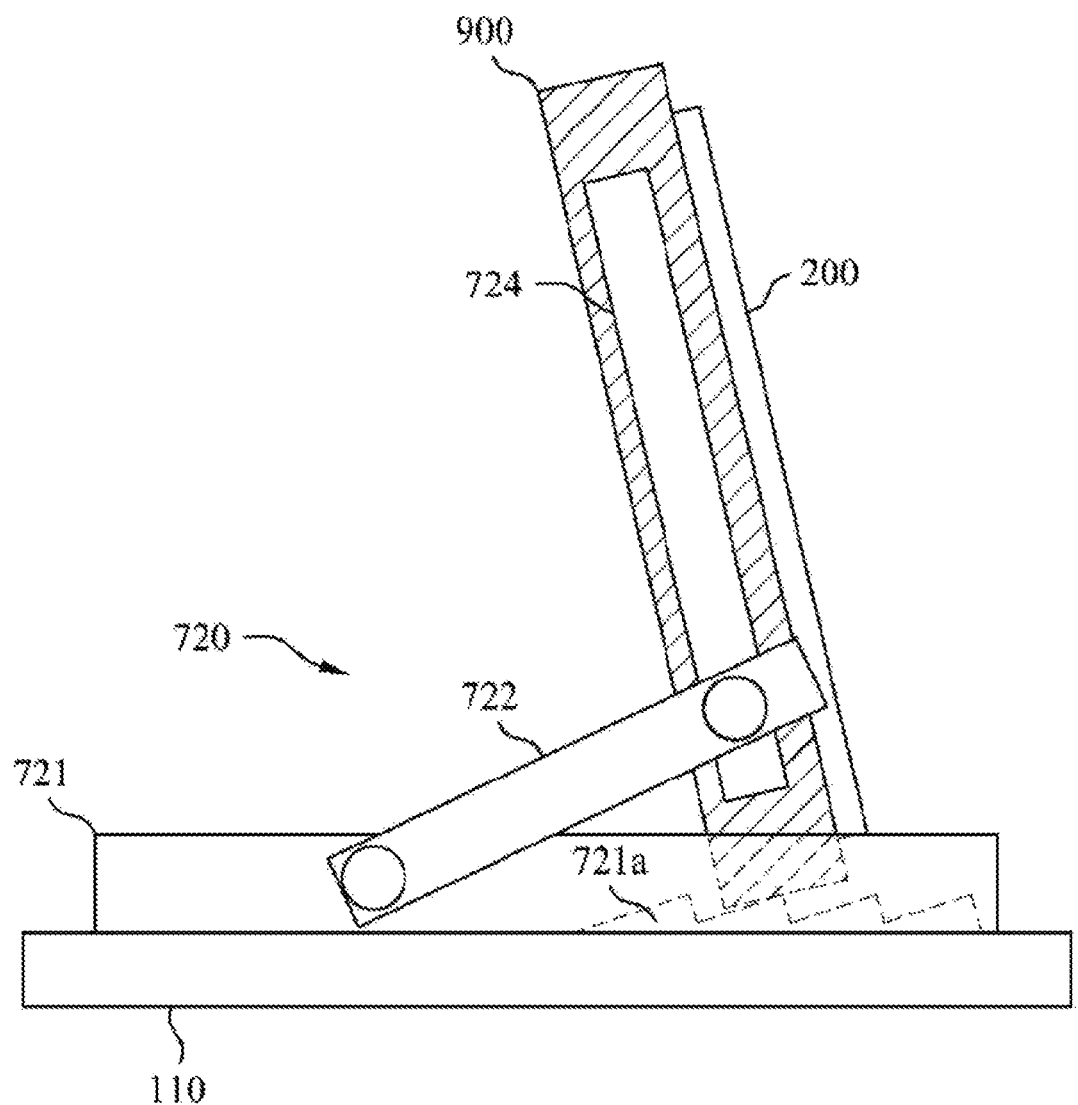
FIG. 38 is an exemplary view illustrating a use state of a mobile phone case according to yet another embodiment of the present invention.

FIG. 38 is an exemplary view illustrating a use state of a mobile phone case according to an eleventh embodiment of the present invention. Hereinafter, elements which are the same as those described above with reference to FIGS. 13 to 27 will be denoted by like reference numerals, and in the following descriptions, contents identical or similar to those described above with reference to FIGS. 13 to 27 will be omitted or briefly described. Particularly, in FIG. 38, the first support means, which has been described above with reference to FIGS. 13 to 27, is denoted by the reference numeral 900. That is, each of the first support means 900 and the second support means applied to the eleventh embodiment may be formed in the shape of any one of the first support means and the second support means described above with reference to the first to seventh embodiments.

As illustrated in FIG. 38, the mobile phone case according to the eleventh embodiment of the present invention includes a first case 110 having the first support means 900 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 900 and the second support means is changeable.

Particularly, in the eleventh embodiment, at least one of the first support means 900 and the second support means may rotate at an angle greater than 0° and less than 180° from a plane of the first case 110 or the second case 120.

To this end, the mobile phone case according to the eleventh embodiment of the present invention further includes a first tilting portion 720 mounted on the first case 110 so as to allow the first support means 900 to rotate at an angle greater than 0° and less than 180° from the plane of the first case 110 and a second tilting portion mounted on the second case 120 so as to allow the second support means to rotate at an angle greater than 0° and less than 180° from the plane of the second case 120.

For example, the first tilting portion 720 includes a main body 721 mounted on the first case 110 and first rotary bars 722 each having one side end rotatably mounted on both side surfaces of the main body and the other side end rotatably mounted on both side surfaces of the first support means 900. A plurality of support grooves 721*a* configured to support an end of the first support means 900 are formed in an upper end surface of the main body 721 or in a plane of a groove formed in the upper end surface of the main body.

By rotating the first rotary bars 722 and then fixing the end of the first support means 900 to any one of the support grooves 721*a*, the user may rotate the first mobile phone 200 mounted on the first support means 900 at a proper angle and then view an image output from the first mobile phone 200.

That is, the support grooves 721*a* may be formed at various intervals and angles so as to allow the first support means 900 to be fixed while being at an angle greater than 0° and less than 180° from a plane of the main body 721.

Also, a guide groove 724, along which a fastening portion configured to fasten the first rotary bars 722 and the first support means 900 is movable, may be formed in both side surfaces of the first support means 900.

By placing the fastening portion at a specific position on the guide groove, the first support means 900 may be at various angles from the plane of the main body 721.

Figure 39:
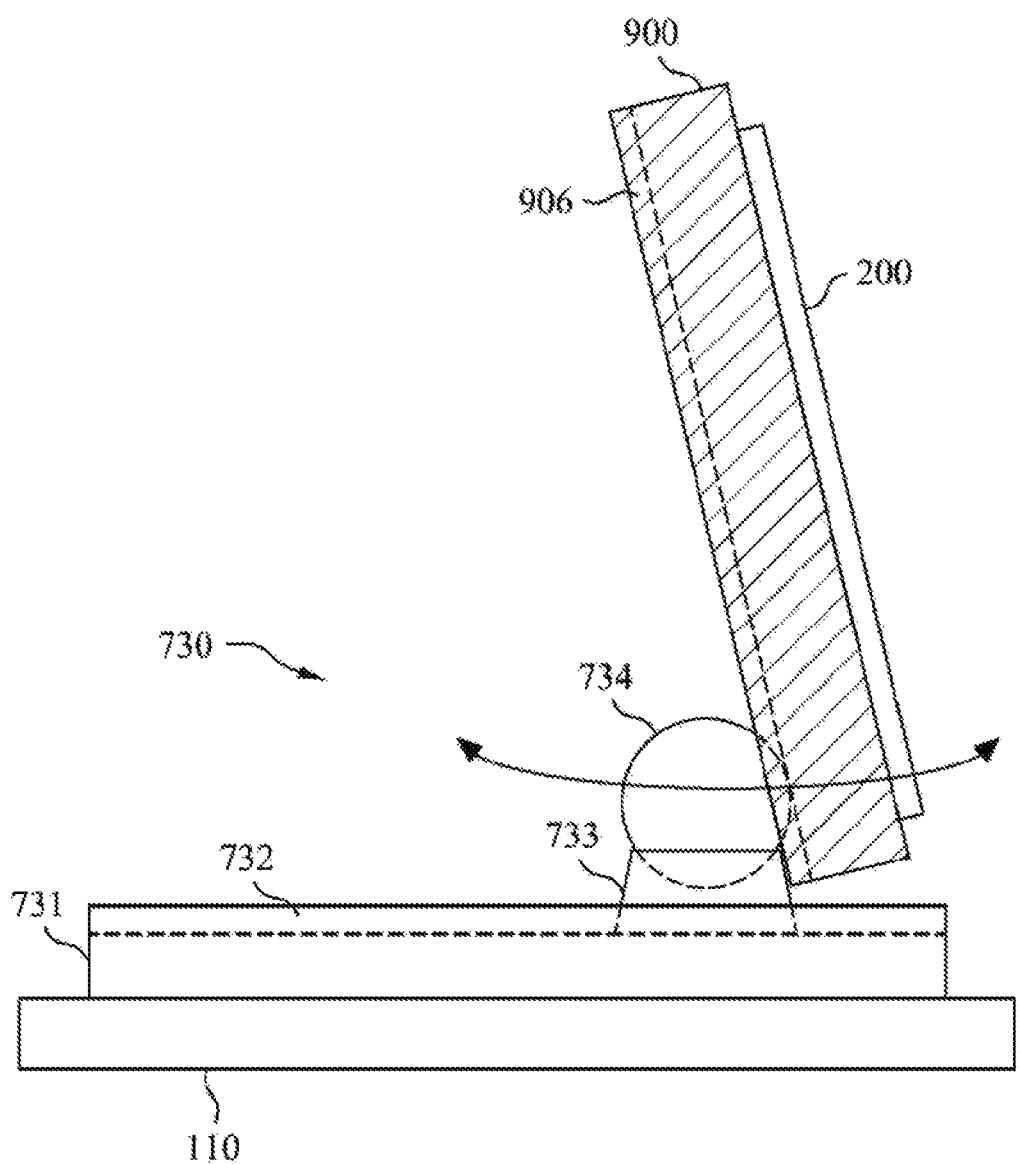
FIGS. 39 and 40 are exemplary views illustrating use states of a mobile phone case according to yet another embodiment of the present invention.
Figure 40:
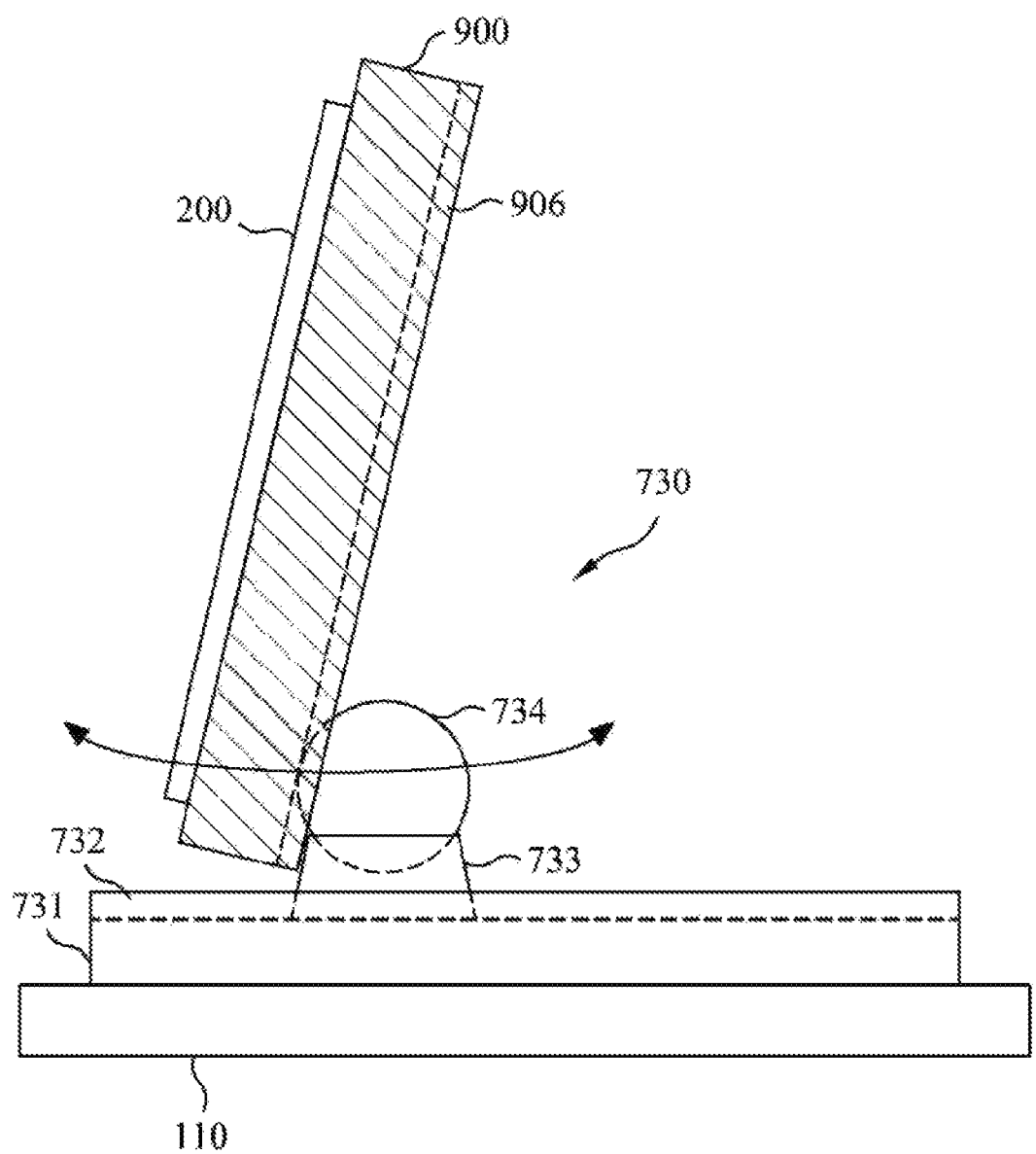

FIGS. 39 and 40 are exemplary views illustrating use states of a mobile phone case according to a twelfth embodiment of the present invention. Hereinafter, elements which are the same as those described above with reference to FIGS. 13 to 27 will be denoted by like reference numerals, and in the following descriptions, contents identical or similar to those described above with reference to FIGS. 13 to 27 will be omitted or briefly described. Particularly, in FIGS. 39 and 40, the first support means, which has been described above with reference to FIGS. 13 to 27, is denoted by the reference numeral 900. That is, each of the first support means 900 and the second support means applied to the twelfth embodiment may be formed in the shape of any one of the first support means and the second support means described above with reference to the first to seventh embodiments.

As illustrated in FIGS. 39 and 40, the mobile phone case according to the twelfth embodiment of the present invention includes a first case 110 having the first support means 900 on which a first mobile phone 200 is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 900 and the second support means is changeable.

Particularly, in the twelfth embodiment, at least one of the first support means 900 and the second support means may rotate at an angle greater than 0° and less than 180° from a plane of the first case 110 or the second case 120.

To this end, the mobile phone case according to the twelfth embodiment of the present invention further includes a first tilting portion 730 mounted on the first case 110 so as to allow the first support means 900 to rotate at an angle greater than 0° and less than 180° from the plane of the first case 110 and a second tilting portion mounted on the second case 120 so as to allow the second support means to rotate at an angle greater than 0° and less than 180° from the plane of the second case 120.

For example, the first tilting portion 730 includes a main body 731 mounted on the first case 110, a pedestal 733 mounted on the main body, and a rotary sphere 734 rotatably mounted on the pedestal and fixed to the first support means 900.

By rotating the rotary sphere 734, the user may rotate the first mobile phone 200 mounted on the first support means 900 at a proper angle and then view an image output from the first mobile phone 200.

Also, a first support means guide groove 906, along which the rotary sphere 734 is movable, may be formed in a bottom surface of the first support means 900.

Also, a main body guide groove 732, along which the pedestal 733 is movable, may be formed in a surface of the main body.

By moving the rotary sphere along the first support means guide groove 906 or moving the pedestal 733 along the main body guide groove 732 in addition to rotating the rotary sphere 734, the user may rotate the first support means 900 at various angles as illustrated in FIGS. 39 and 40.

Figure 41:
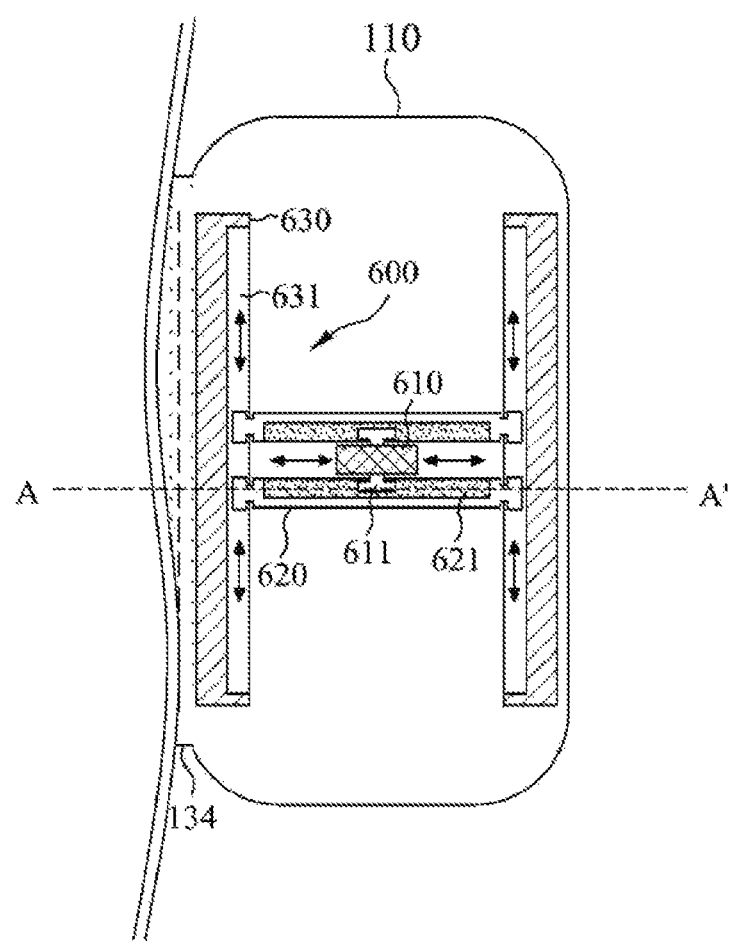
FIGS. 41 and 42 are exemplary views illustrating use states of a mobile phone case according to yet another embodiment of the present invention.
Figure 42:
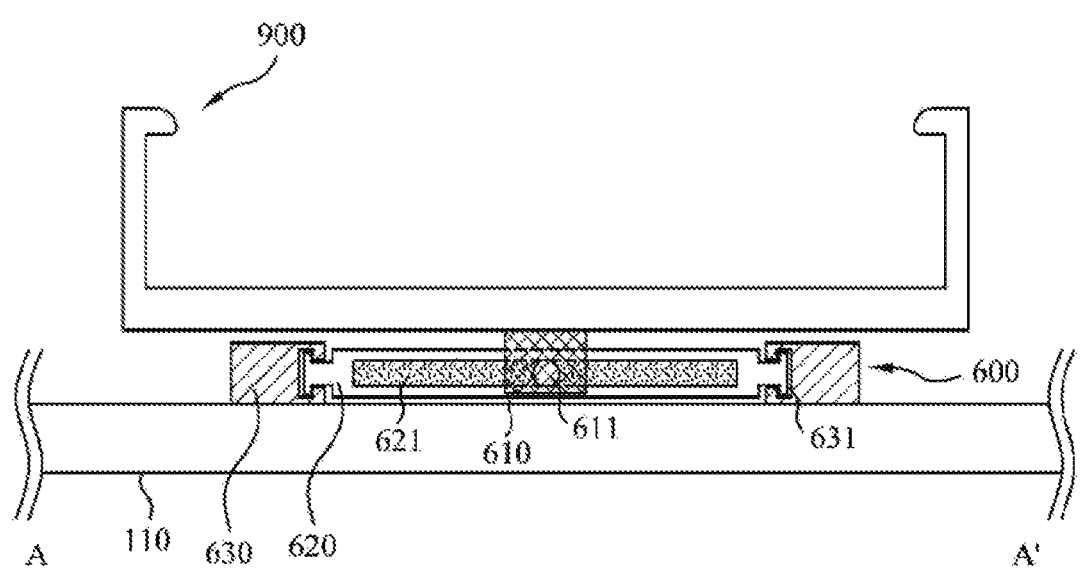

FIGS. 41 and 42 are exemplary views illustrating use states of a mobile phone case according to a thirteenth embodiment of the present invention. Particularly, FIG. 42 is an exemplary view illustrating a cross-section of the mobile phone case taken along line A-A' illustrated in FIG. 41. Hereinafter, elements which are the same as those described above with reference to FIGS. 13 to 27 will be denoted by like reference numerals, and in the following descriptions, contents identical or similar to those described above with reference to FIGS. 13 to 27 will be omitted or briefly described. Particularly, in FIG. 42, the first support means, which has been described above with reference to FIGS. 13 to 27, is denoted by the reference numeral 900. That is, each of the first support means 900 and the second support means applied to the thirteenth embodiment may be formed in the shape of any one of the first support means and the second support means described above with reference to the first to seventh embodiments. Also, the first support means 900 applied to the thirteenth embodiment may further include at least one of the additional elements described above with reference to FIGS. 28 to 40, e.g., the elements denoted by the reference numerals 810, 820, 710, 720, and 730.

As illustrated in FIGS. 41 and 42, the mobile phone case according to the thirteenth embodiment of the present invention includes a first case 110 having the first support means 900 on which a first mobile phone is mounted, a second case 120 having a second support means on which a second mobile phone 300 is mounted, a third case 130 disposed between the first case and the second case and folded so as to serve as a cover that covers each of the first case and the second case, a first connecting portion 134 configured to connect the first case 110 and the third case 130 and allow the third case 130 to cover and protect the first mobile phone stored in the first case 110, and a second connecting portion 135 configured to connect the second case 120 and the third case 130 and allow the third case 130 to cover and protect the second mobile phone stored in the second case 120, wherein a vertical width or a horizontal width of at least one of the first support means 900 and the second support means is changeable.

Particularly, in the thirteenth embodiment, at least one of the first support means 900 and the second support means may be conveyed in the first direction or the second direction on the first case 110 or the second case 120.

To this end, the mobile phone case according to the thirteenth embodiment of the present invention further includes a conveying portion 600 mounted on the first case 110 so as to be able to move the first support means 900 in the first direction and the second direction.

The conveying portion 600 includes two vertical-axis rails 630 respectively mounted on both left and right sides of the first case 110 or the second case 120, two horizontal-axis rails 620 having both left and right side ends inserted into vertical grooves 631 formed in the vertical-axis rails 630 so as to be able to move in the second direction along the two vertical-axis rails 630, and a fixing portion 610 mounted between the two horizontal-axis rails 620 and having both left and right side ends inserted into horizontal grooves 621 formed in the horizontal-axis rails 620 so as to be able to move in the first direction along the two horizontal-axis rails 620, wherein the first support means 900 or the second support means is coupled to the fixing portion 610.

For example, the first support means 900 may be fixed to the fixing portion 610 by an adhesive, or the first support means 900 may be fixed to the fixing portion 610 by a hook, which is disposed at a lower end surface of the first support means 900, being fastened to a groove formed in an upper end surface of the fixing portion 610. The first support means 900 may be coupled to the fixing portion 610 in various other ways.

Also, the fixing portion 610 may include a rotary plate which is mounted on the upper end surface of the fixing portion 610 and rotatable. When the first support means 900 is mounted on the rotary plate, the first support means 900 may rotate together with the rotary plate.

The vertical groove 631 is formed in each of the vertical-axis rails 630. The vertical grooves 631 are formed in the vertical-axis rails 630 so as to face each other.

Both side ends of the horizontal-axis rails 620 are inserted into the vertical grooves 631, and the both side ends may move along the vertical grooves 631. In this case, wheels inserted into the vertical grooves 631 may be mounted on the both side ends of the horizontal-axis rails 620.

The horizontal groove 621 may be formed in each of the horizontal-axis rails 620. The horizontal grooves 621 are formed in the horizontal-axis rails 620 so as to face each other.

Both side ends of the fixing portion 610 are inserted into the horizontal grooves 621, and the both side ends may move along the horizontal grooves 621. In this case, wheels inserted into the horizontal grooves 621 may be mounted on both side ends of the fixing portion 610.

Here, although it has been described above that two horizontal-axis rails and two vertical-axis rails are formed, the present invention is not limited thereto. A vertical-axis rail or a horizontal-axis rail at any one side may be omitted. Such circumstances also belong to the present invention.

FIG. 43 is an exemplary view illustrating a use state of a mobile phone case according to a fourteenth embodiment of the present invention.

Although the first to fourth vertical portions, e.g., the elements denoted by the reference numerals 912, 914, 922, 924, and the like, which have been described above with reference to FIGS. 13 to 26 in the descriptions of the first to sixth embodiments of the mobile phone case according to the present invention are illustrated as covering the left and right side surfaces and upper and lower side surfaces of a mobile phone, the present invention is not limited thereto.

That is, as illustrated in FIG. 43, the first to fourth vertical portions may be formed to cover four corners of a mobile phone. Therefore, as illustrated in FIG. 43, the first to fourth vertical portions may move in a diagonal direction on the first case 110. In this case, the first direction and the second direction may be diagonal directions instead of the horizontal and vertical directions on the case 110.

Also, to allow the first to fourth vertical portions to move as illustrated in FIG. 43, support portions that support the first to fourth vertical portions may also be disposed diagonally as illustrated in FIG. 43.

Also, the mobile phone case according to the present invention may be formed by applying one of the above-described embodiments or by applying at least two or more of the above-described embodiments in combination.

Also, although the mobile phone case according to the present invention has been described above as including all of the first case 110, the second case 120, and the third case 130, the mobile phone case according to the present invention may only include the first case 110 and the third case 130. That is, the mobile phone case according to the present invention may also be used for the purpose of managing only one mobile phone. In this case, the configuration, function, and form of the first support means disposed in the first case 110 may be the same as those of the first support means described above with reference to FIGS. 13 to 40. Therefore, detailed descriptions of the mobile phone case according to the present invention that only includes the first case 110 and the third case will be omitted.

Although the mobile phone case according to the present invention has been described above as including all of the first case 110, the second case 120, and the third case 130, the mobile phone case according to the present invention may only include the first case 110 and the third case 130. That is, the mobile phone case according to the present invention may also be used for the purpose of managing only one mobile phone. In this case, the configuration, function, and form of the first support means disposed in the first case 110 may be the same as those of the first support means described above with reference to FIGS. 13 to 40. Therefore, detailed descriptions of the mobile phone case according to the present invention that only includes the first case 110 and the third case will be omitted.

FIG. 44 illustrates a mobile phone case according to yet another embodiment of the present invention. At least one of a first support means provided in a first case 110 and a second support means provided in a second case includes a first support portion 1100 and a second support portion 1110 which are configured to support a mobile phone and includes rotating shaft portions 1101 and 1111 to which one end of the support portion is rotatably fixed. By rotating the support portion clockwise or counterclockwise about the rotating shaft portion, a horizontal width of the support portion is changeable. In this way, the support portion is able to support mobile phones of various sizes. The horizontal width may be changeable for both the first support portion and the second support portion or for only one thereof.

The first support portion and the second support portion may be disposed at an upper side surface of the case so as to support an upper side surface of a mobile phone. To supplement the support of the lower portion of the mobile phone, lower support portions 1120 and 1121 may be separately provided. A user may fix a mobile phone to the lower support portions and change the horizontal width of the first support portion and/or the second support portion so as to fix an upper side surface of the mobile phone.

Figure 45:
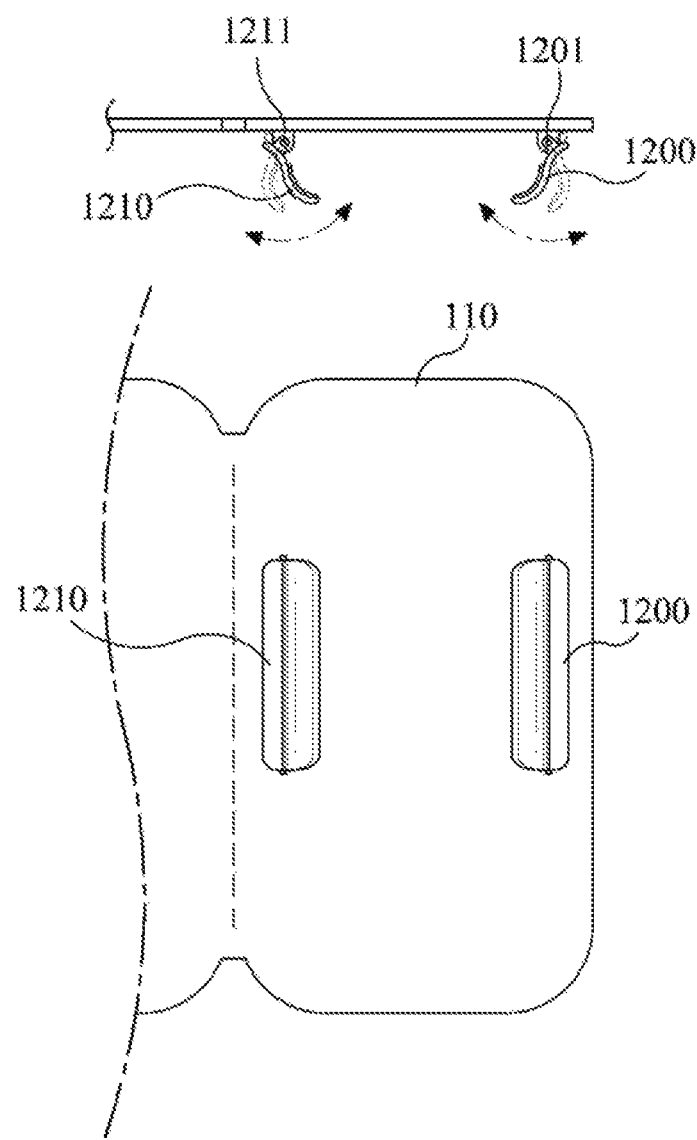

FIG. 45 illustrates a mobile phone case according to yet another embodiment of the present invention. At least one of a first support means provided in a first case 110 and a second support means provided in a second case includes a first support portion 1200 and a second support portion 1210 which are configured to support a mobile phone and includes hinge shaft portions 1201 and 1211 to which one inner side end of the support portion is rotatably fixed when the mobile phone case is viewed from the side at the bottom. By rotating the support portion clockwise or counterclockwise about the hinge shaft portion, a horizontal width of the support portion is changeable. In this way, the support portion is able to support mobile phones of various sizes. The horizontal width may be changeable for both the first support portion and the second support portion or for only one thereof.

The first support portion 1200 and the second support portion 1210 may be disposed at central portions of both side surfaces of the case so as to support side surfaces of a mobile phone. Meanwhile, to supplement the support of the lower portion of the mobile phone, a lower support portion (not illustrated) may be separately provided. A user may fix a mobile phone to the lower support portion and change the horizontal width of the first support portion 1200 and/or the second support portion 1210 so as to fix side surfaces of the mobile phone.

Figure 46:
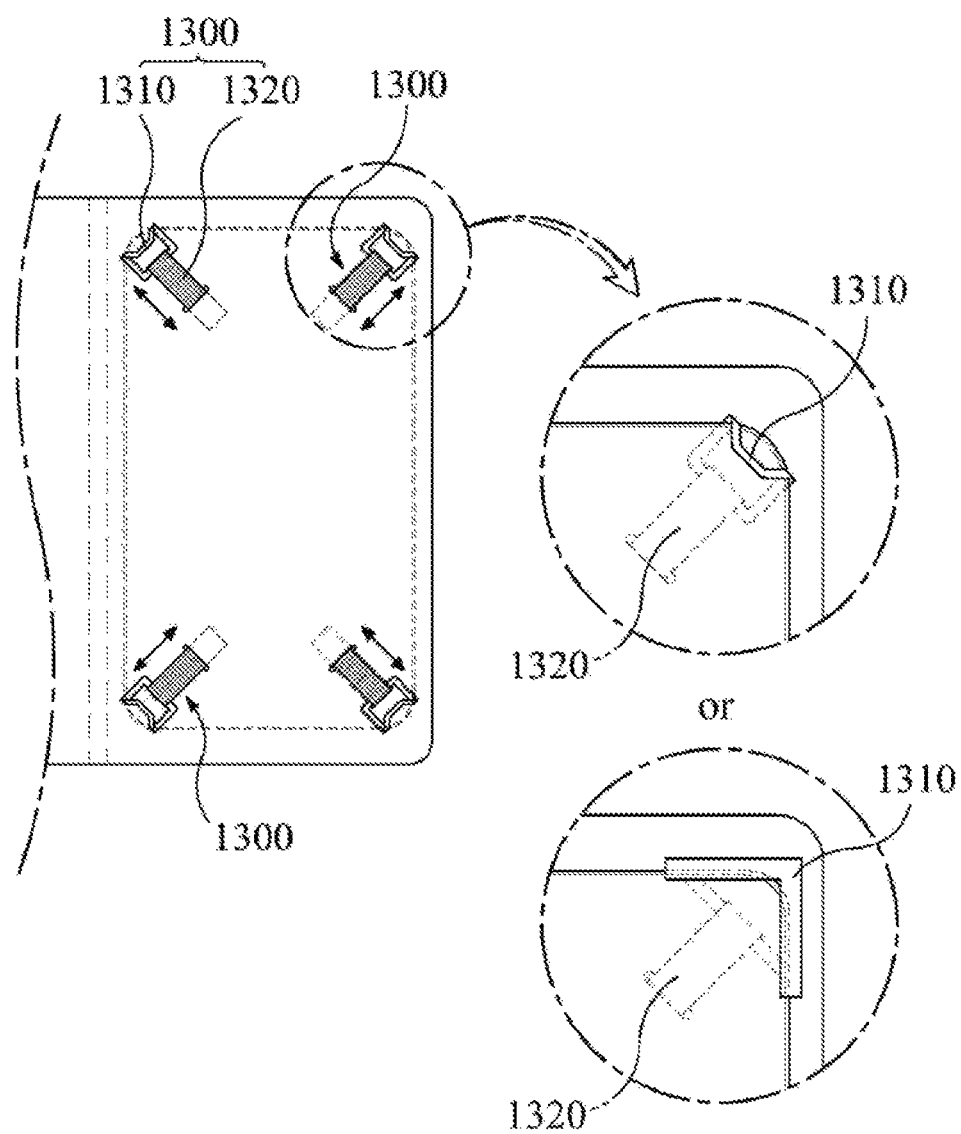

FIG. 46 illustrates a mobile phone case according to yet another embodiment of the present invention. At least one of a first support means provided in a first case 110 and a second support means provided in a second case includes at least two or more pressing supporting portions 1300 configured to press and support a mobile phone and includes an elastic portion 1320 disposed at an inner side of the pressing supporting portion 1300 so as to allow a length of the pressing supporting portion 1300 to be changed by elasticity. The elastic portion may be in the form of an elastic band whose length is changeable. A mobile phone holding portion 1310 is provided at an outer side end of the pressing supporting portion 1300 so as to support the mobile phone. Two or more pressing supporting portion may be disposed at corner regions of the case so as to support the corners of the mobile phone (see FIG. 46), or the pressing supporting portion may be disposed in two or more of upper, lower, left, and right regions of the case so as to support the upper, lower, left, and right portions of the mobile phone (not illustrated). In a case in which two pressing supporting portions are disposed, separate fixing supporting portions may be provided opposite to the pressing supporting portions so as to fix and support the pressing supporting portions. A user may fix a mobile phone to a portion of the pressing supporting portion or the fixing supporting portion, change the length of the pressing supporting portion, and fix the mobile phone using the mobile phone holding portion.

Figure 47:
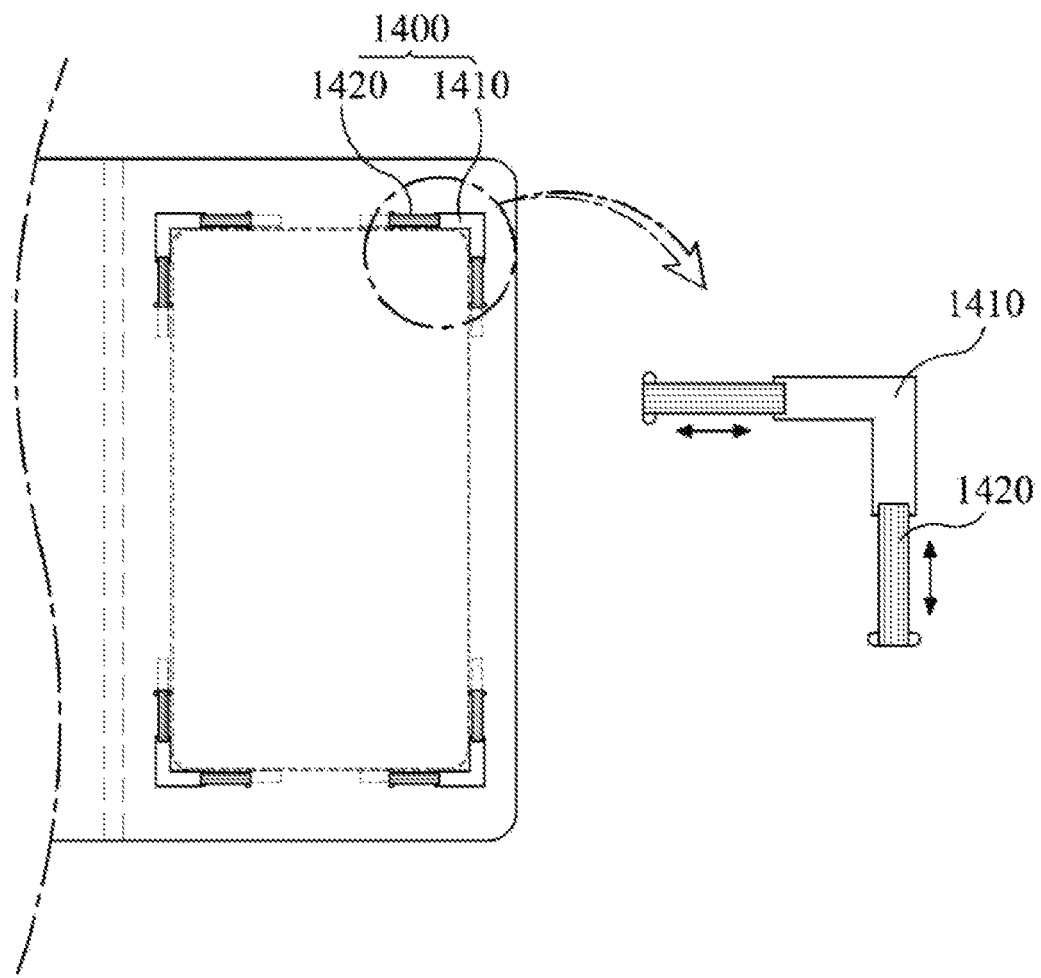

FIG. 47 illustrates a mobile phone case according to yet another embodiment of the present invention. At least one of a first support means provided in a first case 110 and a second support means provided in a second case includes at least two or more pressing supporting portions 1400 configured to press and support a mobile phone and includes an elastic portion 1420 disposed at both ends of the pressing supporting portion 1400 so as to allow a length of the pressing supporting portion 1400 to be changed by elasticity. The elastic portion may be in the form of an elastic band whose length is changeable. A mobile phone holding portion 1410 is provided at a central portion of the pressing supporting portion 1400 so as to support the mobile phone. The shape of the mobile phone holding portion is not limited. The mobile phone holding portion may have any shape into which a corner of a mobile phone may be fitted or have an L-shape which is similar to the shape of the corner of the mobile phone. Examples of the shape into which the corner of the mobile phone may be fitted includes the shape of an elastic band that is integrally formed with the elastic portion using the same material as the elastic portion.

Two or more pressing supporting portion 1400 may be disposed at corner regions of the case so as to support the corners of the mobile phone. Preferably, three or four pressing supporting portions 1400 may be provided. In a case in which three pressing supporting portions are disposed, a separate fixing supporting portion may be provided to fix and support the corner where the pressing supporting portion is not disposed. A user may fix a mobile phone to a portion of the pressing supporting portion or the fixing supporting portion, change the length of the pressing supporting portion, and fix the corners of the mobile phone using the mobile phone holding portion.

Figure 48:
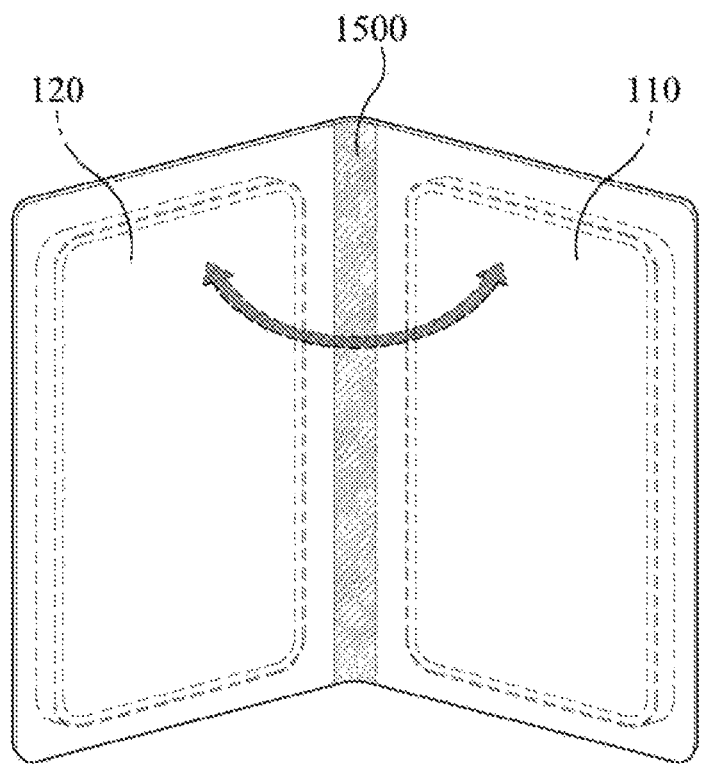
Figure 49:
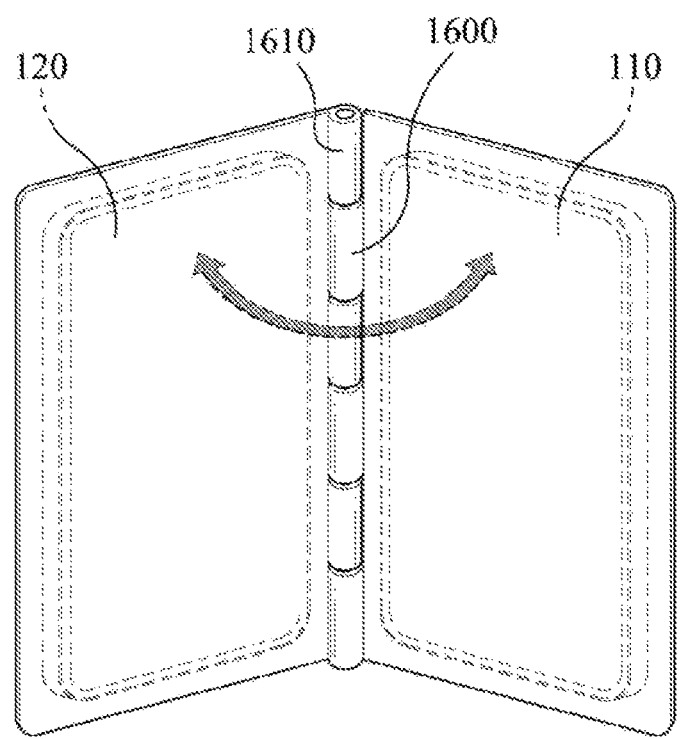

FIGS. 48 and 49 illustrate a mobile phone case according to yet another embodiment of the present invention. The mobile phone case includes a first case 110 having a first support means on which a first mobile phone 200 is mounted, a second case 120 having a second support means on which a second mobile hone 300 is mounted, and a connecting portion 1500 configured to connect the first case and the second case, wherein at least one or more of a vertical width and a horizontal width of at least one of the first support means and the second support means is changeable.

As the variable support means disposed in the first case and/or the second case, various variable support means which have been described above with reference to FIGS. 13 to 47 may be applied. Detailed descriptions thereof, which have been given above, will be omitted.

As illustrated in FIG. 48, the connecting portion 1500 may be a connecting portion 1500 formed of a flexible material. As illustrated in FIG. 49, a first hinge shaft portion 1600 connected to the first case and a second hinge shaft portion 1610 disposed in the second case may be rotatably coupled to allow opening and closing of the first case and the second case.

Figure 50:
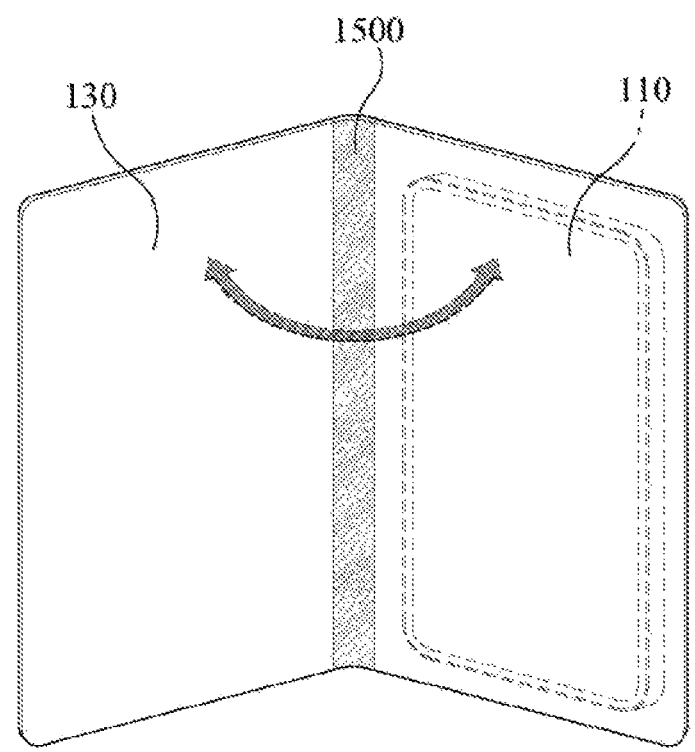

FIG. 50 illustrates a mobile phone case according to yet another embodiment of the present invention. The mobile phone case includes a first case 110 having a first support means on which a first mobile phone is mounted, a third case 130 which serves as a cover configured to cover the first case, and a connecting portion configured to connect the first case and the third case and allow the third case 130 to cover and protect the first mobile phone stored in the first case, wherein at least one or more of a vertical width and a horizontal width of the first support means is changeable. The third case may serve as a cover of the first mobile phone, and no other mobile phone may be mounted thereon.

As the variable support means and the connecting portion disposed in the first case, various variable support means and connecting portions which have been described above with reference to FIGS. 13 to 49 may be applied. Detailed descriptions thereof, which have been given above, will be omitted.

Meanwhile, with regards to ways of changing at least one or more of a vertical width and a horizontal width of support means which have been described above with reference to FIGS. 13 to 50, in a case in which a pair of variable support means or a plurality of variable support means are provided, it should be understood, even without illustration or description, that at least one or more of the vertical width and the horizontal width may be changeable for all of the variable support means or for only one thereof. Such circumstances belong to the present invention.

Those of ordinary skill in the art to which the present invention pertains should understand that the present invention may be practiced in other specific forms without changing the technical idea or essential features thereof. Therefore, the embodiments described herein should be understood as illustrative in all aspects, instead of limiting. The scope of the present invention is defined by the claims below rather than the detailed description above. The meaning and scope of the claims and all changes or modifications derived from their equivalents should be interpreted as falling within the scope of the present invention.

According to the present invention, a user can efficiently perform a task using any one mobile phone in association with the other mobile phone or perform separate tasks using the two mobile phones. Because the user can manage the two mobile phones simultaneously, it is possible to improve work efficiency, productivity, and use satisfaction. Therefore, the invention is highly industrially applicable.

Although the present invention has been described above with reference to embodiments illustrated in the drawings, the embodiments are merely illustrative, and one of ordinary skill in the art to which the disclosure pertains should understand that various modifications and other equivalent embodiments are possible from the above-described embodiments. Therefore, an actual technical scope of the present invention should be defined based on the claims below.

What is claimed is:

1. A mobile phone case comprising:
    a first case having a first support means on which a first mobile phone is mounted;
    a second case having a second support means on which a second mobile phone is mounted;
    a third case disposed between the first case and the second case and folded so as to serve as a cover that covers each of the first case and the second case;
    a first connecting portion configured to connect the first case and the third case and allow the third case to cover and protect the first mobile phone stored in the first case; and
    a second connecting portion configured to connect the second case and the third case and allow the third case to cover and protect the second mobile phone stored in the second case,
    wherein, in case that the first case, the third case, and the second case form the coplanar in a row in an unfolded state, the first support means of the first case and the second support means of the second case are arranged to face each other in opposite directions so that the first mobile phone and the second mobile phone are to be mounted in opposite directions to the first case and the second case, respectively.

2. The mobile phone case of claim 1, wherein:
    a first surface of the first case, a first surface of the second case, and a first surface of the third case form the coplanar facing the same direction in an unfolded state;
    a second surface of the first case, a second surface of the second case, and a second surface of the third case form the coplanar facing the same direction in an unfolded state;
    at least one first rear adhesive means is disposed on the second surface of the first case;
    at least one second front adhesive means is disposed on the first surface of the second case;
    at least one third front adhesive means is disposed on the first surface of the third case; and
    at least one third rear adhesive means is disposed on the second surface of the third case.

3. The mobile phone case of claim 1, wherein the first case, the third case, and the second case are overlapped in a folded state by the first connecting portion and the second connecting portion so that the first case is in contact with the third case and the second case is in contact with the third case.

4. The mobile phone case of claim 1, wherein the first connecting portion and the second connecting portion are formed of an elastic material capable of rotating approximately 360 degrees.

5. The mobile phone case of claim 1, wherein:
    a first case window formed in the first case and a first support window formed in the first support means overlap each other; and
    a second case window formed in the second case and a second support window formed in the second support means overlap each other.

6. The mobile phone case of claim 1, wherein:
    first surfaces of the first case, the second case, and the third case are coplanar, all facing a same direction in an unfolded state;
    second surfaces of the first case, the second case, and the third case are coplanar all facing a same direction in the unfolded state; and
    the second surface of the first case and the second surface of the third case come in close contact such that the first mobile phone mounted on the first support means and the second mobile phone mounted on the second support means are disposed side by side with each other.

7. The mobile phone case of claim 1, wherein:
    first surfaces of the first case, the second case, and the third case are coplanar all facing a same direction in an unfolded state;

second surfaces of the first case, the second case, and the third case are coplanar facing a same direction in the unfolded state; and the first surface of the second case and the first surface of the third case come in close contact such that the second mobile phone mounted on the second support means and the first mobile phone mounted on the first support means are disposed side by side with each other.

8. The mobile phone case of claim 1, wherein:

first surfaces of the first case, the second case, and the third case are coplanar all facing a same direction in an unfolded state;

second surfaces of the first case, the second case, and the third case are coplanar, all facing a same direction in the unfolded state; and the second surface of the first case and the second surface of the third case come in close contact and the first surface of the third case and the first surface of the second case come in close contact such that the first mobile phone mounted on the first support means and the second mobile phone mounted on the second support means are exposed to an outside in opposite directions.

9. The mobile phone case of claim 1, wherein:

first surfaces of the first case, the second case, and the third case are coplanar all facing a same direction in an unfolded state;

second surfaces of the first case, the second case, and the third case are coplanar all facing a same direction in the unfolded state; and the first support means of the first case and the first surface of the third case come in close contact and the second surface of the third case and the second support means of the second case come in close contact such that the first mobile phone mounted on the first support means and the second mobile phone mounted on the second support means are disposed so as not to be exposed to an outside.

10. The mobile phone case of claim 1, wherein:

at least one top cover among top covers constituting the first support means and the second support means rotates to be at a predetermined angle from a plane of the first case or the second case; and the top covers cover side surfaces and an upper end surface of the first mobile phone or the second mobile phone.

11. The mobile phone case of claim 1, wherein at least one of the first support means and the second support means rotates along a plane of the first case or the second case.

12. The mobile phone case of claim 1, wherein at least one of the first support means and the second support means rotates to be at a predetermined angle from a plane of the first case or the second case.

13. The mobile phone case of claim 1, further comprising a conveying portion configured to move at least one of the first support means and the second support means along a plane of the first case or the second case in a first direction or a second direction perpendicular to the first direction.

14. The mobile phone case of claim 13, wherein the conveying portion includes:

vertical-axis rails respectively mounted on both left and right sides of the first case or the second case;

horizontal-axis rails having both left and right side ends inserted into vertical grooves formed in the vertical-axis rails so as to move in the second direction along the two vertical-axis rails; and a fixing portion mounted between the horizontal-axis rails and having both left and right side ends inserted into horizontal grooves formed in the horizontal-axis rails so as to move in the first direction along the two horizontal-axis rails, wherein the first support means or the second support means is coupled to the fixing portion.

15. A mobile phone case comprising:

a first case having a first support means on which a first mobile phone is mounted;

a second case having a second support means on which a second mobile phone is mounted;

a third case disposed between the first case and the second case and folded so as to serve as a cover that covers each of the first case and the second case;

a first connecting portion configured to connect the first case and the third case and to allow the third case to cover and configured to pivot to protect the first mobile phone stored in the first case;

a second connecting portion configured to connect the second case and the third case and to allow the third case to cover and configured to pivot to protect the second mobile phone stored in the second case; and a conveying portion configured to move at least one of the first support means and the second support means along a plane of the first case or the second case in a first direction or a second direction perpendicular to the first direction wherein the conveying portion includes:

vertical-axis rails respectively mounted on both left and right sides of the first case or the second case;

horizontal-axis rails having both left and right side ends inserted into vertical grooves formed in the vertical-axis rails so as to move in the second direction along the two vertical-axis rails; and a fixing portion mounted between the horizontal-axis rails and having both left and right side ends inserted into horizontal grooves formed in the horizontal-axis rails so as to move in the first direction along the two horizontal-axis rails, wherein the first support means or the second support means is coupled to the fixing portion, wherein at least one or more of a vertical width and a horizontal width of at least one of the first support means and the second support means is changeable.

\* \* \* \* \*